(12) United States Patent
Yamamoto et al.

(10) Patent No.: US 8,617,420 B2
(45) Date of Patent: Dec. 31, 2013

(54) LIQUID CRYSTAL COMPOSITION AND LIQUID CRYSTAL ELEMENT

(75) Inventors: Shin-ichi Yamamoto, Ichihara (JP); Yasuhiro Haseba, Ichihara (JP)

(73) Assignees: JNC Corporation, Tokyo (JP); JNC Petrochemical Corporation, Tokyo (JP)

(*) Notice: Subject to any disclaimer, the term of this patent is extended or adjusted under 35 U.S.C. 154(b) by 207 days.

(21) Appl. No.: 12/199,691

(22) Filed: Aug. 27, 2008

(65) Prior Publication Data
US 2009/0059132 A1 Mar. 5, 2009

(30) Foreign Application Priority Data

Aug. 31, 2007 (JP) ................................. 2007-225735

(51) Int. Cl.
| C09K 19/44 | (2006.01) |
| C09K 19/20 | (2006.01) |
| C09K 19/12 | (2006.01) |
| C09K 19/30 | (2006.01) |
| C09K 19/54 | (2006.01) |
| C09K 19/52 | (2006.01) |
| C09K 19/38 | (2006.01) |

(52) U.S. Cl.
USPC .............. 252/299.66; 252/299.01; 252/299.5; 252/299.63; 252/299.67

(58) Field of Classification Search
USPC ............ 428/1.1; 252/299.63, 299.66, 299.67, 252/299.5, 299.01
See application file for complete search history.

(56) References Cited

U.S. PATENT DOCUMENTS

| 6,436,491 | B1 * | 8/2002 | Tarumi et al. | 428/1.1 |
| 7,648,647 | B2 * | 1/2010 | Kikuchi et al. | 252/299.01 |
| 8,349,209 | B2 * | 1/2013 | Haseba et al. | 252/299.01 |
| 2002/0038859 | A1 * | 4/2002 | Heckmeier et al. | 252/299.63 |
| 2008/0280071 | A1 * | 11/2008 | Kikuchi et al. | 428/1.1 |

FOREIGN PATENT DOCUMENTS

| DE | 102006054361 A1 * | 5/2007 |
| JP | 2000-327632 | 11/2000 |
| JP | 2000-327966 | 11/2003 |
| JP | 2004-059772 | 2/2004 |
| JP | 2004-182949 | 7/2004 |
| JP | WO2005/019378 | 3/2005 |
| JP | 2005-157109 | 6/2005 |
| JP | WO2005/080529 | 9/2005 |
| JP | WO2005/090520 | 9/2005 |
| JP | 2005-336477 | 12/2005 |
| JP | 2005-537520 | 12/2005 |
| JP | 2006-506477 | 2/2006 |
| JP | 2006-089622 | 4/2006 |
| JP | 2006-127707 | 5/2006 |
| JP | 2006-299084 | 11/2006 |
| JP | 2006-348226 A | 12/2006 |
| JP | 2007-503487 | 2/2007 |
| JP | 2007-277531 A | 10/2007 |
| JP | 2008-303381 A | 12/2008 |
| WO | WO2004/029697 | 4/2004 |
| WO | WO2004/044093 | 5/2004 |

OTHER PUBLICATIONS

English translation by computer for DE-102006054361; http://translationgateway.epo.org/emtp/gw/?ACTION=description-retrieval&OPS=ops.epo.org&LOCALE=en_EP&FORMAT=docdb&COUNTRY=DE&NUMBER=102006054361&KIND=A1&T=1.*
Yoshiaki Hisakado et al., "Large Electro-Optic Kerr Effect in Polymer-Stabilized Liquid-Crystalline Blue Phases," Adv. Materials, 17(1): 96-98 (Jan. 2005).
Handbook of Liquid Crystal, p. 196 (published in 2000, Maruzen) [000269] (English Translation of Abstract).
Yasuhiro Haseba et al., "Electro-optic Effects of the optically isotropic state induced by the incorporative effects of a polymer network and the chirality of liquid crystal," Journal of the SID, 14(6): 551-556 (2006).
Hirotsugu Kikuchi et al., "Polymer-Stabilized Liquid Crystal Blue Phases," Nature Materials, vol. 1, pp. 64-68 (Sep. 2002).
Martin Petrzilka, "New Liquid Crystals: The Synthesis and Mesomorphic Properties of Nematic Alkenylsubstituted Cyanophenylcyclohexanes," Mol. Cryst. Liq. Cryst., vol. 131, pp. 109-123 (1985).
Martin Petrzilka et al., "New Liquid Crystals: The Synthesis and Mesomorphic Properties of Alkenylsubstituted Cyanophenylcyclohexanes and Cyanobiphenylycyclohexanes," Mol. Cryst. Liq. Cryst., vol. 131, pp. 327-342 (1985).
Office Action for JP2007-225735 (coressponding application in Japan), JPO, Jan. 8, 2013.

* cited by examiner

*Primary Examiner* — Shean C Wu
(74) *Attorney, Agent, or Firm* — Hogan Lovells US LLP

(57) ABSTRACT

The invention provides an optically isotropic liquid crystal composition having: a liquid crystal component comprising a liquid crystal component A consisting of one or more compounds selected from the group consisting of compounds having difluoroalkenyl and compounds having alkenyl; and chiral dopants, wherein in the liquid crystal component, the content of compounds having 3 or more ring structures is approximately 15 wt % or more.

25 Claims, 7 Drawing Sheets

LIQUID CRYSTAL COMPOSITION AND LIQUID CRYSTAL ELEMENT

CROSS REFERENCE TO RELATED APPLICATIONS

This application claims priority under 35 U.S.C. §119 to Japanese Patent Application No. JP 2007-225735, filed Aug. 31, 2007, which application is expressly incorporated herein by reference in its entirety.

The invention relates to a liquid crystal composition and a liquid crystal element comprising the liquid crystal composition.

BACKGROUND ART

Like the case of an isotropic phase (hereinafter sometimes referred to as "non-liquid crystalline isotropic phase") of a nematic liquid crystal material, the Kerr effect, which is a phenomenon in which a value of electric birefringence $\Delta n_E$ (a value of birefringence induced when electric field is applied on an isotropic medium) is proportional to the square of electric field E $[\Delta n_E = K\lambda E^2$ (K: Kerr constant (Kerr coefficient), $\lambda$: wavelength)], is observed in a blue phase, which is an optically isotropic liquid crystal phase.

Recently, modes in which electric birefringence is exhibited by applying electric field to an optically isotropic liquid crystal phase such as a blue phase have been actively studied (see Japanese Laid-Open Patent Publication No. 2003-327966, No. 2005-336477, No. 2006-89622, No. 2006-299084, No. 2005-157109, and No. 2006-127707, International Publication WO 2005/90520 and WO 2005/080529 pamphlet, Japanese National-phase PCT Laid-Open Patent Publication No. 2005-537520, No. 2006-506477 and No. 2007-503487, Nature Materials, 1, 64, (2002), Adv. Mater., 17, 96, (2005), and Journal of the SID, 14, 551, (2006)). In addition, not only application of the modes to display elements, but also application thereof to wavelength-variable filters, wavefront control elements, liquid crystal lenses, aberration correction elements, aperture control elements, optical head apparatuses and the like, in which electric birefringence is utilized, have been proposed (see International Publication WO 2005/080529 pamphlet, Japanese Laid-Open Patent Publication No. 2005-157109 and No. 2006-127707).

DISCLOSURE OF THE INVENTION

A liquid crystal material with large electric birefringence (i.e., low drive voltage) is desired. Further, an optically isotropic liquid crystal material exhibiting a large Kerr constant has been desired.

The inventors diligently made researches and found an optically isotropic liquid crystal composition having a liquid crystal component comprising a compound having alkenyl, difluoroalkenyl or the like and chiral dopants and the like.

[1] An optically isotropic liquid crystal composition having a liquid crystal component comprising a liquid crystal component A consisting of one or more compounds represented by general formula (1-1) or (1-2) and chiral dopants, wherein in the liquid crystal component, the content of compounds having 3 or more ring structures is approximately 15 wt % or more,

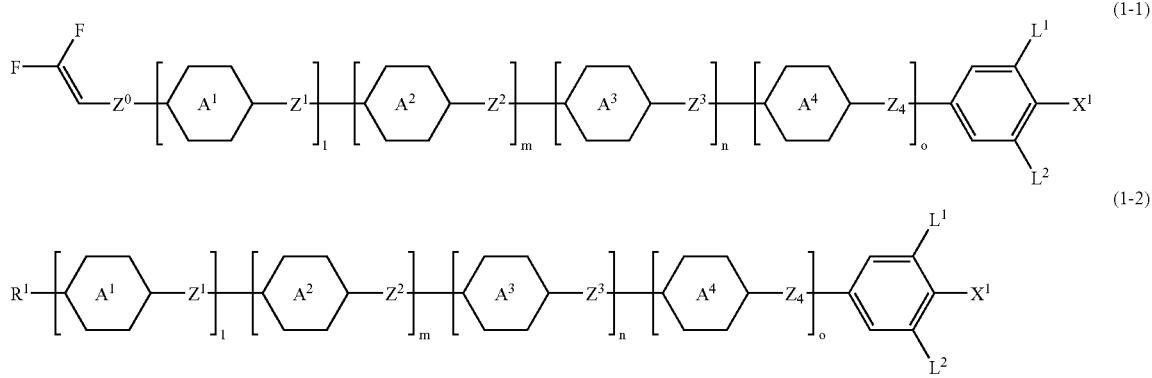

and wherein in formulae (1-1) and (1-2):

$R^1$ is alkenyl having 2 to 20 carbon atoms, wherein any —$CH_2$— in the alkenyl can be replaced by —O—, —S—, —COO—, —OCO—, —CH=CH— or —C≡C—; and any hydrogen in the alkenyl can be replaced by halogen;

Ring $A^1$, Ring $A^2$, Ring $A^3$ and Ring $A^4$ are each independently a benzene ring, a naphthalene ring, a cyclohexene ring, a bicyclooctane ring or a cyclohexane ring, wherein any hydrogen in these rings can be replaced by halogen; any —$CH_2$— in the rings can be replaced by —O— or —S—; and any —CH= in the rings can be replaced by —N=;

$Z^0$ is a single bond or alkylene having 1 to 20 carbon atoms, wherein any —$CH_2$— in the alkylene can be replaced by —O—, —S—, —COO—, —OCO—, —CSO—, —OCS—, —CH=CH—, —CF=CF— or —C≡C—; and any hydrogen can be replaced by halogen;

$Z^1$, $Z^2$, $Z^3$ and $Z^4$ are each independently a single bond or alkylene having 1 to 4 carbon atoms, wherein any —$CH_2$— in the alkylene can be replaced by —O—, —S—, —COO—, —OCO—, —CSO—, —OCS—, —CH=CH—, —CF=CF— or —C≡C—; and any hydrogen can be replaced by halogen;

$L^1$ and $L^2$ are each independently hydrogen or halogen;

$X^1$ is halogen, —C≡N, —N=C=S, —C≡C—C≡N, —$SF_5$, —$CHF_2$, —$CF_3$, —$CF_2CH_2F$, —$CF_2CHF_2$, —$CF_2CF_3$, —$(CF_2)_3$—F, —$CF_2CHFCF_3$, —$CHFCF_2CF_3$, —$(CF_2)_4$—F, —$(CF_2)_5$—F, —$OCHF_2$, —$OCF_3$, —$OCF_2CH_2F$, —$OCF_2CHF_2$, —$OCH_2CF_3$, —$OCF_2CF_3$, —O—$(CF_2)_3$—F, —$OCF_2CHFCF_3$, —$OCHFCF_2CF_3$, —O—$(CF_2)_4$—F, —O—$(CF_2)_5$—F, —CH=$CF_2$, —CH=$CHCF_3$ or —CH=$CHCF_2CF_3$; and l, m, n and o are each independently 0 or 1.

[2] An optically isotropic liquid crystal composition having a liquid crystal component comprising a liquid crystal component A consisting of one or more compounds represented by general formula (1-1) or (1-2) and chiral dopants, wherein in the liquid crystal component, the content of the liquid crystal component A is approximately 15 wt % or more,

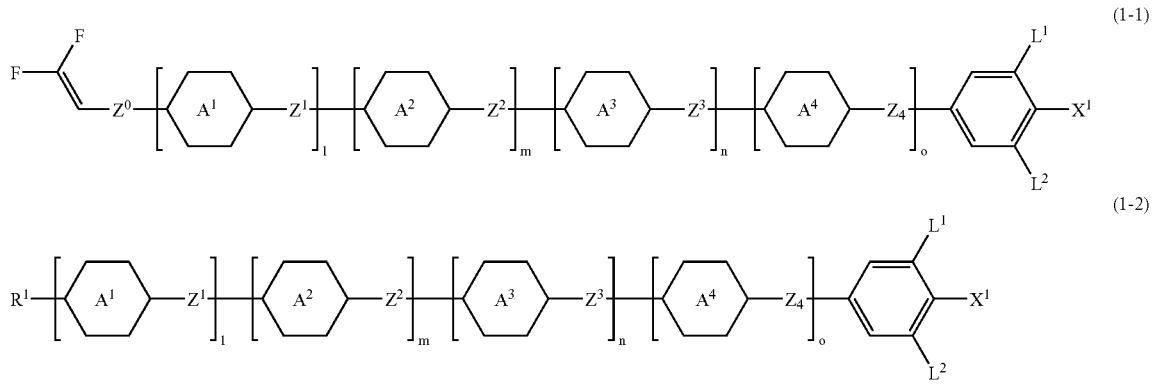

and wherein in formulae (1-1) and (1-2):

$R^1$ is alkenyl having 2 to 20 carbon atoms, wherein any —$CH_2$— in the alkenyl can be replaced by —O—, —S—, —COO—, —OCO—, —CH=CH— or —C≡C—; and any hydrogen in the alkenyl can be replaced by halogen;

Ring $A^1$, Ring $A^2$, Ring $A^3$ and Ring $A^4$ are each independently a benzene ring, a naphthalene ring, a cyclohexene ring, a bicyclooctane ring or a cyclohexane ring, wherein any hydrogen in these rings can be replaced by halogen; any —$CH_2$— in the rings can be replaced by —O— or —S—; and any —CH= in the rings can be replaced by —N=;

$Z^0$ is a single bond or alkylene having 1 to 20 carbon atoms, wherein any —$CH_2$— in the alkylene can be replaced by —O—, —S—, —COO—, —OCO—, —CSO—, —OCS—, —CH=CH—, —CF=CF— or —C≡C—; and any hydrogen can be replaced by halogen;

$Z^1$, $Z^2$, $Z^3$ and $Z^4$ are each independently a single bond or alkylene having 1 to 4 carbon atoms, wherein any —$CH_2$— in the alkylene can be replaced by —O—, —S—, —COO—, —OCO—, —CSO—, —OCS—, —CH=CH—, —CF=CF— or —C≡C—; and any hydrogen can be replaced by halogen;

$L^1$ and $L^2$ are each independently hydrogen or halogen;

$X^1$ is halogen, —C≡N, —N=C=S, —C≡C—C≡N, —$SF_5$, —$CHF_2$, —$CF_3$, —$CF_2CH_2F$, —$CF_2CHF_2$, —$CF_2CF_3$, —$(CF_2)_3$—F, —$CF_2CHFCF_3$, —$CHFCF_2CF_3$, —$(CF_2)_4$—F, —$(CF_2)_5$—F, —$OCHF_2$, —$OCF_3$, —$OCF_2CH_2F$, —$OCF_2CHF_2$, —$OCH_2CF_3$, —$OCF_2CF_3$, —O—$(CF_2)_3$—F, —$OCF_2CHFCF_3$, —$OCHFCF_2CF_3$, —O—$(CF_2)_4$—F, —O—$(CF_2)_5$—F, —CH=$CF_2$, —CH=$CHCF_3$ or —CH=$CHCF_2CF_3$;

l, m, n and o are each independently 0 or 1; and l+m+n+o≥2.

[3] An optically isotropic liquid crystal composition having a liquid crystal component comprising a liquid crystal component A consisting of one or more compounds represented by general formula (1-1) or (1-2) and chiral dopants, wherein in the liquid crystal component, the content of compounds represented by l+m+n+o≥2 in formula (1-1) or (1-2) is approximately 15 wt % or more, and the content of compounds represented by l+m+n+o=1 is approximately 0.1 to approximately 85 wt %,

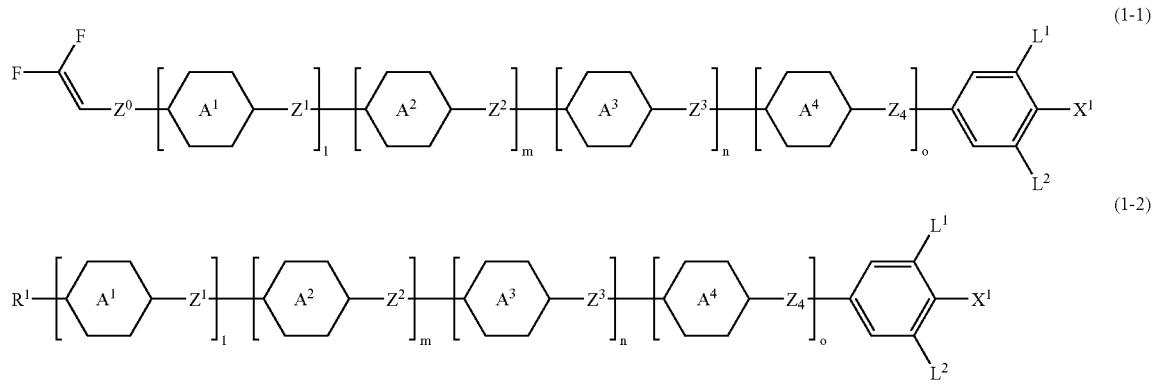

and wherein in formulae (1-1) and (1-2):

$R^1$ is alkenyl having 2 to 20 carbon atoms, wherein any —$CH_2$— in the alkenyl can be replaced by —O—, —S—, —COO—, —OCO—, —CH=CH— or —C≡C—; and any hydrogen in the alkenyl can be replaced by halogen;

Ring $A^1$, Ring $A^2$, Ring $A^3$ and Ring $A^4$ are each independently a benzene ring, a naphthalene ring, a cyclohexene ring, a bicyclooctane ring or a cyclohexane ring, wherein any hydrogen in these rings can be replaced by halogen; any —$CH_2$— in the rings can be replaced by —O— or —S—; and any —CH= in the rings can be replaced by —N=;

$Z^0$ is a single bond or alkylene having 1 to 20 carbon atoms, wherein any —$CH_2$— in the alkylene can be replaced by —O—, —S—, —COO—, —OCO—, —CSO—, —OCS—, —CH=CH—, —CF=CF— or —C≡C—; and any hydrogen can be replaced by halogen;

$Z^1$, $Z^2$, $Z^3$ and $Z^4$ are each independently a single bond or alkylene having 1 to 4 carbon atoms, wherein any —$CH_2$— in the alkylene can be replaced by —O—, —S—, —COO—, —OCO—, —CSO—, —OCS—, —CH=CH—, —CF=CF— or —C≡C—; and any hydrogen can be replaced by halogen;

$L^1$ and $L^2$ are each independently hydrogen or halogen;

$X^1$ is halogen, —C≡N, —N=C=S, —C≡C—C≡N, —$SF_5$, —$CHF_2$, —$CF_3$, —$CF_2CH_2F$, —$CF_2CHF_2$, —$CF_2CF_3$, —$(CF_2)_3$—F, —$CF_2CHFCF_3$, —$CHFCF_2CF_3$, —$(CF_2)_4$—F, —$(CF_2)_5$—F, —$OCHF_2$, —$OCF_3$, —$OCF_2CH_2F$, —$OCF_2CHF_2$, —$OCH_2CF_3$, —$OCF_2CF_3$, —O—$(CF_2)_3$—F, —$OCF_2CHFCF_3$, —$OCHFCF_2CF_3$, —O—$(CF_2)_4$—F, —O—$(CF_2)_5$—F, —CH=$CF_2$, —CH=$CHCF_3$ or —CH=$CHCF_2CF_3$; and l, m, n and o are each independently 0 or 1.

[4] An optically isotropic liquid crystal composition having a liquid crystal component comprising a liquid crystal component A consisting of one or more compounds represented by general formula (1-1) or (1-2) and a liquid crystal component B consisting of one or more compounds represented by general formula (1-3) and chiral dopants, wherein in the liquid crystal component, the content of the liquid crystal component B is approximately 15 to approximately 99.5 wt % or more, and wherein in formulae (1-1) and (1-2):

$R^1$ is alkenyl having 2 to 20 carbon atoms, wherein any —$CH_2$— in the alkenyl can be replaced by —O—, —S—, —COO—, —OCO—, —CH=CH— or —C≡C—; and any hydrogen in the alkenyl can be replaced by halogen;

Ring $A^1$, Ring $A^2$, Ring $A^3$ and Ring $A^4$ are each independently a benzene ring, a naphthalene ring, a cyclohexene ring, a bicyclooctane ring or a cyclohexane ring, wherein any hydrogen in these rings can be replaced by halogen; any —$CH_2$— in the rings can be replaced by —O— or —S—; and any —CH= in the rings can be replaced by —N=;

$Z^0$ is a single bond or alkylene having 1 to 20 carbon atoms, wherein any —$CH_2$— in the alkylene can be replaced by —O—, —S—, —COO—, —OCO—, —CSO—, —OCS—, —CH=CH—, —CF=CF— or —C≡C—; and any hydrogen can be replaced by halogen;

$Z^1$, $Z^2$, $Z^3$ and $Z^4$ are each independently a single bond or alkylene having 1 to 4 carbon atoms, wherein any —$CH_2$— in the alkylene can be replaced by —O—, —S—, —COO—, —OCO—, —CSO—, —OCS—, —CH=CH—, —CF=CF— or —C≡C—; and any hydrogen can be replaced by halogen;

$L^1$ and $L^2$ are each independently hydrogen or halogen;

$X^1$ is halogen, —C≡N, —N=C=S, —C≡C—C≡N, —$SF_5$, —$CHF_2$, —$CF_3$, —$CF_2CH_2F$, —$CF_2CHF_2$, —$CF_2CF_3$, —$(CF_2)_3$—F, —$CF_2CHFCF_3$, —$CHFCF_2CF_3$, —$(CF_2)_4$—F, —$(CF_2)_5$—F, —$OCHF_2$, —$OCF_3$, —$OCF_2CH_2F$, —$OCF_2CHF_2$, —$OCH_2CF_3$, —$OCF_2CF_3$, —O—$(CF_2)_3$—F, —$OCF_2CHFCF_3$, —$OCHFCF_2CF_3$, —O—$(CF_2)_4$—F, —O—$(CF_2)_5$—F, —CH=$CF_2$, —CH=$CHCF_3$ or —CH=$CHCF_2CF_3$; and l, m, n and o are each independently 0 or 1,

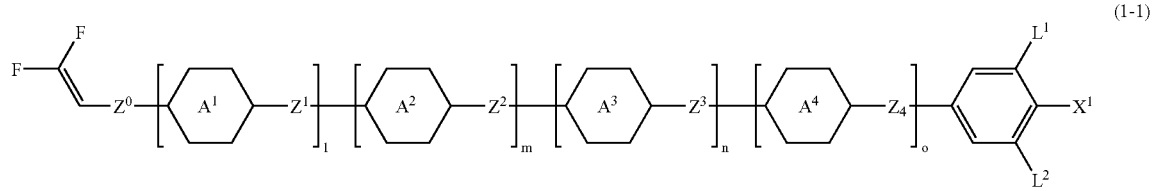

(1-1)

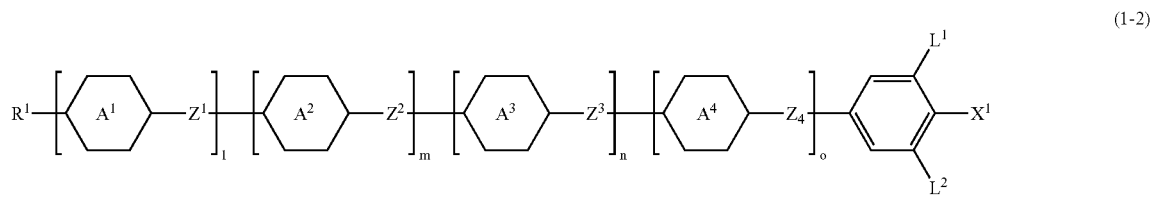

(1-2)

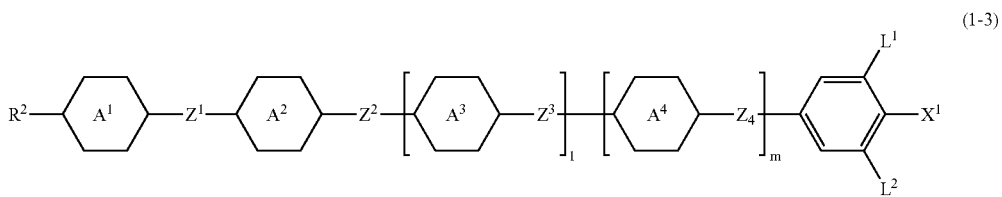

(1-3)

and wherein in general formula (1-3):

$R^2$ is hydrogen or alkyl having 1 to 20 carbon atoms, wherein any —$CH_2$— in the alkyl can be replaced by —O—, —S—, —COO—, —OCO— or —C≡C—; and any hydrogen in the alkyl can be replaced by halogen;

Ring $A^1$, Ring $A^2$, Ring $A^3$ and Ring $A^4$ are each independently a benzene ring, a naphthalene ring, a cyclohexene ring, a bicyclooctane ring or a cyclohexane ring, wherein any hydrogen in these rings can be replaced by halogen; any —$CH_2$— in the rings can be replaced by —O— or —S—; and any —CH= in the rings can be replaced by —N=;

$Z^1$, $Z^2$, $Z^3$ and $Z^4$ are each independently a single bond or alkylene having 1 to 4 carbon atoms, wherein any —$CH_2$— in the alkylene can be replaced by —O—, —S—, —COO—, —OCO—, —CSO—, —OCS—, —CH=CH—, —CF=CF— or —C≡C—; and any hydrogen in the alkylene can be replaced by halogen;

$L^1$ and $L^2$ are each independently hydrogen or halogen;

$X^1$ is halogen, —C≡N, —N=C=S, —C≡C—C≡N, —$SF_5$, —$CHF_2$, —$CF_3$, —$CF_2CH_2F$, —$CF_2CHF_2$, —$CF_2CF_3$, —$(CF_2)_3$—F, —$CF_2CHFCF_3$, —$CHFCF_2CF_3$, —$(CF_2)_4$—F, —$(CF_2)_5$—F, —$OCHF_2$, —$OCF_3$, —$OCF_2CH_2F$, —$OCF_2CHF_2$, —$OCH_2CF_3$, —$OCF_2CF_3$, —O—$(CF_2)_3$—F, —$OCF_2CHFCF_3$, —$OCHFCF_2CF_3$, —O—$(CF_2)_4$—F, —O—$(CF_2)_5$—F, —CH=$CF_2$, —CH=$CHCF_3$ or —CH=$CHCF_2CF_3$; and l and m are each independently 0 or 1.

[5] The optically isotropic liquid crystal composition according to any one of items [1] to [4], wherein the liquid crystal component further comprises a liquid crystal component C consisting of compounds other than the compounds represented by general formulae (1-1) to (1-3) having a dielectric anisotropy of approximately 2 or higher and a liquid crystal component D consisting of compounds other than the compounds represented by general formulae (1-1) to (1-3) having a dielectric anisotropy of approximately −2 or higher and lower than approximately 2, and wherein in the liquid crystal component, the content of the liquid crystal component C is approximately 0.1 to approximately 84.5 wt %, and the content of the liquid crystal component D is approximately 0 to approximately 84.5 wt %.

[6] The optically isotropic liquid crystal composition according to any one of items [1] to [5], wherein in the liquid crystal component A, the content of the compounds represented by general formula (1-1) is approximately 5 to approximately 85 wt %.

[7] The optically isotropic liquid crystal composition according to any one of items [1] to [6], wherein in the liquid crystal component, the content of the liquid crystal component A is approximately 40 to approximately 85 w %.

[8] The optically isotropic liquid crystal composition according to any one of items [1] to [6], wherein in the liquid crystal component, the content of the liquid crystal component A is approximately 70 to approximately 85 w %.

[9] The optically isotropic liquid crystal composition according to any one of items [1] to [8], wherein in the optically isotropic liquid crystal composition, the content of the liquid crystal component A is approximately 70 to approximately 84 wt %.

[10] The optically isotropic liquid crystal composition according to any one of items [1] to [9], wherein $R^1$ in general formula (1-2) is represented by any one of the formulae selected from the group consisting of the following formulae (CHN-1) to (CHN-12),

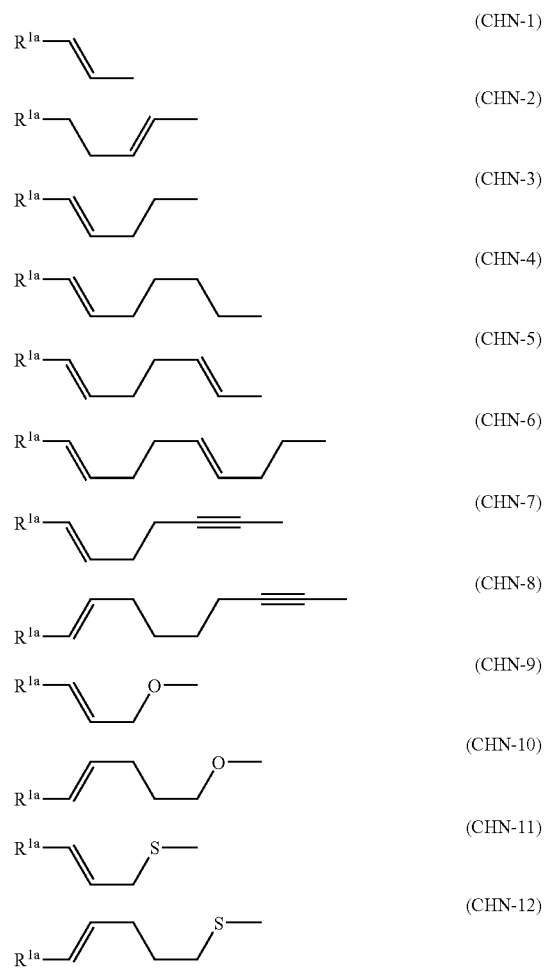

and wherein in formulae (CHN-1) to (CHN-12), each $R^{1a}$ is independently hydrogen or alkyl having 1 to 10 carbon atoms.

[11] The optically isotropic liquid crystal composition according to any one of items [1] to [10], wherein Ring $A^1$, Ring $A^2$, Ring $A^3$ and Ring $A^4$ in general formulae (1-1) to (1-3) are each independently represented by any one of the following formulae (RG-1) to (RG-9).

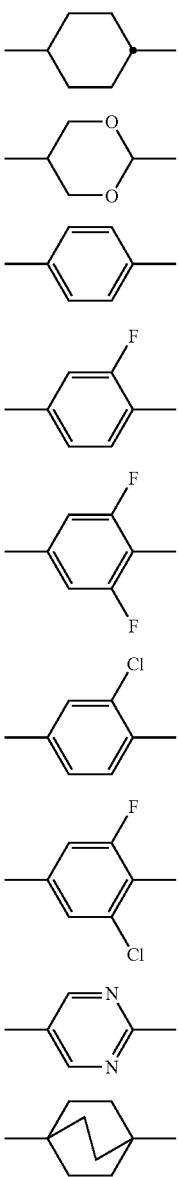

(RG-1)

(RG-2)

(RG-3)

(RG-4)

(RG-5)

(RG-6)

(RG-7)

(RG-8)

(RG-9)

[12] The optically isotropic liquid crystal composition according to any one of items [5] to [11], wherein the liquid crystal component C comprises a compound represented by general formula (2),

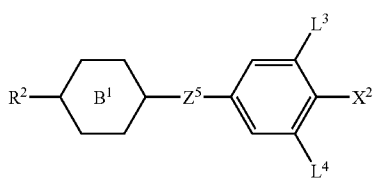
(2)

and wherein in the formula:

$R^2$ is alkyl having 1 to 10 carbon atoms or alkynyl having 2 to 10 carbon atoms, wherein any hydrogen in the alkyl and the alkynyl can be replaced by fluorine; and any —$CH_2$— can be replaced by —O—;

$X^2$ is fluorine, chlorine, —$SF_5$, —$OCF_3$, —$OCHF_2$, —$CF_3$, —$CHF_2$, —$CH_2F$, —$OCF_2CHF_2$ or —$OCF_2CHFCF_3$;

Ring $B^1$ is 1,4-cyclohexylene, 1,3-dioxane-2,5-diyl, pyrimidine-2,5-diyl, tetrahydropyran-2,5-diyl, piperidine-1,4-diyl, 1,4-phenylene, naphthalene-2,6-diyl, or 1,4-phenylene or naphthalene-2,6-diyl in which any hydrogen is replaced by fluorine or chlorine;

$Z^5$ is —$(CH_2)_2$—, —$(CH_2)_4$—, —COO—, —$CF_2O$—, —$OCF_2$—, —CH=CH—, —C≡C—, —$CH_2O$— or a single bond; and $L^3$ and $L^4$ are each independently hydrogen or fluorine.

[13] The optically isotropic liquid crystal composition according to any one of items [5] to [11], wherein the liquid crystal component C comprises at least one compound selected from the group consisting of compounds represented by general formula (6),

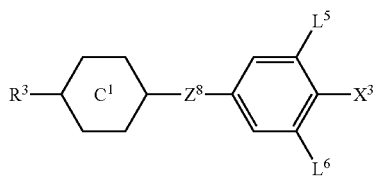
(6)

and wherein in the formula:

$R^3$ is alkyl having 1 to 10 carbon atoms, wherein any hydrogen in the alkyl can be replaced by fluorine; and any —$CH_2$— can be replaced by —O—;

$X^3$ is —C≡N or —C≡C—C≡N;

Ring $C^1$ is 1,4-cyclohexylene, 1,4-phenylene, naphthalene-2,6-diyl, 1,3-dioxane-2,5-diyl, tetrahydropyran-2,5-diyl, pyrimidine-2,5-diyl, or 1,4-phenylene or naphthalene-2,6-diyl in which any hydrogen is replaced by fluorine;

$Z^8$ is —$(CH_2)_2$—, —COO—, —$CF_2O$—, —$OCF_2$—, —C≡C—, —$CH_2O$— or a single bond; and $L^5$ and $L^6$ are each independently hydrogen or fluorine.

[14] The optically isotropic liquid crystal composition according to any one of items [5] to [13], wherein the liquid crystal component D comprises at least one compound selected from the group consisting of compounds represented by general formulae (7) to (9),

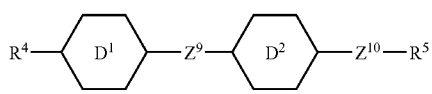
(7)

(8)

(9)

and wherein in the formulae:

$R^4$ and $R^5$ are each independently alkyl having 1 to 10 carbon atoms or alkenyl having 2 to 10 carbon atoms, wherein any one of hydrogen in the alkyl and the alkenyl can be replaced by one fluorine; and any —$CH_2$— in the alkyl and the alkenyl can be replaced by —O—;

Ring D¹, Ring D² and Ring D³ are each independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^9$ and $Z^{10}$ are each independently —C≡C—, —COO—, —(CH$_2$)$_2$—, —CH=CH— or a single bond.

[15] The optically isotropic liquid crystal composition according to any one of items [1] to [14], wherein in the liquid crystal component, the difference between the upper limit and the lower limit of a temperature allowing coexistence of a nematic phase and a non-liquid crystalline isotropic phase is approximately 3° C. to approximately 150° C.

[16] The optically isotropic liquid crystal composition according to any one of items [1] to [15], comprising the chiral dopants in an amount of approximately 1 to approximately 40 wt % of the total weight of the liquid crystal composition.

[17] The optically isotropic liquid crystal composition according to any one of items [1] to [15], comprising the chiral dopants in an amount of approximately 5 to approximately 15 wt % of the total weight of the liquid crystal composition.

[18] The optically isotropic liquid crystal composition according to any one of items [1] to [17], wherein the chiral dopants comprise one or more compounds represented by any one of the following formulae (K1) to (K5),

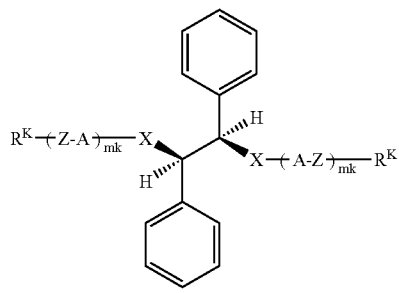
(K1)

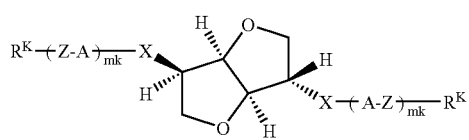
(K2)

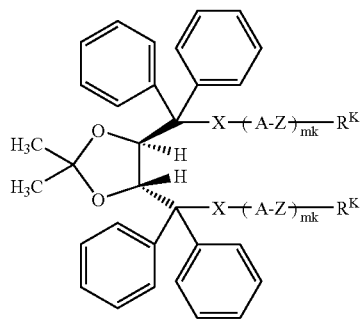
(K3)

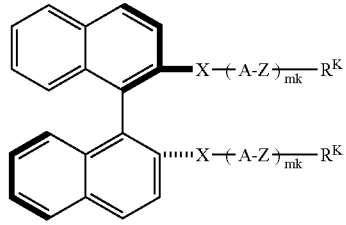
(K4)

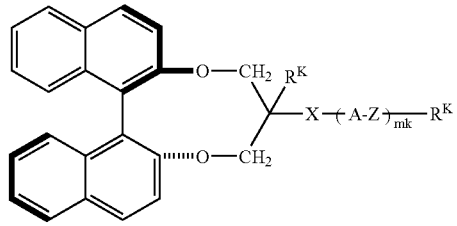
(K5)

and wherein in formulae (K1) to (K5):

each $R^K$ is independently hydrogen, halogen, —C≡N, —N=C=O, —N=C=S or alkyl having 1 to 20 carbon atoms, wherein any —CH$_2$— in the alkyl can be replaced by —O—, —S—, —COO—, —OCO—, —CH=CH—, —CF=CF— or —C≡C—; and any hydrogen in the alkyl can be replaced by halogen;

each A is independently an aromatic or nonaromatic 3- to 8-membered ring or a condensed ring having 9 or more carbon atoms, wherein any hydrogen in these rings can be replaced by halogen, alkyl having 1 to 3 carbon atoms or haloalkyl; —CH$_2$— in the rings can be replaced by —O—, —S— or —NH—; and —CH= in the rings can be replaced by —N=;

each Z is independently a single bond or alkylene having 1 to 8 carbon atoms, wherein any —CH$_2$— in the alkylene can be replaced by —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C—; and any hydrogen in the alkylene can be replaced by halogen;

each X is independently a single bond, —COO—, —CH$_2$O—, —CF$_2$O—, —OCO—, —OCH$_2$—, —OCF$_2$— or —CH$_2$CH$_2$—; and each mK is independently an integer from 1 to 4.

[19] The optically isotropic liquid crystal composition according to any one of items [1] to [17], wherein the chiral dopants comprise one or more compounds represented by any one of the following formulae (K2-1) to (K2-8) and (K5-1) to (K5-3),

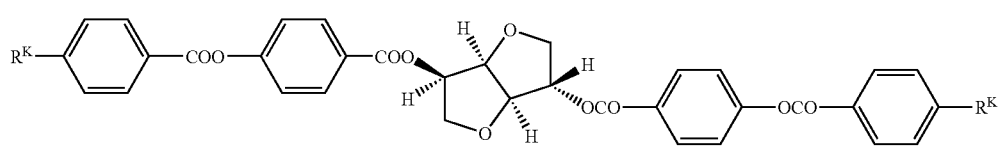
(K2-1)

-continued
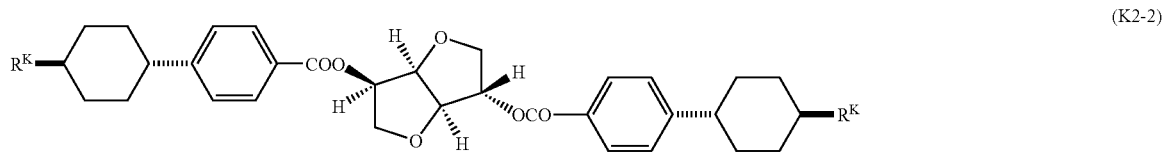
(K2-2)
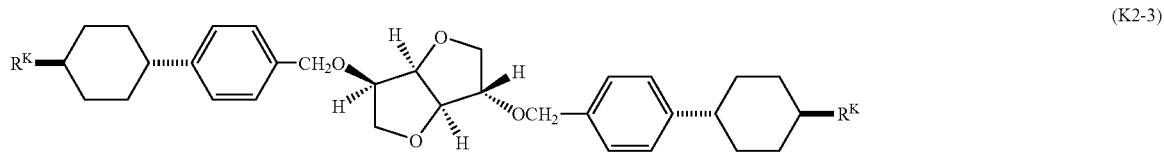
(K2-3)
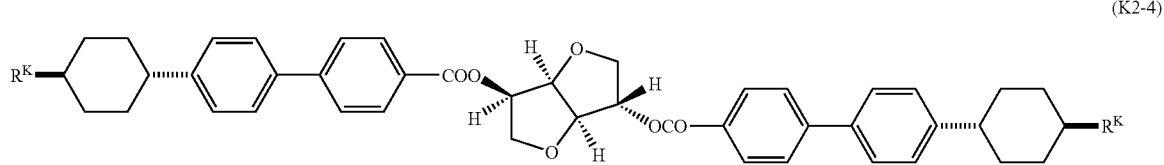
(K2-4)
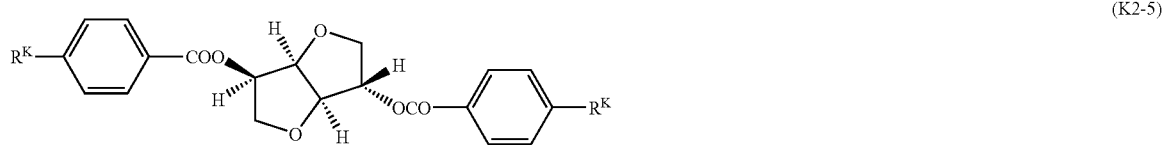
(K2-5)
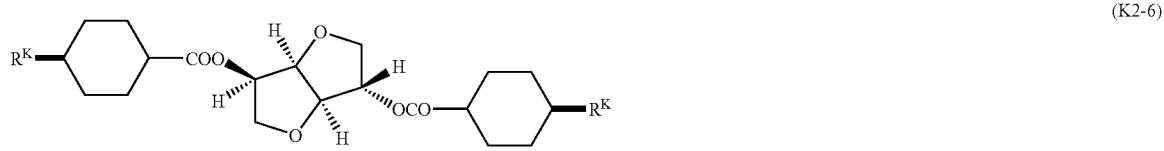
(K2-6)
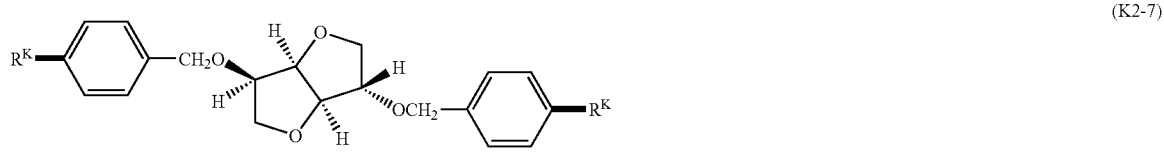
(K2-7)
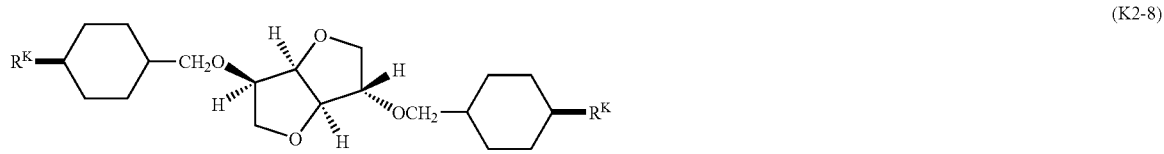
(K2-8)
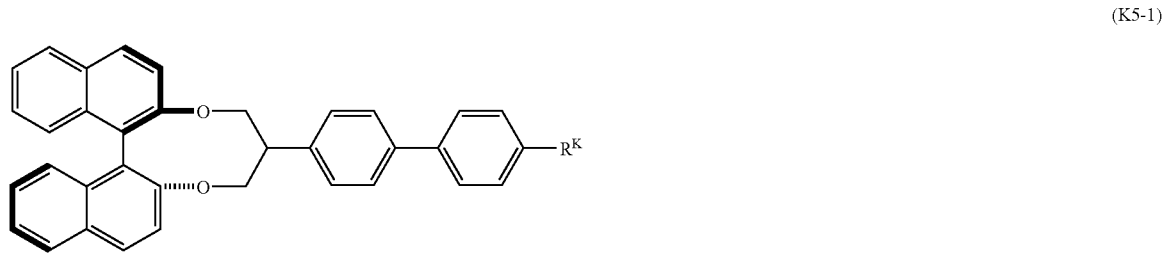
(K5-1)
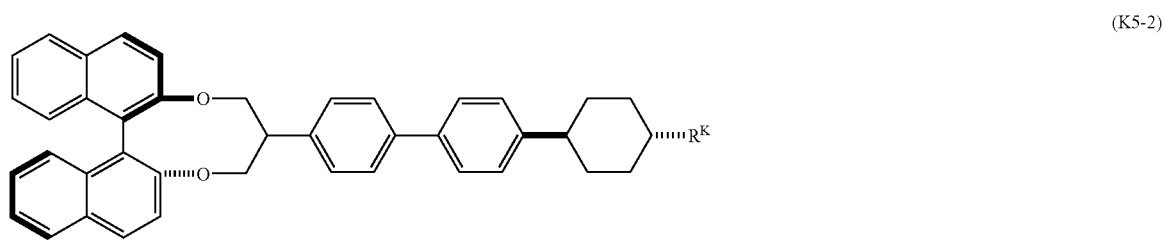
(K5-2)

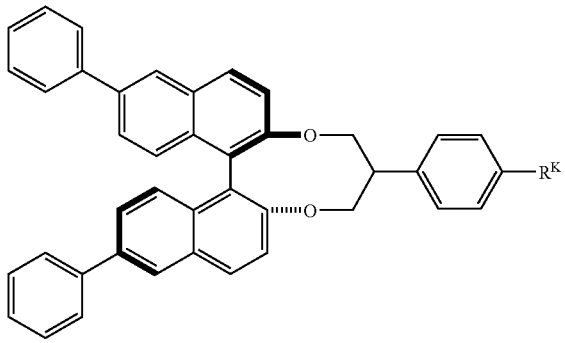

(K5-3)

and wherein in formulae (K2-1) to (K2-8) and (K5-1) to (K5-3):

each $R^K$ is independently alkyl having 1 to 10 carbon atoms, wherein —$CH_2$— adjacent to the ring in the alkyl can be replaced by —O—; and any —$CH_2$— in the alkyl can be replaced by —CH=CH—.

[20] The optically isotropic liquid crystal composition according to any one of items [1] to [19], further comprising one or more agents selected from the group consisting of antioxidants and ultraviolet absorbers.

[21] The optically isotropic liquid crystal composition according to any one of items [1] to [20], wherein an optically isotropic liquid crystal phase does not show diffracted light with two or more colors.

[22] The optically isotropic liquid crystal composition according to any one of items [1] to [20], wherein an optically isotropic liquid crystal phase shows diffracted light with two or more colors.

[23] The optically isotropic liquid crystal composition according to any one of items [1] to [22], which exhibits a chiral nematic phase at approximately −20° C. to approximately 70° C., and wherein in at least a part of the temperature range, the spiral pitch is approximately 700 nm or less.

[24] A mixture comprising the optically isotropic liquid crystal composition according to any one of items [1] to [23] and a polymerizable monomer.

[25] The mixture according to item [24], wherein the polymerizable monomer is a photopolymerizable monomer or a thermopolymerizable monomer.

[26] A polymer/liquid crystal composite for use in an element driven in a state of an optically isotropic liquid crystal phase, which can be obtained by polymerizing the mixture according to item [24] or [25].

[27] A polymer/liquid crystal composite for use in an element driven in a state of an optically isotropic liquid crystal phase, which can be obtained by polymerizing the mixture according to item [24] or [25] in a state of a non-liquid crystalline isotropic phase or the optically isotropic liquid crystal phase.

[28] The polymer/liquid crystal composite according to item [26] or [27], wherein a polymer included in the polymer/liquid crystal composite has a mesogenic moiety.

[29] The polymer/liquid crystal composite according to any one of items [26] to [28], wherein the polymer included in the polymer/liquid crystal composite has a cross-linked structure.

[30] The polymer/liquid crystal composite according to any one of items [26] to [29], comprising the liquid crystal composition in an amount of approximately 60 to approximately 99 wt % and the polymer in an amount of approximately 1 to approximately 40 wt %.

[31] A liquid crystal element, in which an electrode is placed on one or both surfaces thereof, and which has a liquid crystal composition or a polymer/liquid crystal composite placed between substrates and an electric field applying means for applying electric field on the liquid crystal composition or the polymer/liquid crystal composite via the electrode, wherein the liquid crystal composition is that according to any one of items [1] to [23], and wherein the polymer/liquid crystal composite is that according to any one of items [26] to [30].

[32] A liquid crystal element, in which an electrode is placed on one or both surfaces thereof, and which has: a pair of substrates, at least one of which is transparent; a liquid crystal composition or a polymer/liquid crystal composite placed between the substrates; and polarization plates placed on the external sides of the substrates, and which has an electric field applying means for applying electric field on the liquid crystal composition or the polymer/liquid crystal composite via the electrode, wherein the liquid crystal composition is that according to any one of items [1] to [23], and the polymer/liquid crystal composite is that according to any one of items [26] to [30].

[33] The liquid crystal element according to item [31] or [32], wherein the electrode is constituted on at least one of the pair of substrates so that electric field can be applied in at least two directions.

[34] The liquid crystal element according to item [31] or [32], wherein the electrode is constituted on one or both of the pair of substrates placed in parallel with each other so that electric field can be applied in at least two directions.

[35] The liquid crystal element according to any one of items [31] to [34], wherein: the electrode is placed in a matrix state to constitute a pixel electrode; each pixel has an active element; and the active element is a thin film transistor (TFT).

The term "liquid crystal compound" as used herein is the general term for compounds having a liquid crystal phase such as a nematic phase, a smectic phase and the like and compounds which do not have any liquid crystal phase but are useful as a component of a liquid crystal composition. The terms "liquid crystal compound," "liquid crystal composition" and "liquid crystal display element" are sometimes abbreviated as "compound," "composition" and "element," respectively.

The term "liquid crystal element" as used herein is the general term for liquid crystal display panels and liquid crystal display modules. The upper limit temperature of a nematic phase is the nematic phase-isotropic phase transition temperature, which is sometimes just abbreviated as "clearing point" or "upper limit temperature". The lower limit temperature of the nematic phase is sometimes just abbreviated as "lower limit temperature".

In the specification, compounds represented by formula (1) are sometimes abbreviated as Compound (1). The same sometimes applies to compounds represented by formula (2), etc. In chemical formulae, characters such as A, B, etc. surrounded by a hexagonal shape correspond to a ring structure A, a ring structure B, etc., respectively, which are sometimes abbreviated as "Ring A", "Ring B", etc. The term "ring structure" refers to a cyclic group, and examples thereof include a benzene ring, a naphthalene ring, a cyclohexene ring, a bicyclooctane ring and a cyclohexane ring. In this regard, a ring structure including a plurality of rings, such as condensed polycyclic hydrocarbon (e.g., a naphthalene ring) and bridged cyclic hydrocarbon (e.g., a bicyclooctane ring), is counted as one ring structure.

Each of characters such as Ring $A^1, Y^1$, B, etc. is repeatedly used in the identical formula or different formulae, and such repeatedly-used characters may have the same or different meaning.

The term "any" means that not only the position but also the number is arbitrary, but the case where the number is 0 is not included therein. The expression like "any A can be replaced by B, C or D" is intended to include the case where any A is replaced by B, the case where any A is replaced by C, the case where any A is replaced by D, and the case where a plurality of As are replaced by at least 2 of B to D. For example, alkyls in which any —$CH_2$— can be replaced by —O— or —CH=CH— include alkyl, alkenyl, alkoxy, alkoxyalkyl, alkoxyalkenyl, alkenyloxyalkyl and the like. Note that in the invention, the case where consecutive 2 —$CH_2$— are replaced by —O— to form —O—O— is undesirable. Further, the case where —$CH_2$— at the end of alkyl is replaced by —O— is also undesirable.

In the specification, "%" means "wt %" unless otherwise specified.

The optically isotropic liquid crystal composition and the polymer/liquid crystal composite related to the preferred embodiment of the invention exhibit a relatively large Kerr constant. The response time of the optically isotropic liquid crystal composition and the polymer/liquid crystal composite related to the preferred embodiment of the invention is short. The optically isotropic liquid crystal composition and the polymer/liquid crystal composite related to the preferred embodiment of the invention can be used in a wide temperature range.

Further, based on there effects, the optically isotropic liquid crystal composition and the polymer/liquid crystal composite related to the preferred embodiment of the invention can be suitably used in liquid crystal elements (e.g., display elements), etc.

BRIEF DESCRIPTION OF THE DRAWINGS

The accompanying drawing, which is included to provide a further understanding of the invention and is incorporated in and constitutes a part of this specification, illustrates embodiments of the invention and together with the description serves to explain the principles of the invention.

BEST MODE FOR CARRYING OUT THE INVENTION

Figure 1:
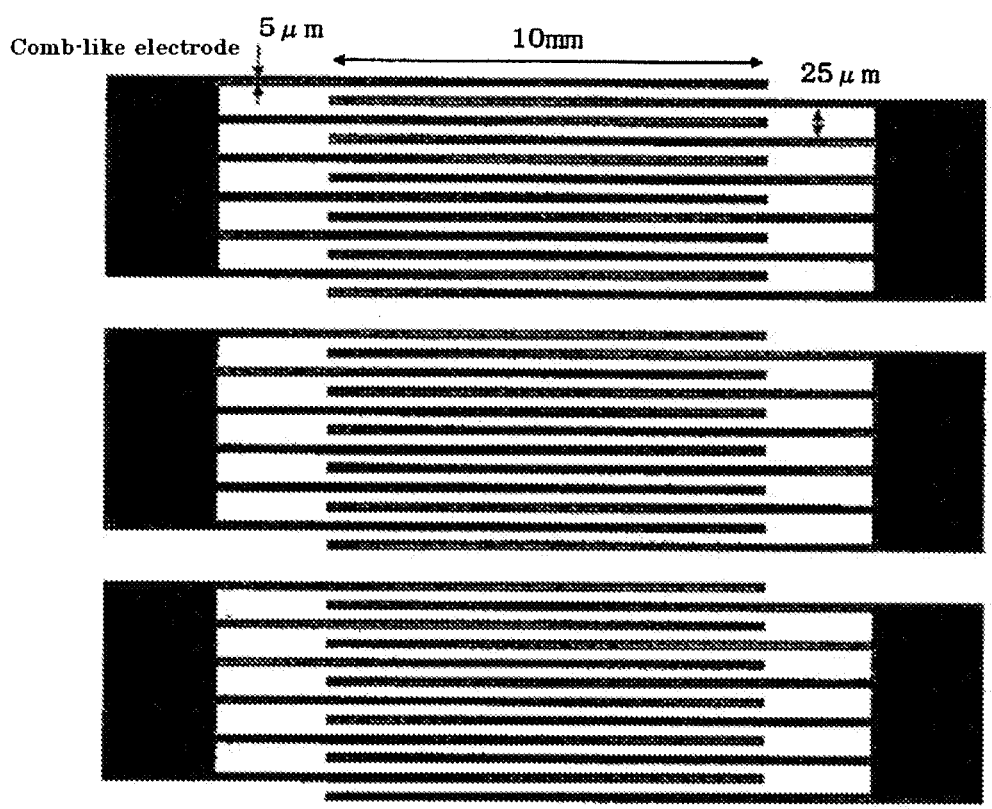
FIG. 1 shows a comb-like electrode substrate.

1. Optically Isotropic Liquid Crystal Composition of the Invention

The first embodiment of the invention is a liquid crystal composition, which exhibits an optically isotropic liquid crystal phase, and which can be used in a liquid crystal element driven in a state of an optically isotropic liquid crystal phase.

The optically isotropic liquid crystal composition of the invention is a liquid crystal composition having: a liquid crystal component comprising a liquid crystal component A consisting of compounds represented by the above-described formula (1-1) having difluoroalkenyl or compounds represented by the above-described formula (1-2) having alkenyl; and chiral dopants. In the liquid crystal component comprising the liquid crystal component A, the content of compounds having 3 or more ring structures is approximately 15 wt % or more. From the viewpoint of the upper limit of the liquid crystal phase and drive voltage, the content of the compounds having 3 or more ring structures is preferably approximately 30 wt % or more, and more preferably approximately 50 wt % or more.

In general, the Kerr constant of the compounds represented by formula (1-1) or (1-2) can be increased by increasing the value of $\Delta n \times \Delta \epsilon \times K_{33}/K_{11}$. Therefore, the compounds are useful as component for decreasing drive voltage of a composition driven in a state of an optically isotropic liquid crystal phase. Accordingly, in general, the compounds are preferably contained in the optically isotropic liquid crystal composition as much as possible.

Each of the compounds represented by formulae (1-1) and (1-2) has a double bond at the left end of its structural formula, but does not act as a polymerizable monomer.

Compounds contained in the liquid crystal composition of the invention are generally synthesized by a known method, e.g., a method for reacting necessary components at a high temperature.

Further, regarding each element in compounds constituting the liquid crystal composition used in the invention, an analog consisting of an isotope of the element can be used as long as there is no significant difference of physical properties.

1.1. Optically Isotropic Liquid Crystal Phase

The liquid crystal composition of the invention is optically isotropic. In this regard, the matter that the liquid crystal composition has optical isotropy means that optical isotropy is shown since liquid crystal molecular alignment is macroscopically isotropic, but liquid crystalline order is microscopically present.

Further, the term "optically isotropic liquid crystal phase" as used herein refers to a phase which exhibits an optically isotropic (not fluctuant) liquid crystal phase. Examples thereof include a phase which exhibits a platelet texture (blue phase in a limited sense).

Regarding the optically isotropic liquid crystal composition of the invention, a platelet texture, which is typically found in a blue phase, is sometimes not observed in a liquid crystal phase by means of a polarization microscope though it is optically isotropic. For this reason, in the specification, phases which exhibit a platelet texture are referred to as "blue phase", and optically isotropic liquid crystal phases including blue phases are referred to as "optically isotropic liquid crystal phase". That is, in the specification, the blue phase is included in the optically isotropic liquid crystal phase.

In general, the blue phase is classified into three types (blue phase I, blue phase II and blue phase III). All of the three types of blue phases are optically active and isotropic. In the blue phases I and II, 2 or more types of diffracted lights attributed to Bragg reflections from different lattice planes are observed.

A state in which an optically isotropic liquid crystal phase does not show 2 or more types of diffracted lights means that a platelet texture, which is observed in blue phases I and II, is not observed in the phase, and that the phase is generally in one color. In optically isotropic liquid crystal phases which do not show 2 or more types of diffracted lights, uniformity of color tone is not required.

Optically isotropic liquid crystal phases which do not show 2 or more types of diffracted lights have the advantages that the intensity of reflected light caused by Bragg reflection is suppressed and that it is shifted to the low-wavelength side.

Further, the problem of color is sometimes raised when a liquid crystal material which reflects visible light is utilized as a display element. However, in the case of liquid crystal which does not show 2 or more types of diffracted lights, reflection wavelength is shifted to the low-wavelength side, and therefore reflection of visible light is allowed to disappear with a pitch that is longer than that of the blue phase in the limited sense (a phase which exhibits a platelet texture).

Regarding the liquid crystal composition of the invention, the range of temperature at which optically isotropic properties are exhibited can be broadened by adding chiral dopants to a liquid crystal composition with a wide range of temperature allowing coexistence of a nematic phase or a chiral nematic phase and an isotropic phase to exhibit an optically isotropic liquid crystal phase. For example, a composition which exhibits an optically isotropic liquid crystal phase in a wide temperature range can be prepared by mixing a liquid crystal compound having a high clearing point with a liquid crystal compound having a low clearing point to prepare a liquid crystal composition in which the range of temperature allowing coexistence of a nematic phase and an isotropic phase is wide in a wide temperature range, and by adding chiral dopants to the liquid crystal composition.

The pitch based on the liquid crystalline order, which the optically isotropic liquid crystal composition of the invention microscopically has (hereinafter sometimes referred to as just "pitch"), is preferably approximately 700 nm or less, more preferably approximately 500 nm or less, and particularly preferably approximately 350 nm or less.

The longer the pitch, the higher the electric birefringence of the optically isotropic liquid crystal phase. Therefore, the electric birefringence can be increased by adjusting the types and the contents of chiral dopants to set a longer pitch as long as desired optical properties (transmission rate, diffracted wavelength, etc.) can be obtained.

The term "non-liquid crystalline isotropic phase" as used herein means a generally-defined isotropic phase, i.e., a disordered phase, wherein, if the phase is generated by a region whose local order parameter is not zero, the cause thereof is fluctuation. For example, an isotropic phase which is exhibited in the high temperature side of the nematic phase corresponds to the non-liquid crystalline isotropic phase in the specification. The same definition is applied to the chiral liquid crystal in the specification.

1.2. Liquid Crystal Component A

The optically isotropic liquid crystal composition of the invention has, as an essential component, a liquid crystal component A consisting of compounds having difluoroalkenyl (1-1) or compounds having alkenyl (1-2).

The liquid crystal component A may be constituted only by compounds represented by formula (1-1) or compounds represented by formula (1-2), or may be constituted by both compounds represented by formula (1-1) and compounds represented by formula (1-2).

(1) Compounds (1-1) and Compounds (1-2)

In the above-described formula (1-2), $R^1$ is alkenyl having 2 to 20 carbon atoms, wherein any —$CH_2$— in the alkenyl can be replaced by —O—, —S—, —COO—, —OCO—, —CH=CH—, or —C≡C—, and any hydrogen in the alkenyl group can be replaced by halogen.

$R^1$ is preferably linear rather than branched. However, $R^1$, which is a branched group and has optical activity, is preferable. The preferred configuration of —CH=CH— in the alkenyl depends on the position of a double bond. In the case of alkenyl having a double bond at an odd-numbered position such as —CH=CHCH$_3$, —CH=CHC$_2$H$_5$, —CH=CHC$_3$H$_7$, —CH=CHC$_4$H$_9$, —C$_2$H$_4$CH=CHCH$_3$ and —C$_2$H$_4$CH=CHC$_2$H$_5$, trans-configuration is preferable. In the case of alkenyl having a double bond at an even-numbered position such as —CH$_2$CH=CHCH$_3$, —CH$_2$CH=CHC$_2$H$_5$ and —CH$_2$CH=CHC$_3$H$_7$, cis-configuration is preferable. An alkenyl compound having a preferable configuration has a high upper limit of temperature or a wide temperature range of liquid crystal phase. Mol. Cryst. Liq. Cryst., 1985, 131, 109 and Mol. Cryst. Liq. Cryst., 1985, 131, 327 describe the matter in detail.

Among alkenyls having 2 to 20 carbon atoms, groups represented by the above-described formulae (CHN-1) to (CHN-12) are preferable for $R^1$.

In formula (1-2), when Ring $A^1$ is an aromatic ring, $R^1$ is preferably a group represented by any formula selected from the group consisting of formulae (CHN-3), (CHN-4) and (CHN-6) to (CHN-8). When Ring $A^1$ is a nonaromatic ring, $R^1$ is preferably a group represented by any formula selected from the group consisting of formulae (CHN-1) to (CHN-6).

In the above-described formulae (1-1) and (1-2), Ring $A^1$, Ring $A^2$, Ring $A^3$ and Ring $A^4$ are each independently a benzene ring, a naphthalene ring, a cyclohexene ring, a bicyclooctane ring or a cyclohexane ring, wherein any hydrogen in these rings can be replaced by halogen; —CH$_2$— in the rings can be replaced by —O— or —S—; and —CH= can be replaced by —N=.

Preferably, Ring $A^1$, Ring $A^2$, Ring $A^3$ and Ring $A^4$ are each independently a ring represented by any formula selected from the group consisting of the above-described formulae (RG-1) to (RG-9).

Among these rings, preferably, Ring $A^1$, Ring $A^2$, Ring $A^3$ and Ring $A^4$ are each independently a ring represented by the above-described formula (RG-1), (RG-3), (RG-4), (RG-5) or (RG-8).

In the above-described formula (1-1), $Z^0$ is a single bond or alkylene having 1 to 20 carbon atoms, wherein any —CH$_2$— in the alkylene can be replaced by —O—, —S—, —COO—, —OCO—, —CSO—, —OCS—, —CH=CH—, —CF=CF— or —C≡C—; and any hydrogen can be replaced by halogen.

In formula (1-1), when Ring $A^1$ is an aromatic ring, $Z^0$ is preferably alkylene or alkenylene having 2, 4, 6 or 8 carbon atoms (in this regard, Ring $A^1$ is not adjacent to a double bond). Further, in formula (1-1), when Ring $A^1$ is a nonaromatic ring, $Z^0$ is preferably alkylene or alkenylene having 2, 4, 6 or 8 carbon atoms.

In the above-described formulae (1-1) and (1-2), $Z^1$, $Z^2$, $Z^3$ and $Z^4$ are each independently a single bond or alkylene having 1 to 4 carbon atoms, wherein any —CH$_2$— in the alkylene can be replaced by —O—, —S—, —COO—, —OCO—, —CSO—, —OCS—, —CH=CH—, —CF=CF— or —C≡C—; and any hydrogen can be replaced by halogen.

Preferably, $Z^1$, $Z^2$, $Z^3$ and $Z^4$ are each independently a single bond, —CH$_2$CH$_2$—, —CH=CH—, —C≡C—, —COO—, —CF$_2$O—, —CH$_2$O— or —OCH$_2$—. Among them, a single bond, —COO— or —CF$_2$O— is preferable.

Further, in such binding, configuration of a binding group having a double bond such as —CH=CH—, —CF=CF—, —CH=CH—(CH$_2$)$_2$— and —(CH$_2$)$_2$—CH=CH— is preferably trans-configuration rather than cis-configuration.

In the above-described formulae (1-1) and (1-2), $L^1$ and $L^2$ are each independently hydrogen or halogen. Among them, preferably, $L^1$ and $L^2$ are each independently hydrogen or fluorine.

In the above-described formulae (1-1) and (1-2), $X^1$ is halogen, —C≡N, —N=C=S, —C≡C—C≡N, —SF$_5$, —CHF$_2$, —CF$_3$, —CF$_2$CH$_2$F, —CF$_2$CHF$_2$, —CF$_2$CF$_3$, —(CF$_2$)$_3$—F, —CF$_2$CHFCF$_3$, —CHFCF$_2$CF$_3$, —(CF$_2$)$_4$—F, —(CF$_2$)$_5$—F, —OCHF$_2$, —OCF$_3$, —OCF$_2$CH$_2$F, —OCF$_2$CHF$_2$, —OCH$_2$CF$_3$, —OCF$_2$CF$_3$, —O—(CF$_2$)$_3$—F, —OCF$_2$CHFCF$_3$, —OCHFCF$_2$CF$_3$, —O—(CF$_2$)$_4$—F, —O—(CF$_2$)$_5$—F, —CH=CF$_2$, —CH=CHCF$_3$ or —CH=CHCF$_2$CF$_3$.

Preferred examples of $X^1$ include fluorine, chlorine, —C≡N, —N=C=S, —CF$_3$, —CHF$_2$, —OCF$_3$ and —OCHF$_2$. Among them, fluorine, chlorine, —C≡N, —N=C=S, —CF$_3$ and —OCF$_3$ are most preferable.

In formulae (1-1) and (1-2), l, m, n and o are each independently 0 or 1.

As the compounds represented by the above-described formula (1-1), compounds represented by the following formulae (1-1a) to (1-1g) are particularly preferable,

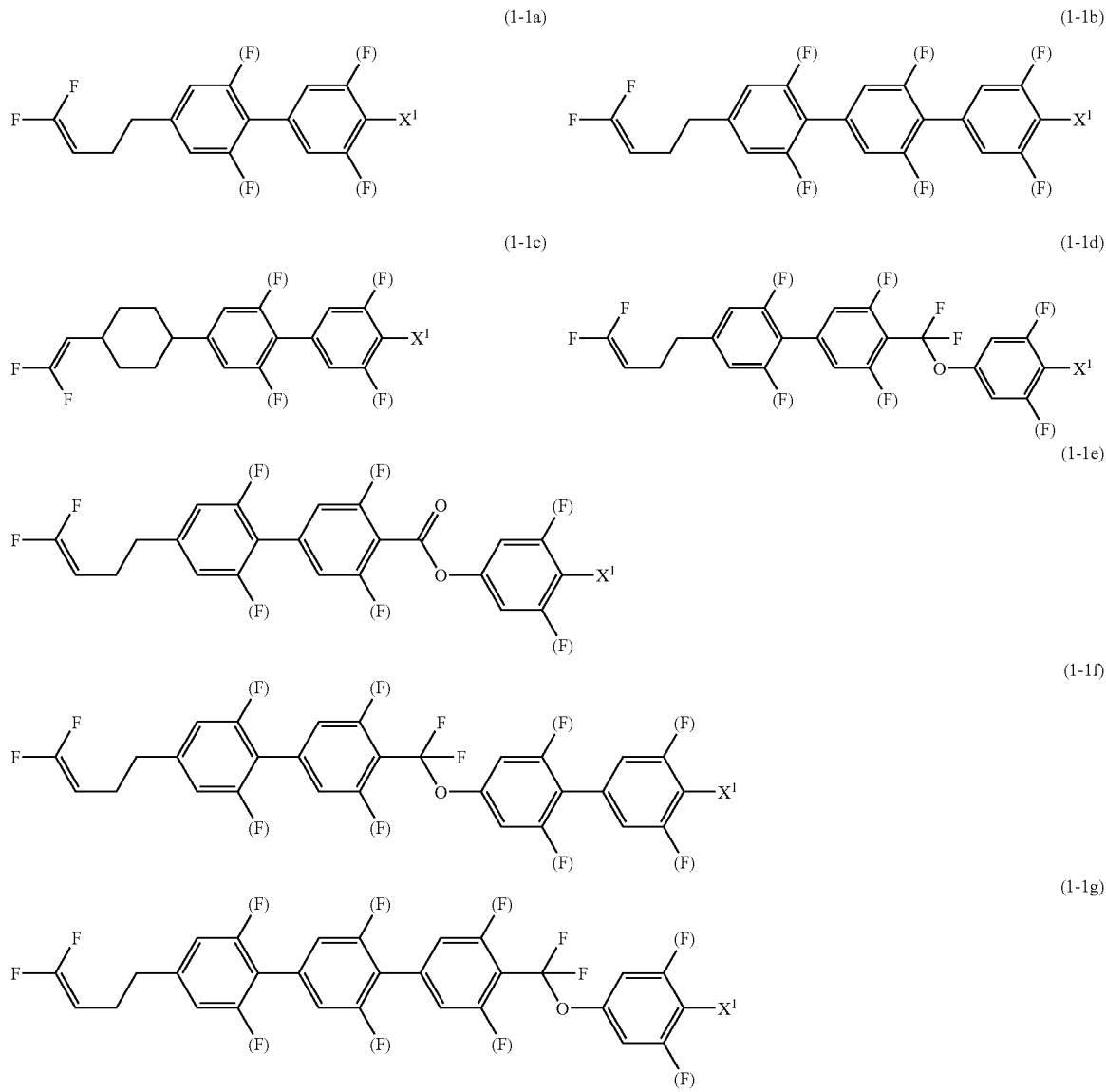

wherein in formula (1-1a) to (1-1g), $X^1$ is fluorine, chlorine, —C≡N, —$CF_3$, —$CHF_2$, —$CH_2F$, —$OCF_3$, —$OCHF_2$, —$OCH_2F$ or —C≡C—$CF_3$, and (F) represents hydrogen or fluorine.

As the compounds represented by the above-described formula (1-2), compounds represented by the following formulae (1-2a) to (1-2g) are particularly preferable,

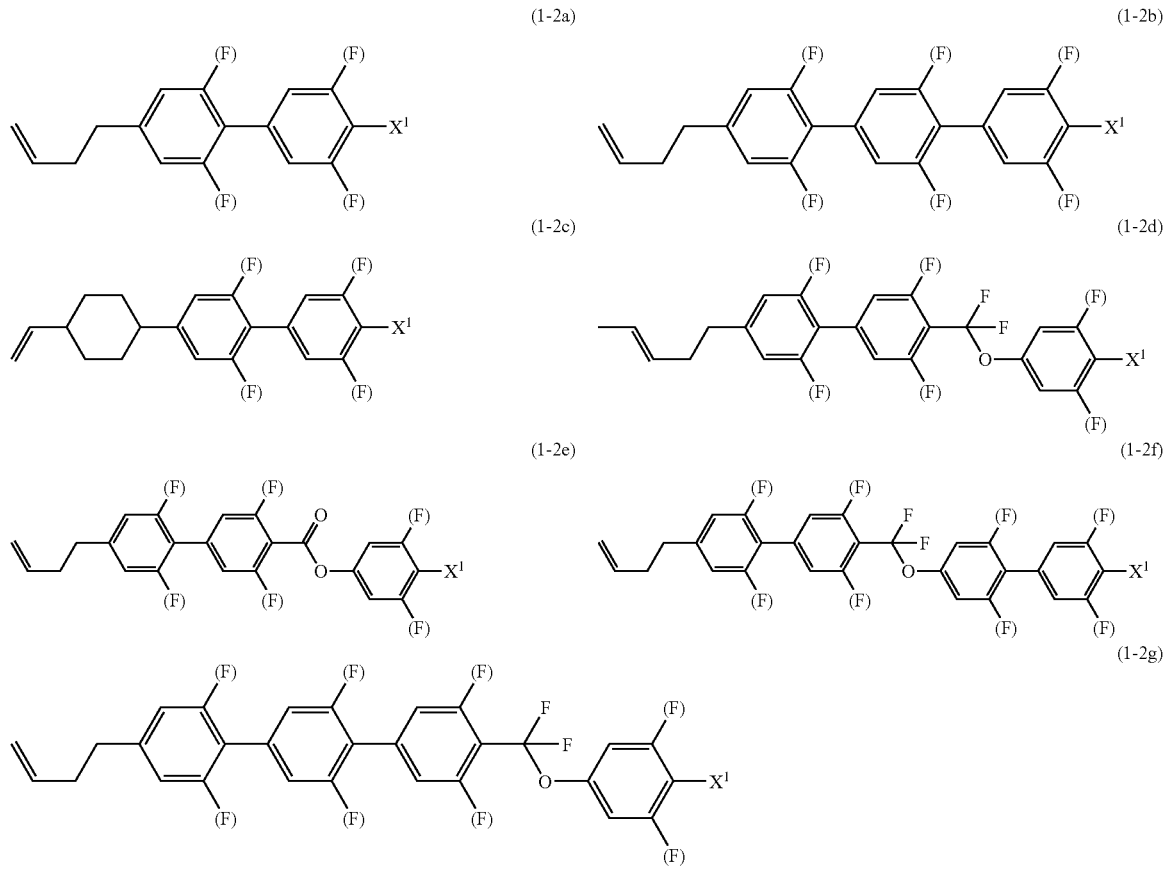

wherein in formulae (1-2a) to (1-2g), $X^1$ is fluorine, chlorine, —C≡N, —$CF_3$, —$CHF_2$, —$CH_2F$, —$OCF_3$, —$OCHF_2$, —$OCH_2F$ or —C≡C—$CF_3$, and (F) represents hydrogen or fluorine.

(2) Properties of Compounds (1-1) and (1-2)

Physical properties of the liquid crystal component A such as clearing point, optical anisotropy and dielectric anisotropy can be adjusted by suitably selecting combination of l, m, n and o in the compounds (1-1) and (1-2), types of Rings $A^1$ to $A^4$, $Z^0$, terminal group $R^1$, a group on a terminal benzene ring and its substitution position ($L^1$, $L^2$ and $X^1$), binding groups $Z^1$ to $Z^4$, etc.

The general relationship between physical properties of the compounds (1-1) and (1-2) and combination of l, m, n and o, types of Rings $A^1$ to $A^4$, $Z^0$, the terminal group $R^1$, the terminal group $X^1$, the binding groups $Z^1$ to $Z^4$, $L^1$ and $L^2$, etc. will be described below.

In general, the larger the value of l+m+n+o, the higher the clearing point of the compounds (1-1) and (1-2), and the smaller the value of l+m+n+o, the lower the melting point of the compounds (1-1) and (1-2).

In general, the larger the number of aromatic rings contained in Rings $A^1$ to $A^4$, the larger the optical anisotropy of the compounds (1-1) and (1-2). 1,4-phenylene in which any hydrogen is replaced by halogen, a pyrimidine ring, a pyridine ring, a tetrahydropyran ring and 1,3-dioxane-2,5-diyl are effective for exhibiting large dielectric anisotropy. A cyclohexane ring and a tetrahydropyran ring contribute to exhibition of good compatibility of the compounds (1-1) and (1-2).

In general, when both $Z^0$ and $R^1$ are linear, the temperature range of liquid crystal phase of the compounds (1-1) and (1-2) is wide and the viscosity thereof is small. When both $Z^0$ and $R^1$ are branched, the compatibility of the compounds (1-1) and (1-2) with other liquid crystal compounds is improved.

In general, when the binding groups $Z^1$, $Z^2$, $Z^3$ and $Z^4$ are each independently a single bond, —$CH_2CH_2$—, —CH=CH—, —$CF_2O$—, —$OCF_2$—, —$CH_2O$—, —$OCH_2$—, —CF=CF—, —$(CH_2)_3$—O—, —O—$(CH_2)_3$—, —$(CH_2)_2$—$CF_2O$—, —$OCF_2$—$(CH_2)_2$— or —$(CH_2)_4$—, the viscosity of the compounds (1-1) and (1-2) is small. Further, in general, when the binding groups $Z^1$, $Z^2$, $Z^3$ and $Z^4$ are each independently a single bond, —$(CH_2)_2$—, —$CF_2O$—, —$OCF_2$— or —CH=CH—, the viscosity of the compounds (1-1) and (1-2) is smaller. In general, when the binding groups $Z^1$, $Z^2$, $Z^3$ and $Z^4$ are each independently —C≡C—, the optical anisotropy of the compounds (1-1) and (1-2) is large. In general, when the binding groups are —COO— or —$CF_2O$—, the dielectric anisotropy of the compounds (1-1) and (1-2) is large. In general, when $Z^1$, $Z^2$, $Z^3$ and $Z^4$ are each independently a single bond, —$(CH_2)_2$—, —$CH_2O$—, —$CF_2O$—, —$OCF_2$— or —$(CH_2)_4$—, the compounds (1-1) and (1-2) are relatively chemically stable, and deterioration thereof does not easily occur.

In general, when the optical anisotropy or the dielectric anisotropy of the compounds (1-1) and (1-2) is large, the liquid crystal element of the invention tends to be driven at a low voltage, and when the viscosity of the compounds (1-1) and (1-2) is low, the response time is short.

In general, when $X^1$ is fluorine, chlorine, —C≡N, —N═C═S, —SF$_5$, —CF$_3$, —CHF$_2$, —CH$_2$F, —OCF$_3$, —OCHF$_2$ or —OCH$_2$F, the dielectric anisotropy of the compounds (1-1) and (1-2) is large. Further, in general, when $X^1$ is —C≡N or —N═C═S, the optical anisotropy of the compounds (1-1) and (1-2) is large. When $X^1$ is fluorine, —OCF$_3$ or alkyl, the compounds (1-1) and (1-2) are chemically stable.

In general, when both $L^1$ and $L^2$ are fluorine and $X^1$ is fluorine, chlorine, —C≡N, —N═C═S, —SF$_5$, —CF$_3$, —CHF$_2$, —CH$_2$F, —OCF$_3$, —OCHF$_2$ or —OCH$_2$F, the dielectric anisotropy of the compounds (1-1) and (1-2) is large. Further, in general, when $L^1$ is fluorine and $X^1$ is —CF$_3$ or —OCF$_3$, or when both $L^1$ and $L^2$ are fluorine and $X^1$ is —CF$_3$ or —OCF$_3$, or when $L^1$, $L^2$ and $X^1$ are all fluorine, the dielectric anisotropy of the compounds (1-1) and (1-2) is large, and the temperature range of liquid crystal phase of the compounds (1-1) and (1-2) is wide, and in addition, the compounds (1-1) and (1-2) are chemically stable and deterioration thereof is not likely to occur.

1.3. Liquid Crystal Component B

The optically isotropic liquid crystal composition of the invention may further comprise a liquid crystal component B, which consists of compounds (1-3).

(1) Compounds (1-3)

In formula (1-3), Ring $A^1$, Ring $A^2$, Ring $A^3$, Ring $A^4$, $Z^1$, $Z^2$, $Z^3$, $Z^4$, $L^1$, $L^2$, $X^1$, l and m are the same as those in the compounds (1-1) and the compounds (1-2).

Further, $R^2$ is hydrogen or alkyl having 1 to 20 carbon atoms, wherein any —CH$_2$— in the alkyl can be replaced by —O—, —S—, —COO—, —OCO— or —C≡C—, and any hydrogen in the alkyl can be replaced by halogen.

Such $R^2$ is preferably linear rather than branched.

(2) Properties of Compounds (1-3)

The compounds (1-3) have 3 to 5 ring structures. In particular, when the liquid crystal component A is constituted by compounds having 1 or 2 ring structures, the compounds (1-3) is used to expand the temperature range of optically isotropic liquid crystal composition to the high temperature side.

Physical properties of the optically isotropic liquid crystal composition such as clearing point, optical anisotropy and dielectric anisotropy can be adjusted by suitably selecting combination of l and m in the compounds (1-3), types of Rings $A^1$ to $A^4$, terminal group $R^2$, a group on a terminal benzene ring and its substitution position ($L^1$, $L^2$ and $X^1$), binding groups $Z^1$ to $Z^4$, etc.

In formula (1-3), Rings $A^1$ to $A^4$, the binding groups $Z^1$, $Z^2$, $Z^3$ and $Z^4$, the terminal group $X^1$, and $L^1$ and $L^2$ are the same as those in formula (1-1) or formula (1-2).

The general relationship between physical properties of the compounds (1-3) and combination of l and m, types of Rings $A^1$ to $A^4$, $Z^0$, the terminal group $R^2$, the terminal group $X^1$, the binding groups $Z^1$ to $Z^4$, $L^1$ and $L^2$, etc. will be described below.

In general, the larger the value of l+m, the higher the clearing point of the compounds (1-3), and the smaller the value of l+m, the lower the melting point of the compounds (1-3).

In general, when $R^2$ is linear, the temperature range of liquid crystal phase of the compounds (1-3) is wide, and the viscosity thereof is small. When each $R^2$ is branched, the compatibility of the compounds (1-3) with other liquid crystal compounds is improved.

Specific examples of preferred compounds (1-3) include compounds represented by the following formulae (1-3-1) to (1-3-28),

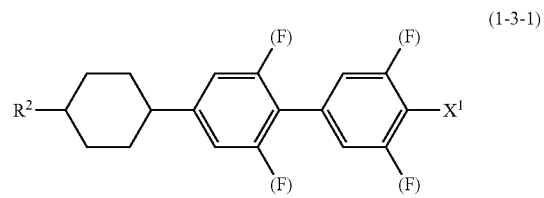

(1-3-1)

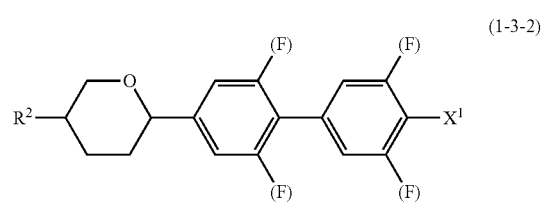

(1-3-2)

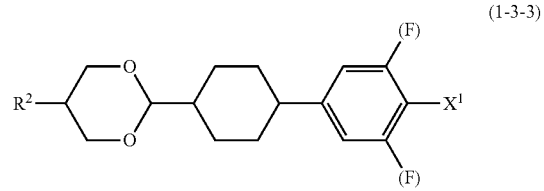

(1-3-3)

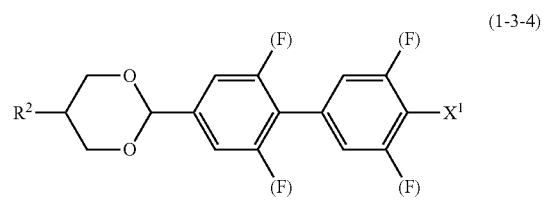

(1-3-4)

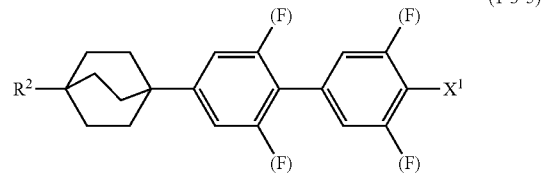

(1-3-5)

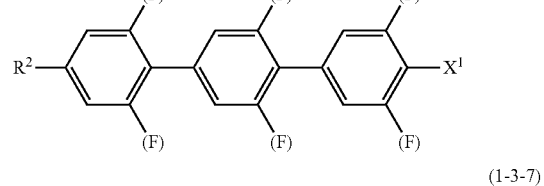

(1-3-6)

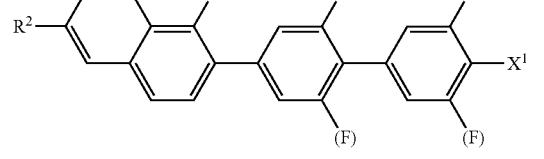

(1-3-7)

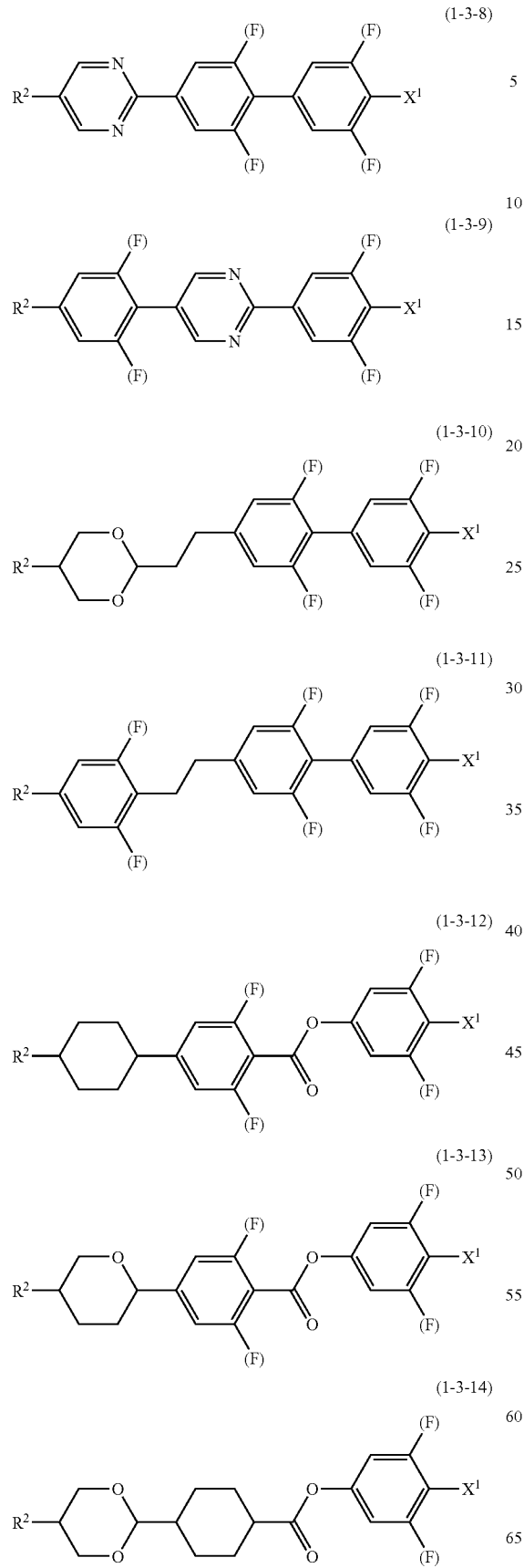
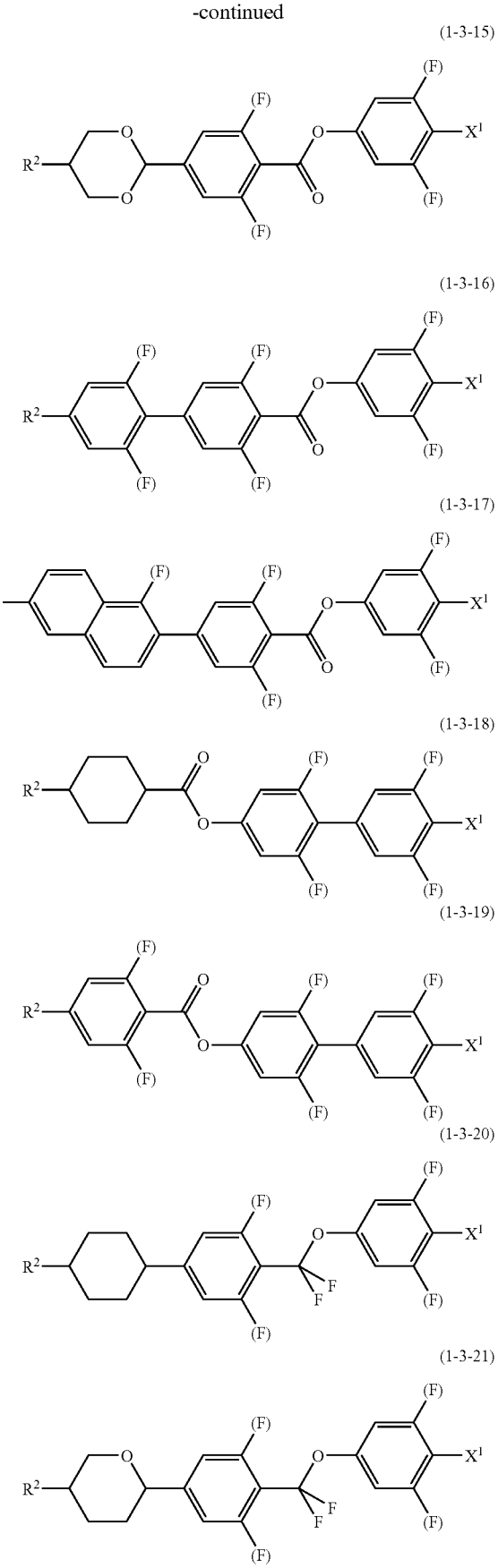

-continued

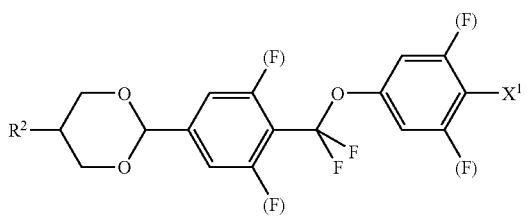
(1-3-22)

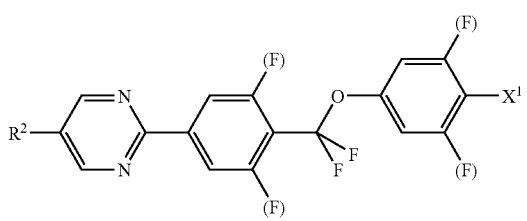
(1-3-23)

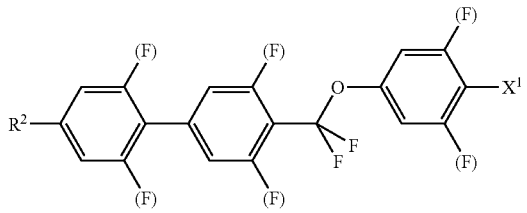
(1-3-24)

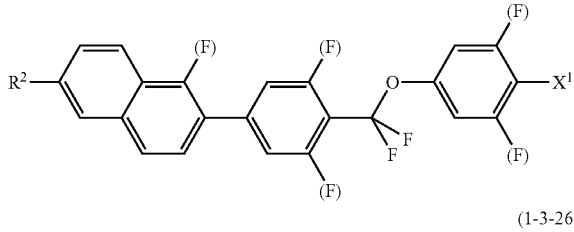
(1-3-25)

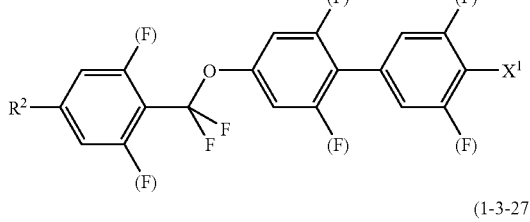
(1-3-26)

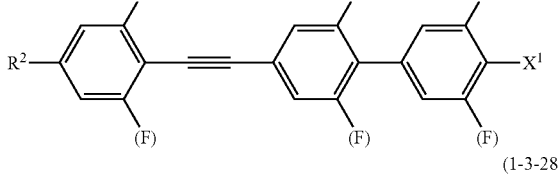
(1-3-27)

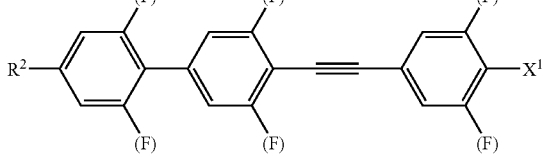
(1-3-28)

wherein in formulae (1-3-1) to (1-3-28), $R^2$ and $X^1$ are the same as those in formula (1-3), and (F) represents hydrogen or fluorine.

1.4. Liquid Crystal Component C

The optically isotropic liquid crystal composition of the invention may further comprise a liquid crystal component C, which is one or more compounds selected from the group consisting of compounds (2) and compounds (6).

When the optically isotropic liquid crystal composition of the invention comprises the liquid crystal component C, the flexibility of the temperature range of liquid crystal phase, optical anisotropy, dielectric anisotropy, viscosity and the like can be improved.

In general, the dielectric anisotropy of the compounds (2) is positive, and thermal stability and chemical stability of the compounds are excellent. Therefore, the compounds (2) are preferably used when preparing a liquid crystal composition for active drive such as TFT drive.

In particular, since the dielectric anisotropy of the compounds (6) is positive and the value thereof is large, it is preferred that the compounds (6) are mainly used to lower drive voltage for an element driven in an optically isotropic liquid crystal phase. In general, when a liquids crystal composition comprises compounds (6), the viscosity and the optical anisotropy of the liquids crystal composition can be adjusted, and the temperature range of liquid crystal phase of the liquids crystal composition can be expanded.

The content of the component C in the liquid crystal composition of the invention is preferably approximately 0.1 to approximately 99 wt %, more preferably approximately 1 to approximately 99 wt %, and particularly preferably approximately 10 to approximately 97 wt % of the total weight of the liquid crystal composition.

(1) Compounds (2)

In formula (2), $R^2$ is alkyl having 1 to 10 carbon atoms or alkynyl having 2 to 10 carbon atoms, wherein any hydrogen in the alkyl and the alkynyl can be replaced by fluorine; any —$CH_2$— can be replaced by —O—; $X^2$ is fluorine, chlorine, —$SF_5$, —$OCF_3$, —$OCHF_2$, —$CF_3$, —$CHF_2$, —$CH_2F$, —$OCF_2CHF_2$ or —$OCF_2CHFCF_3$; Ring $B^1$ is 1,4-cyclohexylene, 1,3-dioxane-2,5-diyl, pyrimidine-2,5-diyl, tetrahydropyran-2,5-diyl, piperidine-1,4-diyl, 1,4-phenylene, naphthalene-2,6-diyl, or 1,4-phenylene or naphthalene-2,6-diyl in which any hydrogen is replaced by fluorine or chlorine; $Z^5$ is —$(CH_2)_2$—, —$(CH_2)_4$—, —COO—, —$CF_2O$—, —$OCF_2$—, —CH=CH—, —C≡C—, —$CH_2O$— or a single bond; and $L^3$ and $L^4$ are each independently hydrogen or fluorine.

Specific examples of preferred compounds (2) include compounds represented by the following formulae (2-1) to (2-8),

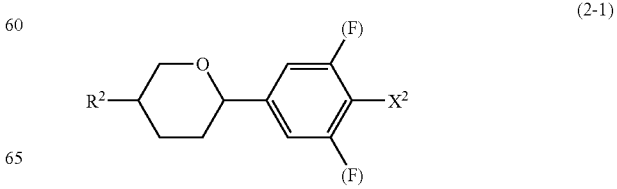
(2-1)

-continued

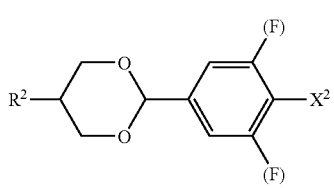
(2-2)

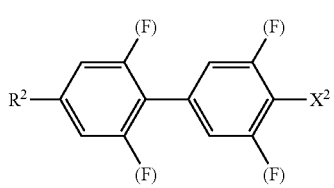
(2-3)

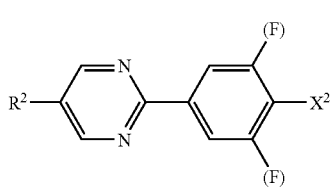
(2-4)

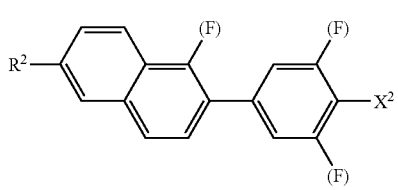
(2-5)

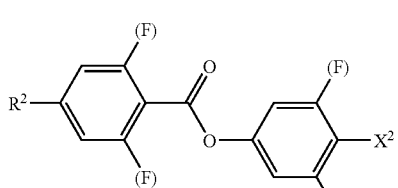
(2-6)

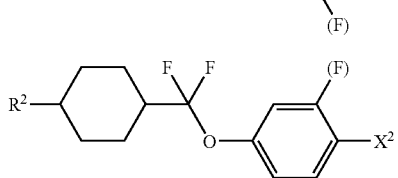
(2-7)

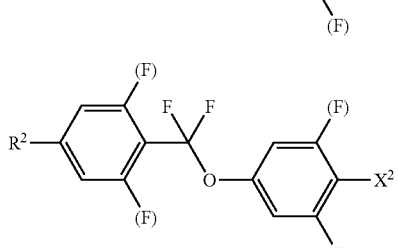
(2-8)

wherein in formulae (2-1) to (2-8), $R^2$ and $X^2$ are the same as those in formula (2), and (F) represents hydrogen or fluorine.

(2) Compounds (6)

In formula (6), $R^3$ is alkyl having 1 to 10 carbon atoms, wherein any hydrogen in the alkyl can be replaced by fluorine, and any —CH$_2$— can be replaced by —O—; $X^3$ is —C≡N or —C≡C—C≡N; Ring $C^1$ is 1,4-cyclohexylene, 1,4-phenylene, naphthalene-2,6-diyl, 1,3-dioxane-2,5-diyl, tetrahydropyran-2,5-diyl, pyrimidine-2,5-diyl, or 1,4-phenylene or naphthalene-2,6-diyl in which any hydrogen is replaced by fluorine; $Z^8$ is —(CH$_2$)$_2$—, —COO—, —CF$_2$O—, —OCF$_2$—, —C≡C—, —CH$_2$O— or a single bond; and $L^5$ and $L^6$ are each independently hydrogen or fluorine.

Specific examples of preferred compounds (6) include compounds represented by the following formulae (6-1) to (6-9),

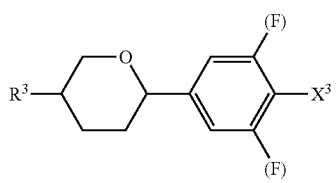
(6-1)

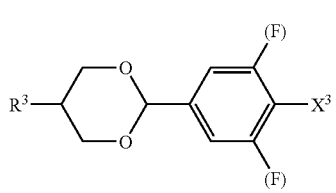
(6-2)

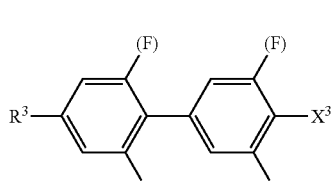
(6-3)

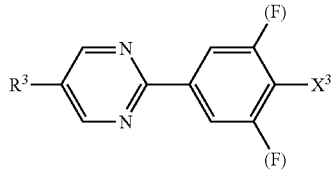
(6-4)

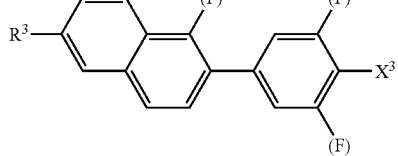
(6-5)

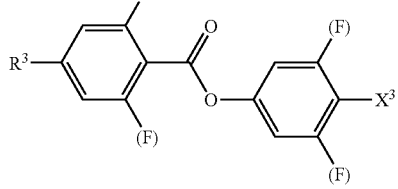
(6-6)

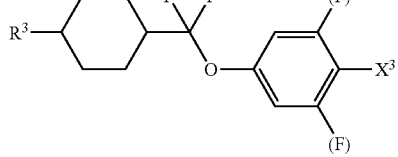
(6-7)

-continued (6-8)
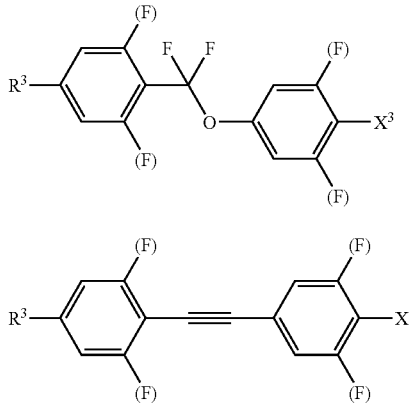

(6-9)
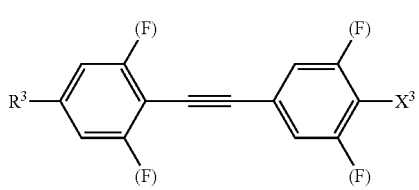

wherein in formulae (6-1) to (6-9), $R^3$ and $X^3$ are the same as those in formula (6), and (F) represents hydrogen or fluorine.

1.5. Liquid Crystal Component D

The optically isotropic liquid crystal composition of the invention may further comprise a liquid crystal component D, which is one or more compound(s) selected from the group consisting of compounds (7) to (9). In general, the absolute value of dielectric anisotropy of the liquid crystal component D is small, and the component is nearly neutral. Further, in general, the compounds (9) are mainly effective for adjusting viscosity or optical anisotropy.

When the optically isotropic liquid crystal composition of the invention comprises the liquid crystal component D, generally, drive voltage of a liquid crystal element comprising the liquid crystal composition becomes higher, and the response time becomes shorter. Therefore, it is desired that the liquid crystal component D is contained as much as possible. However, since it is required that a desired value of drive voltage of the liquid crystal composition is obtained, in general, the content of the liquid crystal component D is preferably approximately 40 wt % or less, and more preferably approximately 20 wt % or less of the total weight of the liquid crystal composition.

In formulae (7) to (9), $R^4$ and $R^5$ are each independently alkyl having 1 to 10 carbon atoms or alkenyl having 2 to 10 carbon atoms, wherein any one of hydrogen in the alkyl and the alkenyl can be replaced by fluorine, and any —CH$_2$— in the alkyl and the alkenyl can be replaced by —O—; Ring $D^1$, Ring $D^2$ and Ring $D^3$ are each independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^9$ and $Z^{10}$ are each independently —C≡C—, —COO—, —(CH$_2$)$_2$—, —CH=CH— or a single bond.

Specific examples of preferred compounds (7) include compounds represented by the following formulae (7-1) to (7-11), specific examples of preferred compounds (8) include compounds represented by the following formulae (8-1) to (8-18), and specific examples of preferred compounds (9) include compounds represented by the following formulae (9-1) to (9-6), (7-1)
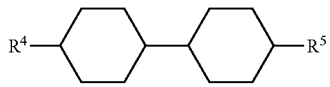

(7-2)
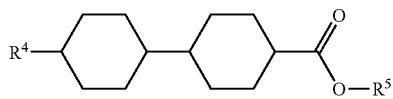

(7-3)
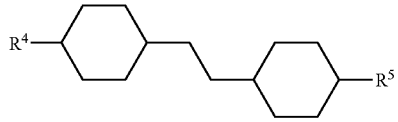

(7-4)
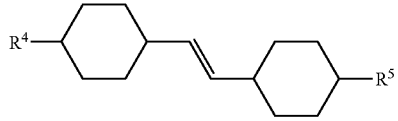

(7-5)
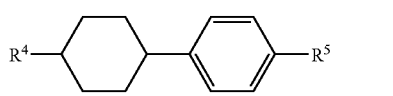

(7-6)
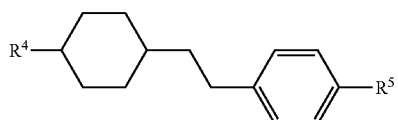

(7-7)
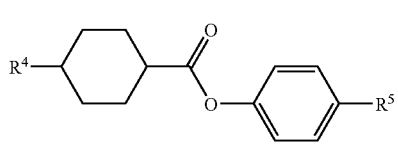

(7-8)
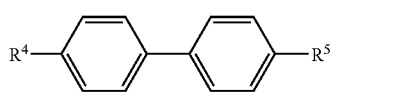

(7-9)
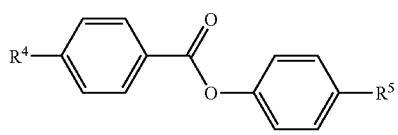

(7-10)
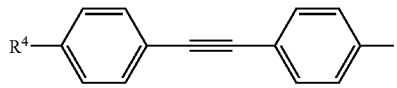

(7-11)
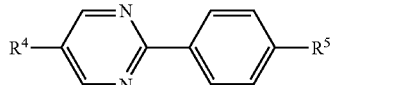

(8-1)
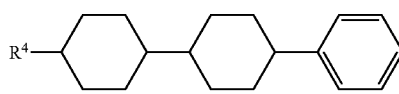

(8-2)
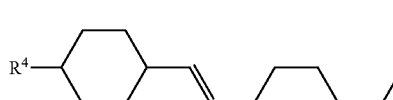

(8-3)
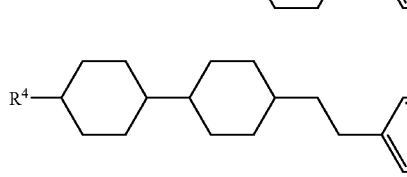

(8-4)

(8-5)

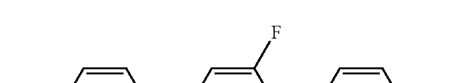
(8-6)

(8-7)

(8-8)

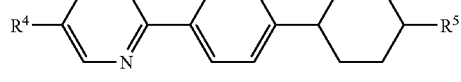
(8-9)

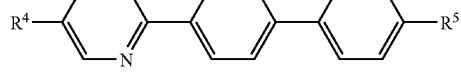
(8-10)

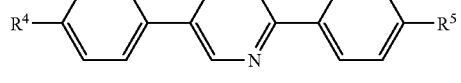
(8-11)

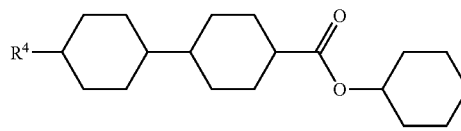
(8-12)

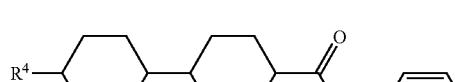
(8-13)

(8-14)

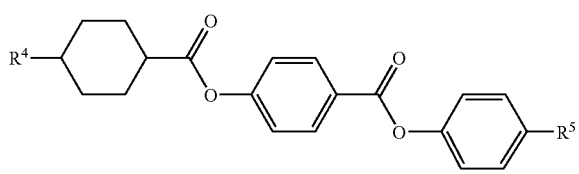
(8-15)

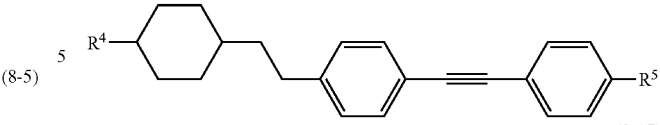
(8-16)

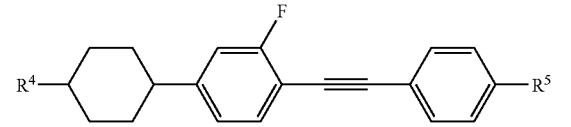
(8-17)

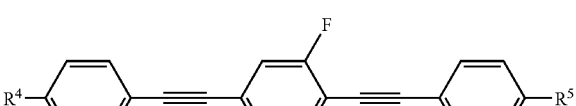
(8-18)

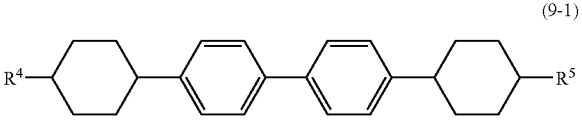
(9-1)

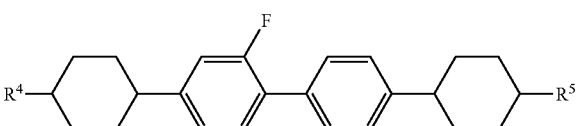
(9-2)

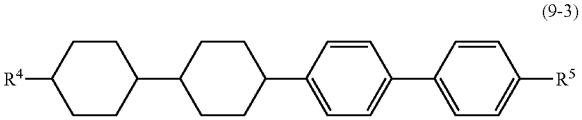
(9-3)

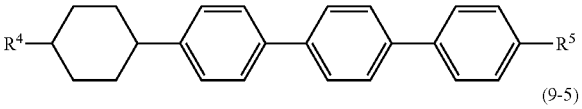
(9-4)

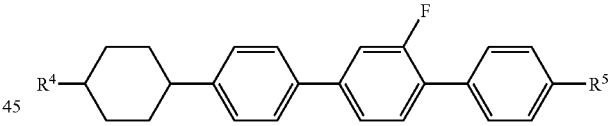
(9-5)

(9-6)

wherein in the above-described formulae, $R^4$ and $R^5$ are the same as those in formulae (7) to (9).

1.6. Chiral Dopants

The chiral dopants contained in the optically isotropic liquid crystal composition of the invention are not particularly limited, but are preferably compounds having a strong helical twisting power. In the case of a compound having a strong helical twisting power, an adding amount thereof required to obtain a desired pitch can be decreased, and therefore increase in drive voltage can be suppressed, and it is practically advantageous.

Specifically, compounds represented by the following formulae (K1) to (K5) are preferably used as chiral dopants,

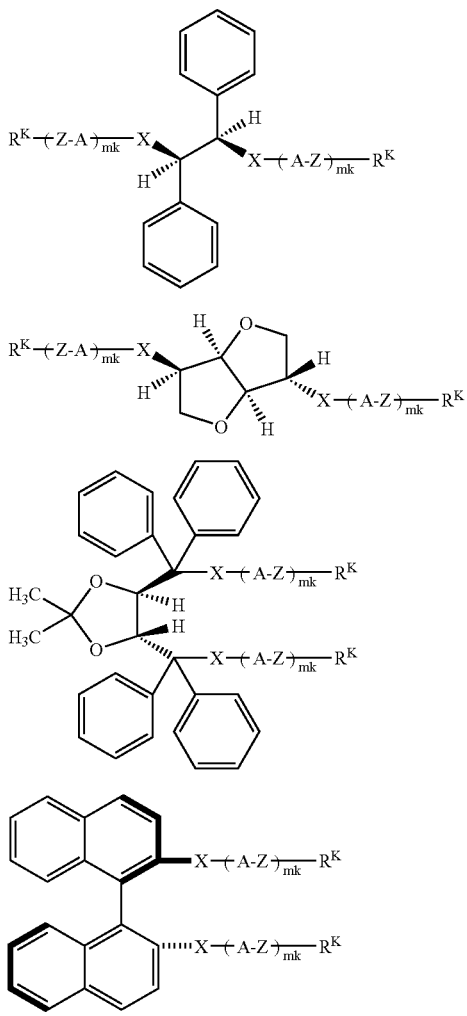

(K1)
(K2)
(K3)
(K4)

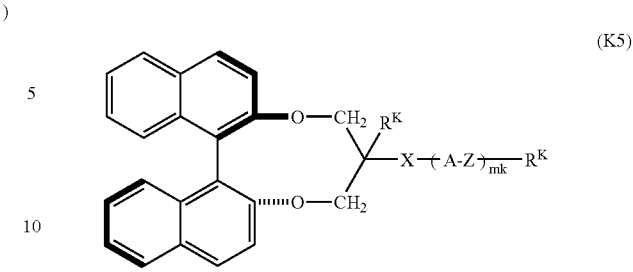

(K5)

wherein in formulae (K1) to (K5), each $R^K$ is independently hydrogen, halogen (F, Cl, Br, I, etc.), —C≡N, —N=C=O, —N=C=S or alkyl having 1 to 20 carbon atoms, wherein any —CH$_2$— in the alkyl can be replaced by —O—, —S—, —COO—, —OCO—, —CH=CH—, —CF=CF— or —C≡C—, and any hydrogen in the alkyl can be replaced by halogen; each A is independently an aromatic or nonaromatic 3- to 8-membered ring or a condensed ring having 9 or more carbon atoms, wherein any hydrogen in these rings can be replaced by halogen, alkyl having 1 to 3 carbon atoms or haloalkyl; —CH$_2$— can be replaced by —O—, —S— or —NH—, and —CH= can be replaced by —N=; each Z is independently a single bond or alkylene having 1 to 8 carbon atoms, wherein any —CH$_2$— can be replaced by —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C—, and any hydrogen can be replaced by halogen; each X is independently a single bond, —COO—, —CH$_2$O—, —CF$_2$O—, —OCO—, —OCH$_2$—, —OCF$_2$— or —CH$_2$CH$_2$—; and each mK is independently 1 to 4.

Among them, the chiral dopants contained in the liquid crystal composition are preferably represented by formulae (K2-1) to (K2-8) included in formula (K2) and formulae (K5-1) to (K5-3) included in formula (K5),

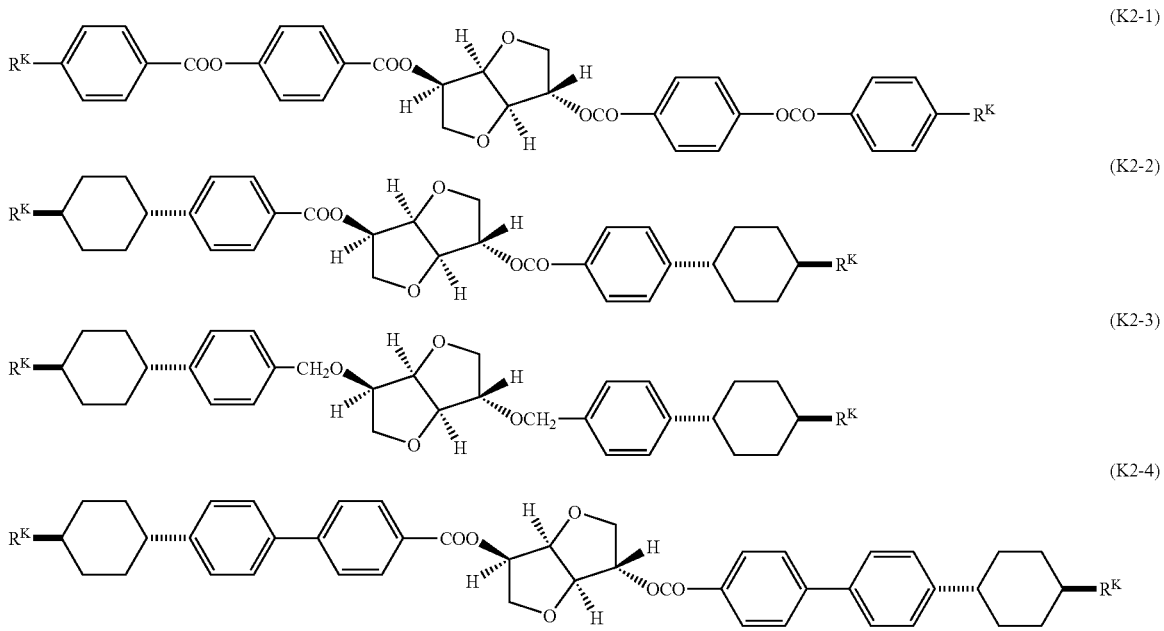

(K2-1)
(K2-2)
(K2-3)
(K2-4)

-continued

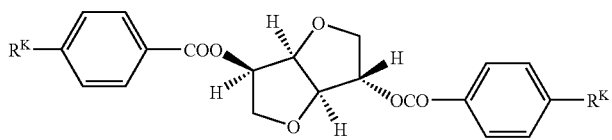
(K2-5)

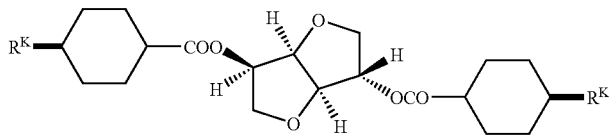
(K2-6)

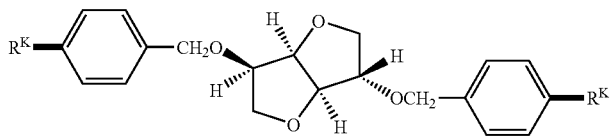
(K2-7)

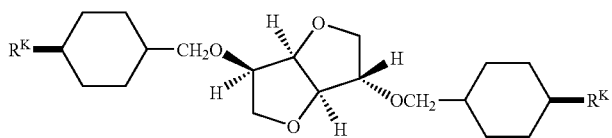
(K2-8)

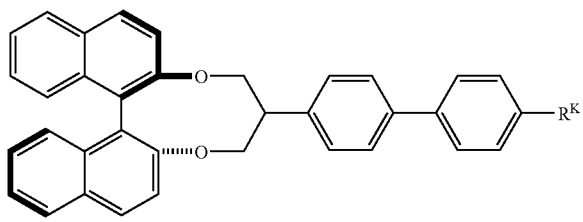
(K5-1)

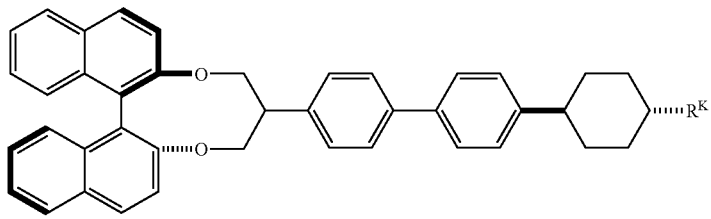
(K5-2)

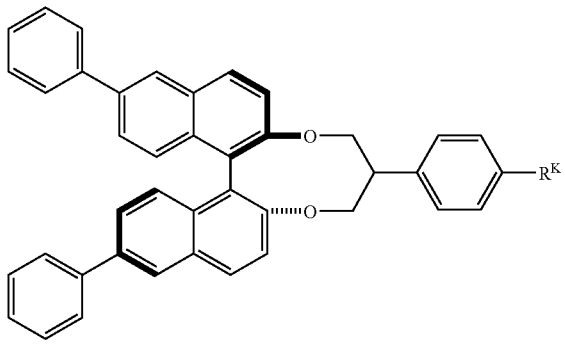
(K5-3)

wherein in the formulae, each $R^K$ is independently alkyl having 1 to 10 carbon atoms, wherein —$CH_2$— adjacent to the ring in the alkyl can be replaced by —O—, and any —$CH_2$— can be replaced by —CH=CH—.

The above-described "alkyl" is preferably alkyl having 1 to 10 carbon atoms, and more preferably alkyl having 1 to 6 carbon atoms. Examples of alkyls include, but are not limited to, methyl, ethyl, propyl, isopropyl, n-butyl, s-butyl, t-butyl, pentyl, hexyl and dodecanyl.

In general, the content of the chiral dopants in the optically isotropic liquid crystal composition of the invention is preferably approximately 1 to approximately 20 wt %, and particularly preferably approximately 1 to approximately 10 wt %. The liquid crystal composition containing the chiral dopants in an amount within these ranges is more likely to have the optically isotropic liquid crystal phase.

Further, in the case of use for a liquid crystal display element, it is preferred that the concentration of the chiral dopants is adjusted and thereby diffraction and reflection are not substantially recognized in the visible range.

One type or two or more types of chiral dopants can be contained in the liquid crystal composition.

2. Mixture Comprising Optically Isotropic Liquid Crystal Composition and Polymerizable Monomer and Polymer/Liquid Crystal Composite The second embodiment of the invention is a mixture comprising an optically isotropic liquid crystal composition and a polymerizable monomer. Further, the third embodiment of the invention is an optically isotropic polymer/liquid crystal composite, which can be produced, for example, by subjecting the mixture comprising the optically isotropic liquid crystal composition and the polymerizable monomer of the second embodiment of the invention to polymerization reaction.

2.1. Polymerization Conditions at the Time of Production of Polymer/Liquid Crystal Composite The optically isotropic polymer/liquid crystal composite of the third embodiment of the invention is not particularly limited as long as a composite comprises both a liquid crystal material and a polymer compound. A polymer may be phase-separated from the liquid crystal material in a state where a part or all of the polymer is not dissolved in the liquid crystal material. The polymer/liquid crystal composite of the invention can also be produced by mixing the optically isotropic liquid crystal composition with a polymer obtained in advance by means of polymerization. Preferably, the composite is produced by mixing the optically isotropic liquid crystal composition with a low-molecular-weight monomer, macromonomer, oligomer or the like (hereinafter collectively referred to as "monomer and the like"), which is converted to a polymer, and thereafter by conducting polymerization reaction in the mixture.

Regarding the second embodiment of the invention comprising the monomer and the like and the liquid crystal composition, the mixture comprising the optically isotropic liquid crystal composition and the polymerizable monomer is also referred to as "polymerizable monomer/liquid crystal mixture" in the specification. According to need, the "polymerizable monomer/liquid crystal mixture" may contain a polymerization initiator, a curing agent, a catalyst, a stabilization agent, a dichroism pigment (merocyanine-based, styryl-based, azo-based, azomethine-based, azoxy-based, quinophthalone-based, anthraquinone-based, tetrazine-based, etc.), a photochromic compound or the like within a range in which the effects of the invention are not reduced, as described later. For example, according to need, the polymerizable monomer/liquid crystal mixture of the invention may contain a polymerization initiator in an amount of approximately 0.1 to approximately 20 parts by weight per 100 parts by weight of the polymerizable monomer.

Polymerization in the above-described mixture is preferably performed in a non-liquid crystalline isotropic phase or an optically isotropic liquid crystal phase. That is, polymerization temperature is preferably a temperature at which the polymer/liquid crystal composite shows high transparency and isotropic nature. More preferably, polymerization is started at a temperature at which a mixture of the monomer and the liquid crystal material exhibits the non-liquid crystalline isotropic phase or the blue phase and is terminated in the state of the non-liquid crystalline isotropic phase or the optically isotropic liquid crystal phase. That is, polymerization temperature is preferably a polymerization temperature at which, after polymerization, the polymer/liquid crystal composite does not substantially scatter light which is nearer to the long-wavelength side compared to the visible light and exhibits an optically isotropic state.

2.2. Raw Materials for Polymer Constituting Composite

For example, a low-molecular-weight monomer, macromonomer and oligomer can be used as a raw material monomer of a polymer constituting the composite of the invention. In the specification, the phrase "raw material monomer of a polymer" is intended to include a low-molecular-weight monomer, macromonomer, oligomer and the like. Further, a polymer to be obtained preferably has a three-dimensional cross-linked structure. Therefore, as a raw material monomer of a polymer, a multifunctional monomer having 2 or more polymerizable functional groups is preferably used. The polymerizable functional group is not particularly limited, and examples thereof include an acryl group, a methacryl group, a glycidyl group, an epoxy group, an oxetanyl group, a vinyl group and the like. From the viewpoint of polymerization velocity, an acryl group and a methacryl group are preferred. In a raw material monomer of a polymer, approximately 10 wt % or more of a monomer having 2 or more polymerizable functional groups is preferably contained since the composite of the invention tends to easily exhibit high transparency and isotropic nature thereby.

Further, in order to obtain a suitable composite, a polymer preferably has a mesogenic moiety. A raw material monomer having a mesogenic moiety can be used as a part or all of the raw material monomer of the polymer.

(1) Monofunctional/Bifunctional Monomer Having a Mesogenic Moiety

A monofunctional or bifunctional monomer having a mesogenic moiety is not particularly limited in terms of its structure. Examples thereof include compounds represented by the following formula (M1) or (M2):

(M1)

(M2)

In formula (M1), $R^a$ is each independently hydrogen, halogen, —C≡N, —N=C=O, —N=C=S or alkyl having 1 to 20 carbon atoms, wherein any —CH$_2$— in the alkyl can be replaced by —O—, —S—, —CO—, —COO—, —OCO—, —CH=CH—, —CF=CF— or —C≡C—, and any hydrogen in the alkyl can be replaced by halogen or —C≡N.

$R^a$ is preferably hydrogen, halogen, —C≡N, —CF$_3$, —CF$_2$H, —CFH$_2$, —OCF$_3$, —OCF$_2$H, alkyl having 1 to 20 carbon atoms, alkoxy having 1 to 19 carbon atoms, alkenyl having 2 to 21 carbon atoms or alkynyl having 2 to 21 carbon atoms. Particularly preferably, $R^a$ is —C≡N, alkyl having 1 to 20 carbon atoms or alkoxy having 1 to 19 carbon atoms. In formula (M1), $R^b$ is each independently one of polymerizable groups represented by (M3-1) to (M3-7).

(M3-1)

(M3-2)

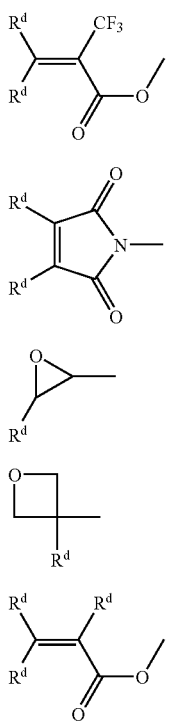

In formula (M2), $R^b$ is each independently one of polymerizable groups represented by (M3-1) to (M3-7).

Each $R^d$ in the groups (M3-1) to (M3-7) is independently hydrogen, halogen or alkyl having 1 to 5 carbon atoms, wherein any hydrogen in the alkyl can be replaced by halogen. Preferably, $R^d$ is hydrogen, halogen or methyl. Particularly preferably, $R^d$ is hydrogen, fluorine or methyl.

Polymerization of the groups (M3-2), (M3-3), (M3-4) and (M3-7) is suitably conducted by means of radical polymerization. Polymerization of the groups (M3-1), (M3-5) and (M3-6) is suitably conducted by means of cationic polymerization. Since both the polymerizations are living polymerization, they are initiated when a small amount of radical or cation active species is generated in a reaction system. A polymerization initiator can be used in order to accelerate generation of active species. For example, light or heat can be used for generation of active species.

In formulae (M1) and (M2), $A^M$ is each independently an aromatic or nonaromatic 5- or 6-membered ring or a condensed ring having 9 or more carbon atoms, wherein —$CH_2$— in the rings can be replaced by —O—, —S—, —NH— or —$NCH_3$—; —CH= in the rings can be replaced by —N=; and a hydrogen atom on the rings can be replaced by halogen, alkyl having 1 to 5 carbon atoms or alkyl halide. Favorable examples of $A^M$ include 1,4-cyclohexylene, 1,4-cyclohexenylene, 1,4-phenylene, naphthalene-2,6-diyl, tetrahydronaphthalene-2,6-diyl, fluorene-2,7-diyl and bicyclo[2.2.2]octane-1,4-diyl. In these rings, any —$CH_2$— can be replaced by —O—, and any —CH= can be replaced by —N=. Further, in these rings, any hydrogen can be replaced by halogen, alkyl having 1 to 5 carbon atoms or alkyl halide having 1 to 5 carbon atoms.

In view of the stability of compounds, —$CH_2$—O—$CH_2$—O—, in which oxygen atoms are not adjacent to each other, is more preferable than —$CH_2$—O—O—$CH_2$—, in which oxygen atoms are adjacent to each other. The same applies to the case of sulfur atoms.

Among them, $A^M$ is particularly preferably 1,4-cyclohexylene, 1,4-cyclohexenylene, 1,4-phenylene, 2-fluoro-1,4-phenylene, 2,3-difluoro-1,4-phenylene, 2,5-difluoro-1,4-phenylene, 2,6-difluoro-1,4-phenylene, 2-methyl-1,4-phenylene, 2-trifluoromethyl-1,4-phenylene, 2,3-bis(trifluoromethyl)-1,4-phenylene, naphthalene-2,6-diyl, tetrahydronaphthalene-2,6-diyl, fluorene-2,7-diyl, 9-methylfluorene-2,7-diyl, 1,3-dioxane-2,5-diyl, pyridine-2,5-diyl or pyrimidine-2,5-diyl. The aforementioned 1,4-cyclohexylene and 1,3-dioxane-2,5-diyl more preferably have trans-configuration compared to cis-configuration.

2-fluoro-1,4-phenylene and 3-fluoro-1,4-phenylene are structurally identical, and therefore the latter is not listed herein. This rule is applied to the relationship between 2,5-difluoro-1,4-phenylene and 3,6-difluoro-1,4-phenylene and the like.

In formulae (M1) and (M2), Y is each independently a single bond or alkylene having 1 to 20 carbon atoms, wherein any —$CH_2$— in the alkylene can be replaced by —O—, —S—, —CH=CH—, —C≡C—, —COO— or —OCO—. Preferably, Y is a single bond, —$(CH_2)_{m2}$—, —$O(CH_2)_{m2}$— or —$(CH_2)_{m2}O$— (in the aforementioned formulae, r is an integer from 1 to 20). Particularly preferably, Y is a single bond, —$(CH_2)_{m2}$—, —$O(CH_2)_{m2}$— or —$(CH_2)_{m2}O$— (in the aforementioned formulae, m2 is an integer from 1 to 10). In view of the stability of compounds, preferably, —Y—$R^a$ and —Y—$R^b$ do not have —O—O—, —O—S—, —S—O— or —S—S— in the groups thereof.

In formulae (M1) and (M2), $Z^M$ is each independently a single bond, —$(CH_2)_{m3}$—, —$O(CH_2)_{m3}$—, —$(CH_2)_{m3}O$—, —$O(CH_2)_{m3}O$—, —CH=CH—, —C≡C—, —COO—, —OCO—, —$(CF_2)_2$—, —$(CH_2)_2$—COO—, —OCO—$(CH_2)_2$—, —CH=CH—COO—, —OCO—CH=CH—, —C≡C—COO—, —OCO—C≡C—, —CH=CH—$(CH_2)_2$—, —$(CH_2)_2$—CH=CH—, —CF=CF—, —C≡C—CH=CH—, —CH=CH—C≡C—, —$OCF_2$—$(CH_2)_2$—, —$(CH_2)_2$—$CF_2O$—, —$OCF_2$— or —$CF_2O$— (in the aforementioned formulae, m3 is an integer from 1 to 20).

Preferably, $Z^M$ is a single bond, —$(CH_2)_{m3}$—, —$O(CH_2)_{m3}$—, —$(CH_2)_{m3}O$—, —CH=CH—, —C≡C—, —COO—, —OCO—, —$(CH_2)_2$—COO—, —OCO—$(CH_2)_2$—, —CH=CH—COO—, —OCO—CH=CH—, —$OCF_2$— or —$CF_2O$—.

In formulae (M1) and (M2), m1 is an integer from 1 to 6. Preferably, m1 is an integer from 1 to 3. When m1 is 1, the formulae represent a bicyclic compound having 2 rings such as 6-membered ring and the like. When m1 is 2 or 3, the formulae represent a tricyclic compound or a tetracyclic compound, respectively. For example, when m1 is 1, two $A^M$s may be the same or different. For example, when m1 is 2, three $A^M$s (or two $Z^M$s) may be the same or different. The same applies to the case where m1 is 3 to 6. The same applies to $R^a$, $R^b$, $R^d$, $Z^M$, $A^M$ and Y.

Compounds (M1) represented by formula (M1) and compounds (M2) represented by formula (M2) can be suitably used since they have the same properties even if they include an isotope such as $^2H$ (deuterium) and $^{13}C$ in an amount which is more than the amount represented by the naturally-occurring ratio.

More favorable examples of the compounds (M1) and (M2) include compounds (M1-1) to (M1-41) and (M2-1) to (M2-27) represented by the following formulae (M1-1) to (M1-41) and (M2-1) to (M2-27). In these compounds, meanings of $R^a$, $R^b$, $R^d$, $Z^M$, $A^M$, Y and p are the same as those in the formulae (M1) and (M2) described in the embodiment of the invention.

Hereinafter, partial structures as shown below in the compounds (M1-1) to (M1-41) and (M2-1) to (M2-27) will be explained. The partial structure (a1) represents 1,4-phenylene in which any hydrogen is replaced by fluorine. The partial structure (a2) represents 1,4-phenylene in which any hydrogen can be replaced by fluorine. The partial structure (a3) represents 1,4-phenylene in which any hydrogen can be replaced by fluorine or methyl. The partial structure (a4) represents fluorene in which hydrogen at position 9 can be replaced by methyl.

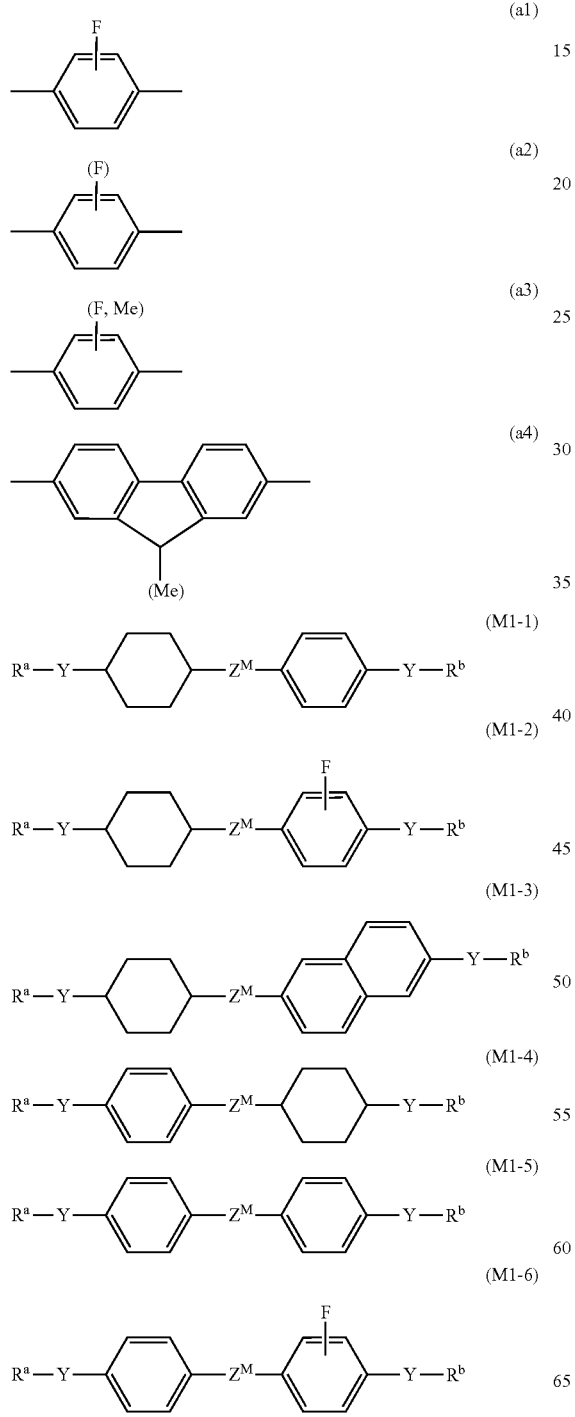

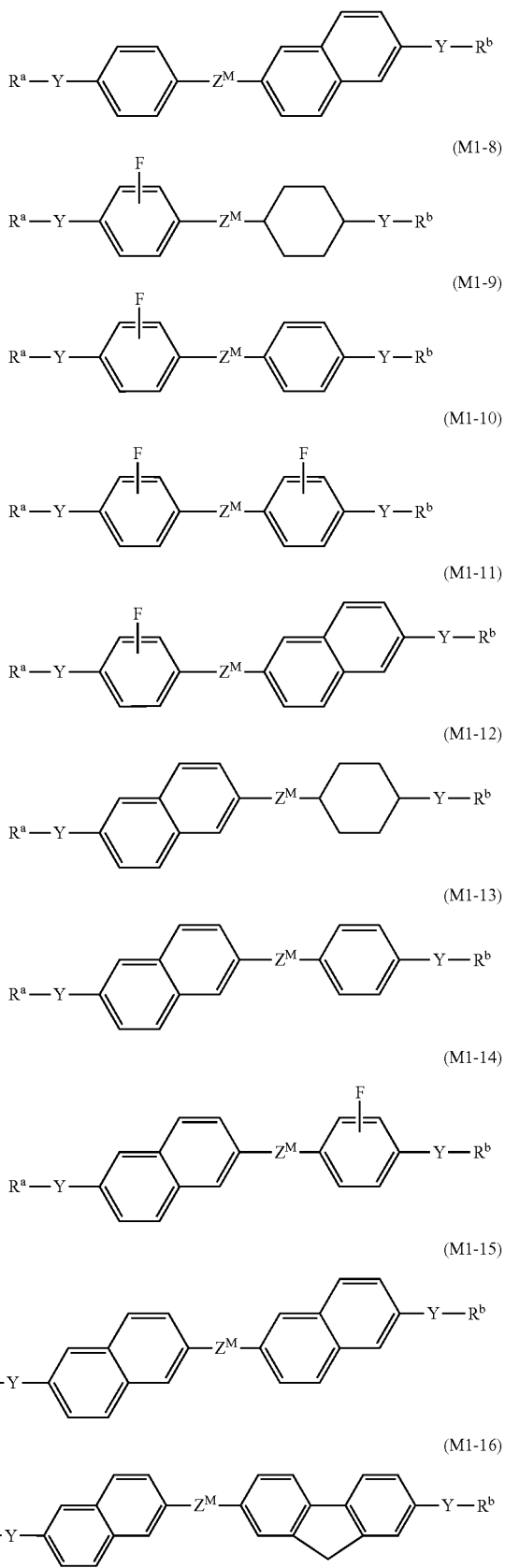

(M1-17) 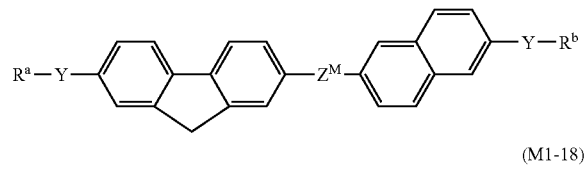
(M1-18) 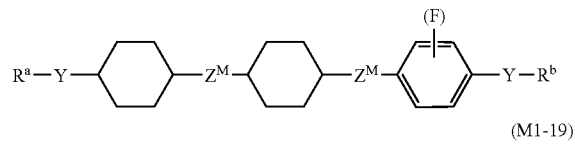
(M1-19) 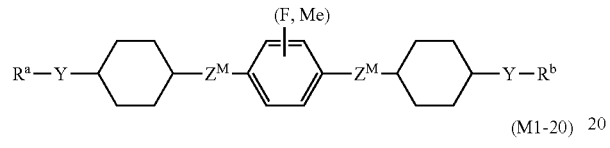
(M1-20) 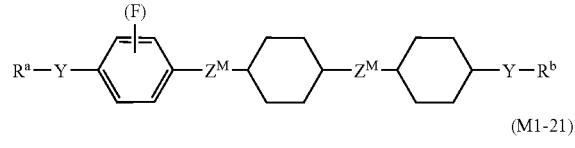
(M1-21) 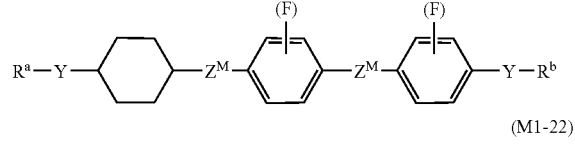
(M1-22) 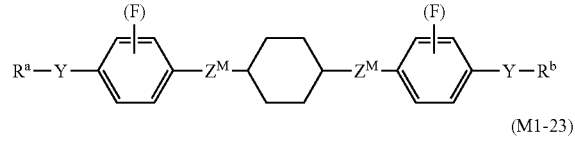
(M1-23) 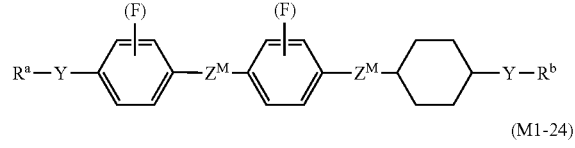
(M1-24) 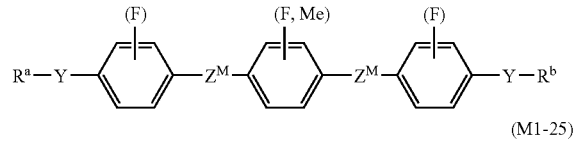
(M1-25) 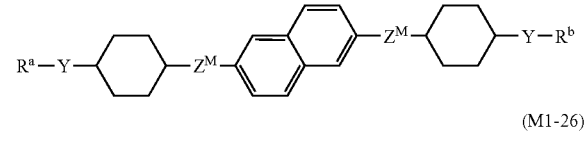
(M1-26) 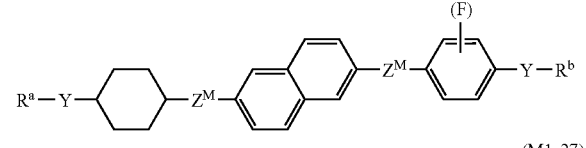
(M1-27) 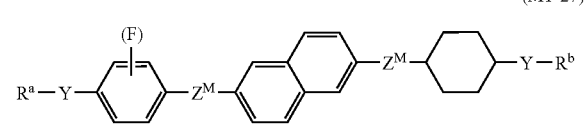
(M1-28) 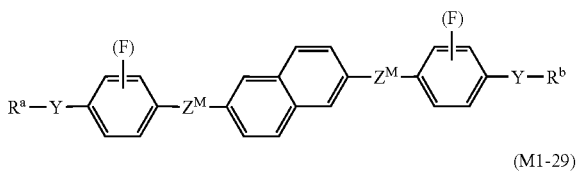
(M1-29) 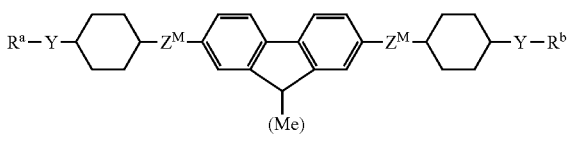
(M1-30) 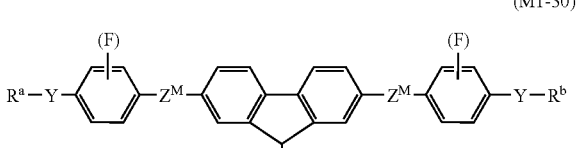
(M1-31) 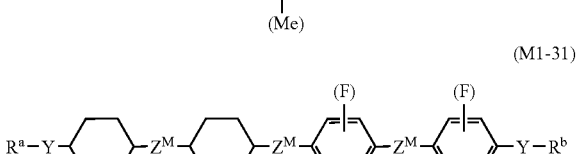
(M1-32) 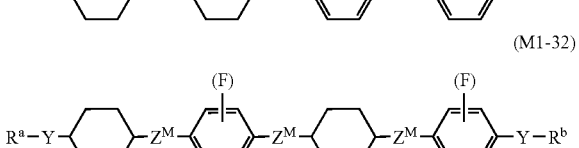
(M1-33) 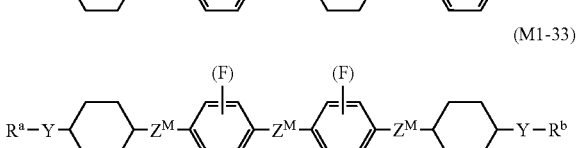
(M1-34) 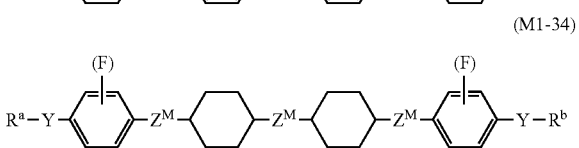
(M1-35) 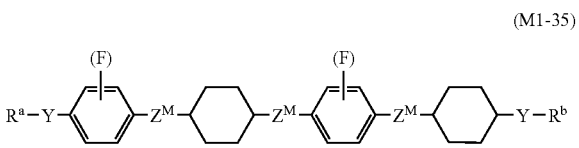
(M1-36) 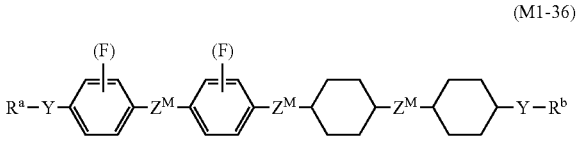
(M1-37) 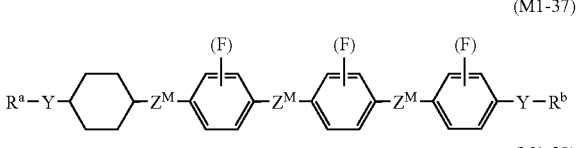
(M1-38) 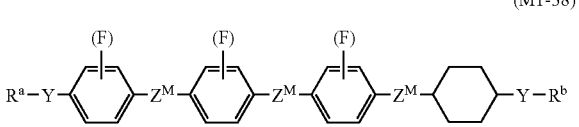

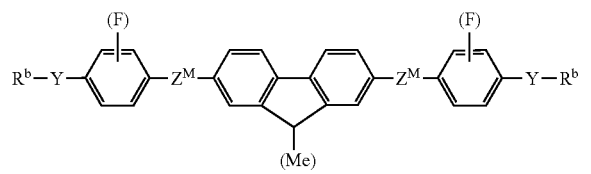
(M2-20)

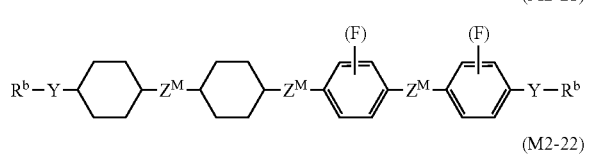
(M2-21)

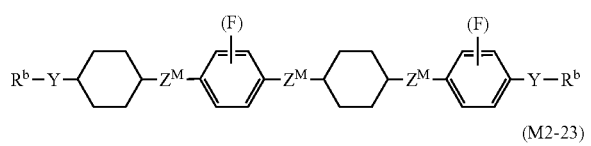
(M2-22)

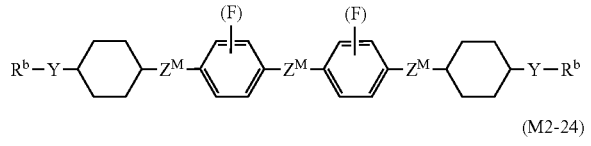
(M2-23)

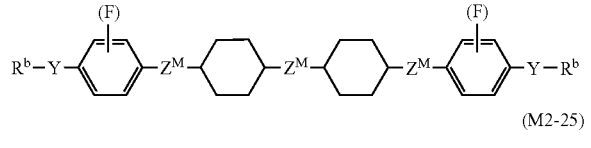
(M2-24)

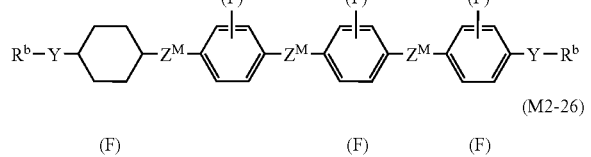
(M2-25)

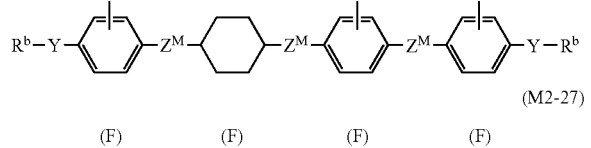
(M2-26)

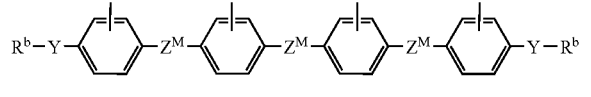
(M2-27)

Monomers not having the aforementioned mesogenic moiety and polymerizable compounds other than the monomers (M1) and (M2) having the mesogenic moiety can be used according to need.

In order to optimize the optical isotropy of the polymer/liquid crystal composite of the invention, a monomer having the mesogenic moiety and 3 or more polymerizable functional groups can be used. As the monomer having the mesogenic moiety and 3 or more polymerizable functional groups, a known compound can be suitably used. Examples thereof include compounds represented by (M4-1) to (M4-3). More specifically, examples thereof include compounds described in Japanese Laid-Open Patent Publication Nos. 2000-327632, 2004-182949 and 2004-59772. In (M4-1) to (M4-3), meanings of $R^b$, Za, Y and (F) are the same as those described above.

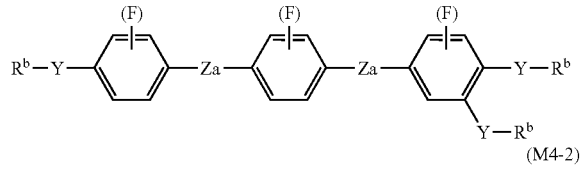
(M4-1)

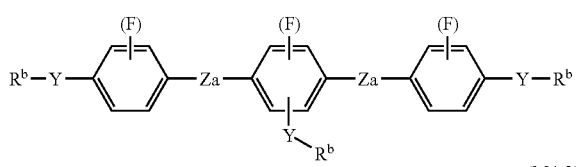
(M4-2)

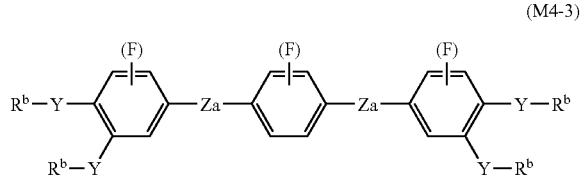
(M4-3)

In the specification, "alkyl having 1 to 20 carbon atoms" is preferably alkyl having 1 to 10 carbon atoms, and more preferably alkyl having 1 to 6 carbon atoms. Examples of alkyls include, but are not limited to, methyl, ethyl, propyl, isopropyl, n-butyl, s-butyl, t-butyl, pentyl, hexyl and dodecanyl.

In the specification, "alkenyl having 2 to 21 carbon atoms" is preferably alkenyl having 2 to 10 carbon atoms, and more preferably alkenyl having 2 to 6 carbon atoms. Examples of alkenyls include, but are not limited to, vinyl, allyl, propenyl, isopropenyl, 2-methyl-1-propenyl, 2-methylallyl and 2-butenyl.

In the specification, "alkynyl having 2 to 21 carbon atoms" is preferably alkynyl having 2 to 10 carbon atoms, and more preferably alkynyl having 2 to 6 carbon atoms. Examples of alkynyls include, but are not limited to, ethynyl, propynyl and butynyl.

In the specification, "alkoxy having 1 to 19 carbon atoms" is preferably alkoxy having 1 to 10 carbon atoms, and more preferably alkoxy having 2 to 6 carbon atoms. Examples of alkoxys include, but are not limited to, ethoxy, propoxy, butoxy and pentyloxy.

(2) Monomer which does not have the Mesogenic Moiety but has a Polymerizable Functional Group Examples of monomers which do not have the mesogenic moiety but have a polymerizable functional group include, but are not limited to, linear or branched acrylate having 1 to 30 carbon atoms and linear or branched diacrylate having 1 to 30 carbon atoms. Examples of monomers which do not have the mesogenic moiety but have 3 or more polymerizable functional groups include, but are not limited to, glycerol propoxylate (1PO/OH) triacrylate, pentaerythritol propoxylate triacrylate, pentaerythritol triacrylate, trimethylolpropane ethoxylate triacrylate, trimethylolpropane propoxylate triacrylate, trimethylolpropane triacrylate, di(trimethylolpropane)tetraacrylate, pentaerythritol tetraacrylate, di(pentaerythritol)pentaacrylate, di(pentaerythritol)hexaacrylate, and trimethylolpropane triacrylate.

2.3. Polymerization Initiator

Polymerization reaction in the production of the polymer constituting the composite material of the invention is not particularly limited. For example, photo radical polymerization, thermal radical polymerization, photo cation polymerization and the like can be conducted.

Examples of photo radical polymerization initiators, which can be used in photo radical polymerization, include DAROCUR® 1173 and 4265 (trade names; Ciba Specialty Chemicals Inc.) and IRGACURE® 184, 369, 500, 651, 784, 819, 907, 1300, 1700, 1800, 1850 and 2959 (trade names; Ciba Specialty Chemicals Inc.).

Examples of favorable initiators which can be used in thermal radical polymerization include benzoyl peroxide, diisopropyl peroxydicarbonate, t-butylperoxy-2-ethylhexanoate, t-butyl peroxypivalate, t-butyl peroxydiisobutyrate, lauroyl peroxide, dimethyl 2,2'-azobis(isobutyrate) (MAIB), di-t-butylperoxide (DTBPO), azobisisobutyronitrile (AIBN), and azobiscyclohexanecarbonitrile (ACN).

Examples of photo cation polymerization initiators, which can be used in photo cation polymerization, include diaryliodonium salt (hereinafter referred to as "DAS"), triarylsulfonium salt (hereinafter referred to as "TAS") and the like.

Examples of DAS include diphenyliodonium tetrafluoroborate, diphenyliodonium hexafluorophosphonate, diphenyliodonium hexafluoroarsenate, diphenyliodonium trifluoromethanesulfonate, diphenyliodonium trifluoroacetate, diphenyliodonium-p-toluene sulfonate, diphenyliodonium tetra(pentafluorophenyl)borate, 4-methoxyphenylphenyliodonium tetrafluoroborate, 4-methoxyphenylphenyliodonium hexafluorophosphonate, 4-methoxyphenylphenyliodonium hexafluoroarsenate, 4-methoxyphenylphenyliodonium trifluoromethanesulfonate, 4-methoxyphenylphenyliodonium trifluoroacetate, 4-methoxyphenylphenyliodonium-p-toluene sulfonate and the like.

DAS can be supersensitized by adding thereto a photosensitizer such as thioxanthone, phenothiazine, chlorothioxanthone, xanthone, anthracene, diphenylanthracene, rubrene and the like.

Examples of TAS include triphenylsulfonium tetrafluoroborate, triphenylsulfonium hexafluorophosphonate, triphenylsulfonium hexafluoroarsenate, triphenylsulfonium trifluoromethanesulfonate, triphenylsulfonium trifluoroacetate, triphenylsulfonium-p-toluene sulfonate, triphenylsulfonium tetra(pentafluorophenyl)borate, 4-methoxyphenyldiphenylsulfonium tetrafluoroborate, 4-methoxyphenyldiphenylsulfonium hexafluorophosphonate, 4-methoxyphenyldiphenylsulfonium hexafluoroarsenate, 4-methoxyphenyldiphenylsulfonium trifluoromethanesulfonate, 4-methoxyphenyldiphenylsulfonium trifluoroacetate, 4-methoxyphenyldiphenylsulfonium-p-toluene sulfonate and the like.

Examples of specific trade names of photo cation polymerization initiators include: Cyracure® UVI-6990, Cyracure® UVI-6974 and Cyracure® UVI-6992 (trade names, UCC); ADEKA OPTOMER SP-150, SP-152, SP-170 and SP-172 (trade names, ADEKA Corporation); Rhodorsil Photoinitiator 2074 (trade name, Rhodia Japan, Ltd.); IRGACURE® 250 (trade name, Ciba Specialty Chemicals Inc.); UV-9380C (trade name, GE Toshiba Silicones Co., Ltd.) and the like.

2.4. Curing Agent and the Like

In the production of the polymer constituting the composite material of the invention, in addition to the aforementioned monomers and the like and the polymerization initiator, one or more types of other suitable components, e.g., a curing agent, a catalyst, a stabilizer and the like can also be added.

As the curing agent, a conventionally known latent curing agent, which is used as a curing agent for epoxy resin, can be generally used. Examples of latent curing agents for epoxy resin include amine-based curing agents, novolac resin-based curing agents, imidazole-based curing agents, acid anhydride-based curing agents and the like. Examples of amine-based curing agents include: aliphatic polyamines such as diethylenetriamine, triethylenetetraamine, tetraethylenepentaamine, m-xylenediamine, trimethylhexamethylenediamine, 2-methylpentamethylenediamine and diethylaminopropylamine; alicyclic polyamines such as isophoronediamine, 1,3-bisaminomethylcyclohexane, bis(4-aminocyclohexyl)methane, norbornenediamine, 1,2-diaminocyclohexane and Laromin; and aromatic polyamines such as diaminodiphenylmethane, diaminodiphenylethane and meta-phenylenediamine.

Examples of novolac resin-based curing agents include phenol novolac resin and bisphenol novolac resin. Examples of imidazole-based curing agents include 2-methylimidazole, 2-ethylhexylimidazole, 2-phenylimidazole and 1-cyanoethyl-2-phenylimidazolium trimellitate.

Examples of acid anhydride-based curing agents include tetrahydrophthalic anhydride, hexahydrophthalic anhydride, methyltetrahydrophthalic anhydride, methylhexahydrophthalic anhydride, methylcyclohexene tetracarboxylic dianhydride, phthalic anhydride, trimellitic anhydride, pyromellitic anhydride and benzophenone tetracarboxylic dianhydride.

Moreover, a curing accelerator can be additionally used in order to accelerate curing reaction between a polymerizable compound having glycidyl, epoxy or oxetanyl and a curing agent. Examples of curing accelerators include: tertiary amines such as benzyldimethylamine, tris(dimethylaminomethyl)phenol and dimethylcyclohexylamine; imidazoles such as 1-cyanoethyl-2-ethyl-4-methylimidazole and 2-ethyl-4-methylimidazole; organic phosphorus-based compounds such as triphenylphosphine; quaternary phosphonium salts such as tetraphenylphosphoniumbromide; diazabicycloalkenes such as 1,8-diazabicyclo[5.4.0]undecene-7, organic acid salt thereof and the like; quaternary ammonium salts such as tetraethylammoniumbromide and tetrabutylammoniumbromide; and boron compounds such as boron trifluoride and triphenylborate. These curing accelerators can be used solely or in combination.

For example, in order to prevent undesired polymerization during preservation, a stabilizer is preferably added. As the stabilizer, any compound known as a stabilizer in the art can be used. Typical examples of stabilizers include 4-ethoxyphenol, hydroquinone and butylated hydroxytoluene (BHT).

The optically isotropic polymer/liquid crystal composite related to the preferred embodiment of the invention can exhibit the optically isotropic liquid crystal phase in a wide temperature range. Further, the response time of the polymer/liquid crystal composite related to the preferred embodiment of the invention is very short. Moreover, based on these effects, the polymer/liquid crystal composite related to the preferred embodiment of the invention can be suitably used for optical elements such as display elements and the like.

2.5. Content of Liquid Crystal Composition and the Like

The content of the liquid crystal composition in the polymer/liquid crystal composite of the invention is preferably as high as possible within a range in which the composite can exhibit isotropy. The higher the content of the liquid crystal composition, the higher the value of electric birefringence (Kerr constant) of the composite of the invention.

In the polymer/liquid crystal composite of the invention, the content of the liquid crystal composition is preferably approximately 60 to approximately 99 wt %, more preferably approximately 60 to approximately 95 wt %, and particularly preferably approximately 65 to approximately 95 wt % of the total weight of the composite. The content of the polymer is preferably approximately 1 to approximately 40 wt %, more preferably approximately 5 to approximately 40 wt %, and particularly preferably approximately 5 to approximately 35 wt % of the total weight of the composite.

3. Liquid Crystal Element

The fourth embodiment of the invention is an optical element which is driven in an optically isotropic liquid crystal phase comprising the optically isotropic liquid crystal composition or the polymer/liquid crystal composite (hereinafter, the liquid crystal composition and the polymer/liquid crystal composite are sometimes collectively called "liquid crystal medium").

Examples of structures of the liquid crystal display element include a structure in which an electrode 1 extending from the left side and an electrode 2 extending from the right side are positioned alternately in a comb-like electrode substrate, as shown in FIG. 1. When there is a potential difference between the electrode 1 and the electrode 2, the comb-like electrode substrate as shown in FIG. 1 can provide a state in which two electric fields with different direction (upward and downward) are present.

EXAMPLES

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

In the examples of the specification, "I" represents the non-liquid crystalline isotropic phase; "N" represents the nematic phase; "N*" represents the chiral nematic phase; "BP" represents the blue phase; and "BPX" represents the optically isotropic liquid crystal phase, wherein diffracted light with two or more colors is not observed. In the specification, I-N phase transition point is sometimes referred to as N-I point, and I-N* transition point is sometimes referred to as N*-I point. Further, I-BP phase transition point is sometimes referred to as BP-I point.

In the examples of the specification, measurement/calculation of values of physical properties and the like is made according to the method described in the Standard of Electronic Industries Association of Japan, EIAJ•ED-2521A, unless otherwise indicated.

Specific methods of measurement, calculation and the like are as described below.

I-N Phase Transition Point ($T_{NI}$)

A sample was placed on a hotplate of a melting-point measuring apparatus equipped with a polarization microscope. Initially, under crossed nicols, temperature was elevated to the point at which the sample becomes the non-liquid crystalline isotropic phase, and thereafter temperature was lowered at the rate of 1° C./minute, and the chiral nematic phase or the optically anisotropic phase was allowed to be completely exhibited. Phase transition temperature in the process was measured. Next, temperature was elevated at the rate of 1° C./minute, and phase transition temperature in this process was measured. When it was difficult to determine the phase transition point in the optically isotropic liquid crystal phase in dark field under crossed nicols, a polarization plate was inclined at an angle of 1 to 10° from the state of the crossed nicols to measure the phase transition temperature.

Pitch (P; Measured at 25° C.: nm)

Pitch length was measured using selective reflection (Handbook of Liquid Crystal, page 196 (published in 2000, Maruzen)). The selective reflection wavelength $\lambda$ satisfies the following relational expression: $<n>p/\lambda=1$. $<n>$ represents the average refractive index, which is calculated using the following formula: $<n>=\{(n\|^2+n\perp^2)/2\}^{1/2}$. The selective reflection wavelength was measured using a microspectrophotometer (Otsuka Electronics, Co., Ltd., trade name: FE-3000). The pitch was calculated by dividing the obtained reflection wavelength by the average refractive index.

The pitch of cholesteric liquid crystal having a reflection wavelength in the longer-wavelength region or shorter-wavelength region of visible light or cholesteric liquid crystal whose measurement was difficult was calculated as follows: chiral dopants were added at a concentration to have selective reflection wavelength in the visible light region (concentration C') to measure the selective reflection wavelength ($\lambda$'); and a real selective reflection wavelength ($\lambda$) was calculated by means of the linear extrapolation method utilizing a real chiral concentration (concentration C) ($\lambda=\lambda'\times C'/C$).

Elastic Constant and Dielectric Anisotropy ($\Delta\epsilon$)

The elastic constant is obtained using voltage dependency of capacitance. Sweeping is performed sufficiently slowly to provide a pseudo equilibrium state. Particularly in the vicinity of Freedericksz transition, resolution capability of applied voltage is reduced as much as possible so that accurate values can be obtained (by about several tens of mV). $\epsilon\|$ is calculated from the obtained capacitance in the low voltage region ($C_0$); $\epsilon\perp$ is calculated from the capacitance obtained when applied voltage is extrapolated to infinity; and $\Delta\epsilon$ is calculated therefrom. Using this $\Delta\epsilon$, $K_{11}$ is obtained according to the Freedericksz transition point. Further, $K_{33}$ is obtained according to the measured $K_{11}$ and curve fitting with respect to capacitance change (Apparatus: EC-1 Elastic Constant Measurement Apparatus, manufactured by TOYO Corporation).

Measurement conditions for the elastic constant and the dielectric anisotropy were as follows: a rectangular wave in which a sine wave was superimposed ($V_{AC}$) was applied to the sample at a voltage of 0V to 15V at a voltage rising rate of 0.1 V; the frequency of the rectangular wave was 100 Hz; regarding the sine wave, $V_{AC}=100$ mV, and the frequency was 2 kHz; measurement of the rectangular wave was performed at a temperature which was 20° C. lower than $T_{NI}$ of each liquid crystal component; and an antiparallel cell (manufactured by E. H. C. Co., Ltd.) having the cell gap of 10 μm, to which an aligning film was applied, was used.

Optical Anisotropy ($\Delta n$)

Measurement was conducted with an Abbe refractometer, in which a polarization plate is provided to an eyepiece, using light having a wavelength of 589 nm. After the surface of a main prism was rubbed in one direction, the sample was dropped on the main prism. The refractive index $n\|$ was measured when the direction of polarized light was parallel to the direction of rubbing. The refractive index $n\perp$ was measured when the direction of polarized light was perpendicular to the direction of rubbing. Calculation was made using the following equation: $\Delta n=n\|-n\perp$. Measurement was conducted at a temperature which was 20° C. lower than $T_{NI}$ of the liquid crystal components.

In this regard, "clearing point" refers to a point at which an isotropic phase is exhibited by a compound or a composition in the elevated temperature process. In the specification, N-I point, which is a phase transition point from a nematic phase to an isotropic phase, is indicated as $T_{NI}$.

Examples 1-7

Preparation of Liquid Crystal Compositions LC1-2 to LC7-2

(1) Preparation of Liquid Crystal Components LC1 to LC7

Compounds represented by the following formulae (1a)-(1c), (2a), (2b), (5a), (5b) and (6) and a liquid crystal composition J, which is a mixture of the below-described three compounds, were mixed together at the weight ratios shown in Table 1 below to prepare liquid crystal components LC1 to LC7, which are nematic liquid crystal compositions.

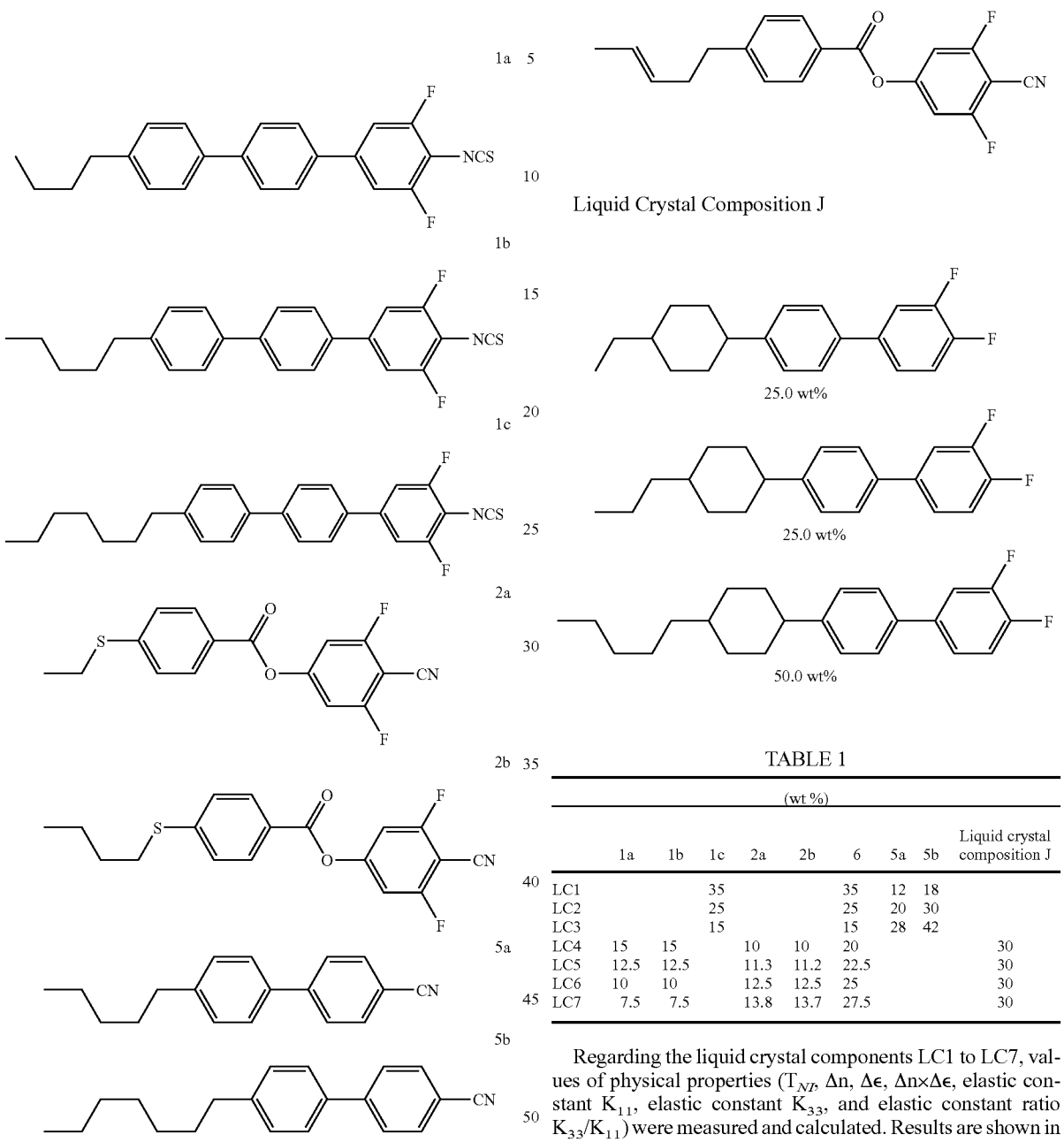

Liquid Crystal Composition J

TABLE 1

| | (wt %) | | | | | | | | |
|---|---|---|---|---|---|---|---|---|---|
| | 1a | 1b | 1c | 2a | 2b | 6 | 5a | 5b | Liquid crystal composition J |
| LC1 | | | 35 | | | 35 | 12 | 18 | |
| LC2 | | | 25 | | | 25 | 20 | 30 | |
| LC3 | | | 15 | | | 15 | 28 | 42 | |
| LC4 | 15 | 15 | | 10 | 10 | 20 | | | 30 |
| LC5 | 12.5 | 12.5 | | 11.3 | 11.2 | 22.5 | | | 30 |
| LC6 | 10 | 10 | | 12.5 | 12.5 | 25 | | | 30 |
| LC7 | 7.5 | 7.5 | | 13.8 | 13.7 | 27.5 | | | 30 |

Regarding the liquid crystal components LC1 to LC7, values of physical properties ($T_{NI}$, $\Delta n$, $\Delta \epsilon$, $\Delta n \times \Delta \epsilon$, elastic constant $K_{11}$, elastic constant $K_{33}$, and elastic constant ratio $K_{33}/K_{11}$) were measured and calculated. Results are shown in Table 2.

TABLE 2

| Liquid crystal component | $T_{NI}$ (° C.) | $\Delta n$ | $\Delta \epsilon$ | $\Delta n \times \Delta \epsilon$ | $K_{11}$ | $K_{33}$ | Elastic constant ratio $K_{33}/K_{11}$ | $\Delta n \times \Delta \epsilon \times K_{33}/K_{11}$ |
|---|---|---|---|---|---|---|---|---|
| LC1 | 62.5 | 0.199 | 27.6 | 5.49 | 4.06 | 8.74 | 2.15 | 11.82 |
| LC2 | 59.0 | 0.198 | 21.6 | 4.28 | 4.34 | 7.44 | 1.71 | 7.33 |
| LC3 | 50.0 | 0.196 | 17.3 | 3.39 | 5.20 | 8.34 | 1.60 | 5.44 |
| LC4 | 76.0 | 0.192 | 23.8 | 4.57 | 3.23 | 6.62 | 2.05 | 9.37 |
| LC5 | 67.5 | 0.167 | 26.8 | 4.48 | 2.94 | 5.71 | 1.94 | 8.69 |
| LC6 | 56.0 | 0.167 | 34.8 | 5.81 | 3.30 | 4.69 | 1.42 | 8.26 |
| LC7 | 48.7 | 0.165 | 33.8 | 5.58 | 2.71 | 3.40 | 1.25 | 7.00 |

(2) Preparation of Liquid Crystal Compositions LC1-2 to LC7-2

The below-described chiral dopant ISO-6OBA2 was added to the liquid crystal component LC1 to prepare a liquid crystal composition LC1-2. The chiral dopant was added at a ratio at which selective reflection wavelength of the obtained liquid crystal composition became 290 to 390 nm. The content (wt %) of the chiral dopant in the liquid crystal composition LC1-2 (Example 1) was 6.5 wt %.

Further, in a manner similar to that applied to the preparation of the liquid crystal composition LC1-2, liquid crystal compositions LC2-2 to LC7-2 were prepared using the liquid crystal components LC2 to LC7. The content (wt %) of the chiral dopant in each of the liquid crystal compositions LC2-2 to LC7-2 (Examples 2-7) is shown in Table 3.

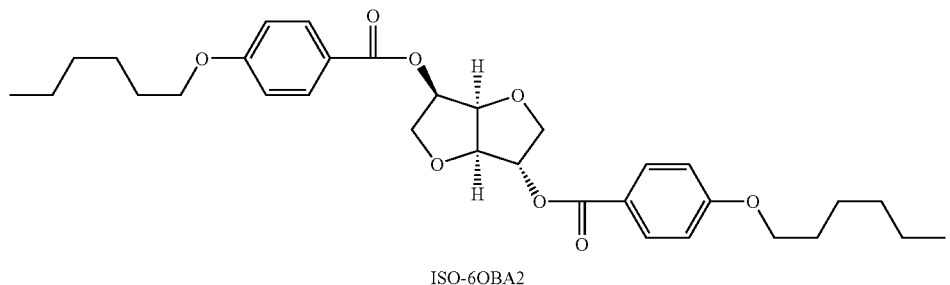 [SMILES: CCCCCCOc1ccc(C(=O)O[C@H]2CO[C@H]3[C@@H]2OC[C@H]3OC(=O)c2ccc(OCCCCCC)cc2)cc1]

ISO-6OBA2

ISO-6OBA2 was obtained by esterifying isosorbide and 4-hexyloxybenzoic acid in the presence of dicyclohexylcarbodiimide (DCC) and 4-dimethylaminopyridine.

Each of the obtained liquid crystal compositions LC1-2 to LC7-2 was held in a cell consisting of two glasses which were not subjected to aligning treatment, and clearing points were measured using a polarization microscope. Specifically, selective reflection wavelengths were measured according to the method indicated in the above item regarding the pitch measurement method (Table 3). Values of selective reflection wavelengths in Examples 4-7 were calculated using the linear extrapolation method.

TABLE 3

|  |  | Content Percentage of chiral dopant (wt %) | Selective reflection wavelength (nm) | Clearing point (° C.) |
|---|---|---|---|---|
| Example 1 | LC1-2 | 6.5 | 380.6 | 51.0 |
| Example 2 | LC2-2 | 6.5 | 377.8 | 43.5 |
| Example 3 | LC3-2 | 6.5 | 383.2 | 38.4 |
| Example 4 | LC4-2 | 7.0 | 306.3 | 66.6 |
| Example 5 | LC5-2 | 7.0 | 308.0 | 54.8 |
| Example 6 | LC6-2 | 7.0 | 295.3 | 45.3 |
| Example 7 | LC7-2 | 7.0 | 291.0 | 27.8 |

Examples 8-14

Preparation of Mixture Comprising Liquid Crystal Composition and Polymerizable Monomer (Monomer-Containing Mixtures (D1-D7))

Firstly, RM257 (manufactured by Merck & Co., Inc.) and TMPTA (trimethylolpropane acrylate, manufactured by Tokyo Chemical Industry, Co., Ltd.) were mixed at the weight ratio of 57:43 to prepare a monomer composition (C).

Next, the monomer composition (C), a polymerization initiator and each of the liquid crystal compositions LC1-2 to LC7-2 prepared in Examples 1-7 were mixed to prepare monomer-containing mixtures (D1-D7) (Examples 8-14).

At the time of preparation of each of the mixtures (D1-D7), mixing was performed so that the content of the monomer composition (C) became 20 wt % of the total mixture.

As the polymerization initiator, 2,2-Dimethoxy-1,2-diphenylethan-1-one (manufactured by Aldrich) was used. The polymerization initiator was used in an amount which became 0.4 wt % per the total weight of the polymerization initiator and the monomer composition (C).

Examples 15-21

Preparation of Polymer/Liquid Crystal Composites (E1-E7)

The monomer-containing mixture (D1) was held between a comb-like electrode substrate which was not subjected to alignment treatment (see FIG. 1) and an opposed glass substrate (no electrode was provided thereto) (cell thickness: 12 µm), and it was irradiated with DEEP UV (manufactured by Ushio Inc.; 10 mW/cm²) at a temperature which was 3° C. higher than the clearing point $T_C$ of the liquid crystal composition ($T_C$+3° C.) for 3 minutes to conduct polymerization reaction, and thereby a polymer/liquid crystal composite (E1) was prepared. Thus, a substrate comprising the polymer/liquid crystal composite (E1) (comb-like electrode cell) was obtained.

Each of the monomer-containing mixtures (D2-D7) was also subjected to polymerization reaction in a manner similar to that in the case of the monomer-containing mixture (D1) to prepare polymer/liquid crystal composites (E2-E7). Thus, comb-like electrode cells comprising the polymer/liquid crystal composites (E2-E7) were obtained.

Figure 2:
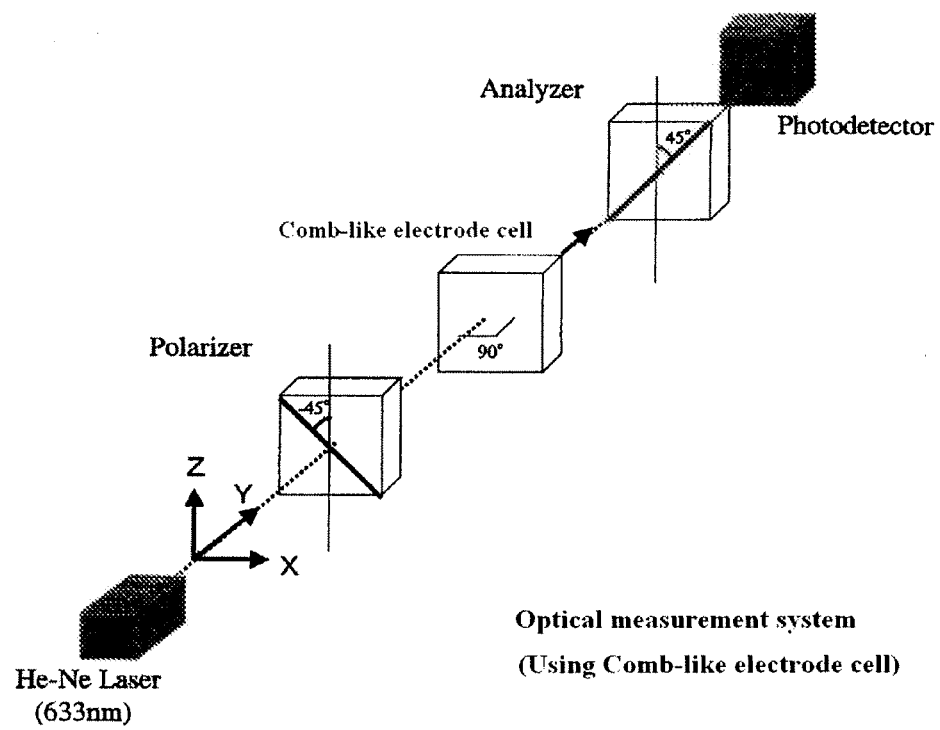
FIG. 2 shows an optical system including a comb-like electrode cell.

Each of the comb-like electrode cells comprising the polymer/liquid crystal composites (E1-E7) was set in the optical system shown in FIG. 2 to measure electrooptic characteristics (transmitted light intensity with or without application of electric field, etc.). The sample cells were set perpendicular to incident light and were fixed to a temperature adjustment apparatus (hot stage) manufactured by Linkam, and the temperature of the cells was adjusted to a given temperature. The direction for applying electric field in the comb-like electrode was tilted 45° with respect to the direction of incoming polarized light. Regarding electrooptic response, an alternating rectangular wave of 0 to 155 V (frequency: 100 Hz) was applied to the comb-like electrode cells under crossed nicols to measure transmitted light intensity with or without application of electric field.

Retardation was calculated by employing the following equation (1), in which transmitted light intensity with application of electric field is indicated as "I", and transmitted light intensity without application of electric field is indicated as "$I_0$".

$$I = I_0 \sin^2 2\theta \sin^2 \frac{\pi R}{\lambda} \qquad (1)$$

(In the equation, R represents retardation, and λ represents incident light wavelength.)

The obtained retardation was divided by the cell thickness (light path length; 12 μm) to obtain a value of electric birefringence Δn (E), and the value was applied to the following equation (2).

$$\Delta n(E) = K \lambda E^2 \qquad (2)$$

(In the equation, Δn(E) represents electric birefringence, λ represents incident light wavelength, K represents Kerr constant, and E represents electric intensity.)

Regarding measurement results of electric birefringence Δn(E) with respect to the square of electric intensity, when the value of the square of electric intensity was around 0 to $2.05 \times 10^{13}$, high linearity was obtained. From this result, inclination of the line was calculated using the least-square method. The value obtained by dividing this inclination by the incident light wavelength (λ) was regarded as Kerr constant (K) in the specification. Table 4 shows the calculated Kerr constants.

TABLE 4

| | Polymer/liquid crystal composite (E) | Kerr constant |
|---|---|---|
| Example 15 | E1 | $7.17 \times 10^{-10}$ |
| Example 16 | E2 | $3.03 \times 10^{-10}$ |
| Example 17 | E3 | $2.85 \times 10^{-10}$ |
| Example 18 | E4 | $4.52 \times 10^{-10}$ |
| Example 19 | E5 | $3.96 \times 10^{-10}$ |
| Example 20 | E6 | $3.59 \times 10^{-10}$ |
| Example 21 | E7 | $3.34 \times 10^{-10}$ |

Figure 3A:
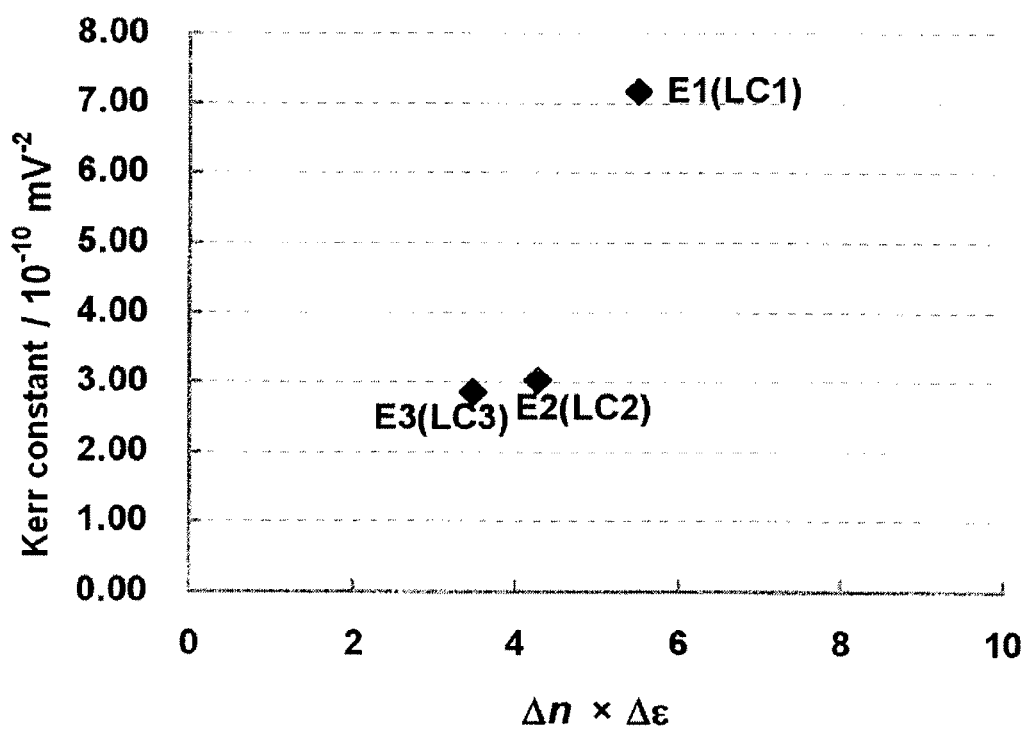
FIG. 3A shows the relationship between the Kerr constant and $\Delta n \times \Delta \epsilon$ of liquid crystal components (LC1 to LC3).
Figure 3B:
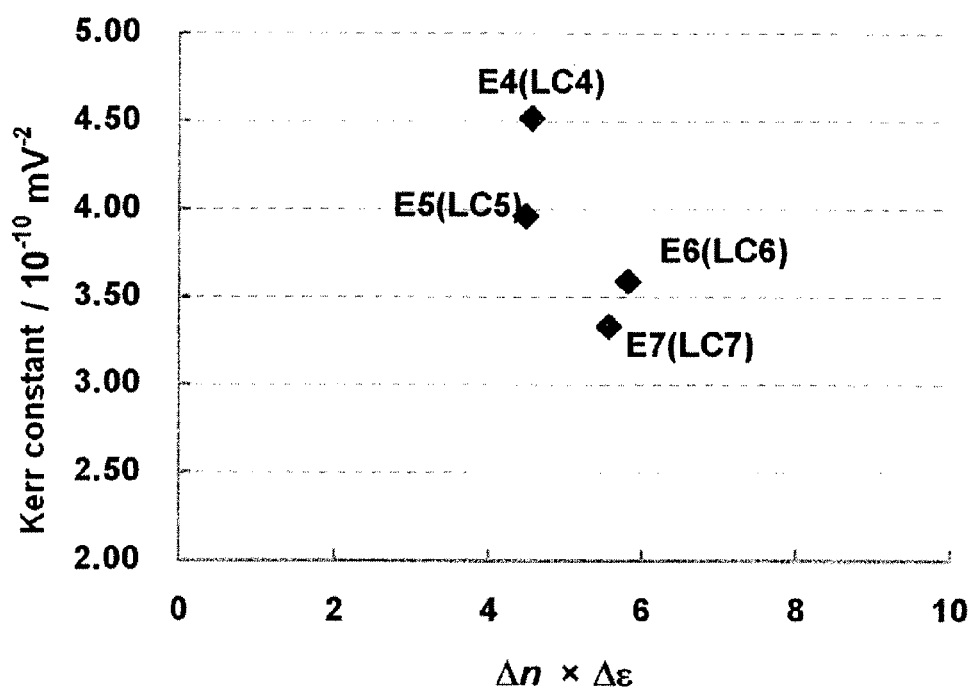
FIG. 3B shows the relationship between the Kerr constant and $\Delta n \times \Delta \epsilon$ of liquid crystal components (LC4 to LC7).
Figure 4A:
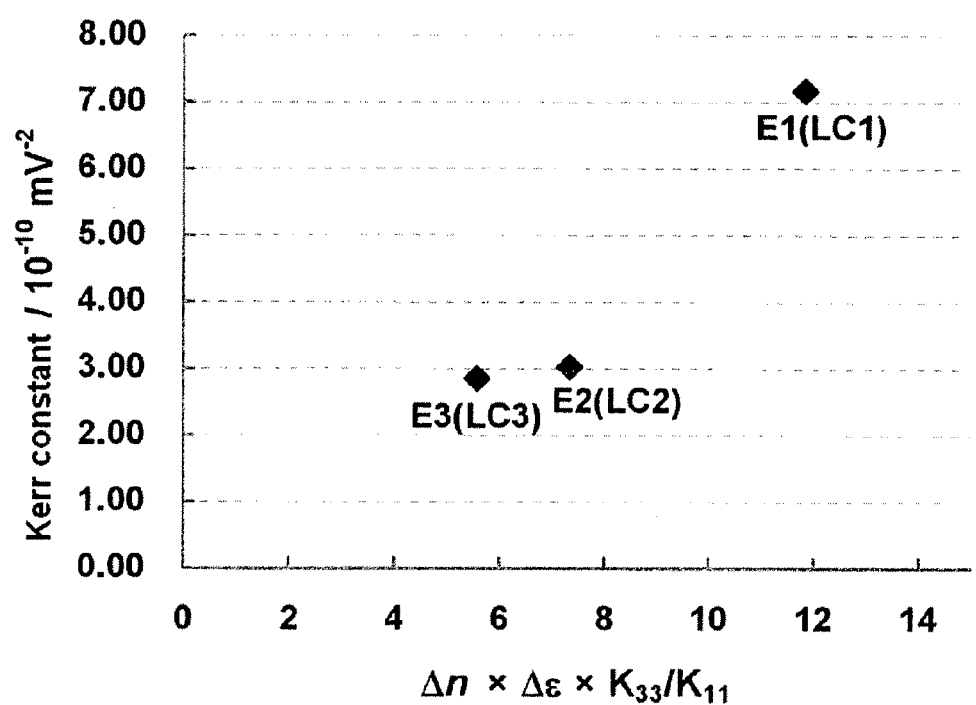
FIG. 4A shows the relationship between the Kerr constant and $\Delta n \times \Delta \epsilon \times K_{33}/K_{11}$ of liquid crystal components (LC1 to LC3).
Figure 4B:
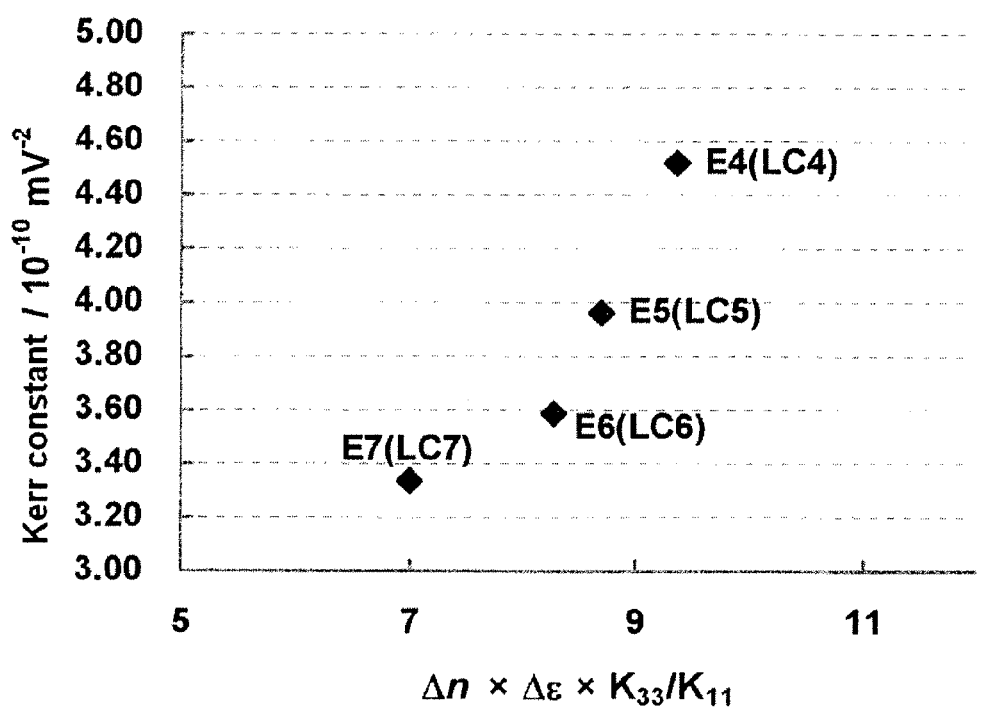
FIG. 4B shows the relationship between the Kerr constant and $\Delta n \times \Delta \epsilon \times K_{33}/K_{11}$ of liquid crystal components (LC4 to LC7).

Based on the above-described results, the following figures were produced: FIG. 3A showing the relationship between the Kerr constant of the polymer/liquid crystal composites (E1-E3) (vertical axis) and $\Delta n \times \Delta \epsilon$ of the liquid crystal components (LC1 to LC3) used in the polymer/liquid crystal composites (E1-E3) (horizontal axis); FIG. 3B showing the similar relationship regarding the polymer/liquid crystal composites (E4-E7); FIG. 4A showing the relationship between the Kerr constant of the polymer/liquid crystal composites (E1-E3) (vertical axis) and $\Delta n \times \Delta \epsilon \times K_{33}/K_{11}$ of the liquid crystal components (LC1 to LC3) (horizontal axis); and FIG. 4B showing the similar relationship regarding the polymer/liquid crystal composites (E4-E7).

According to the above-described FIGS. 3A to 4B, it was found that the elastic constant ratio $K_{33}/K_{11}$ is positively-correlated to the Kerr constant.

Figure 5:
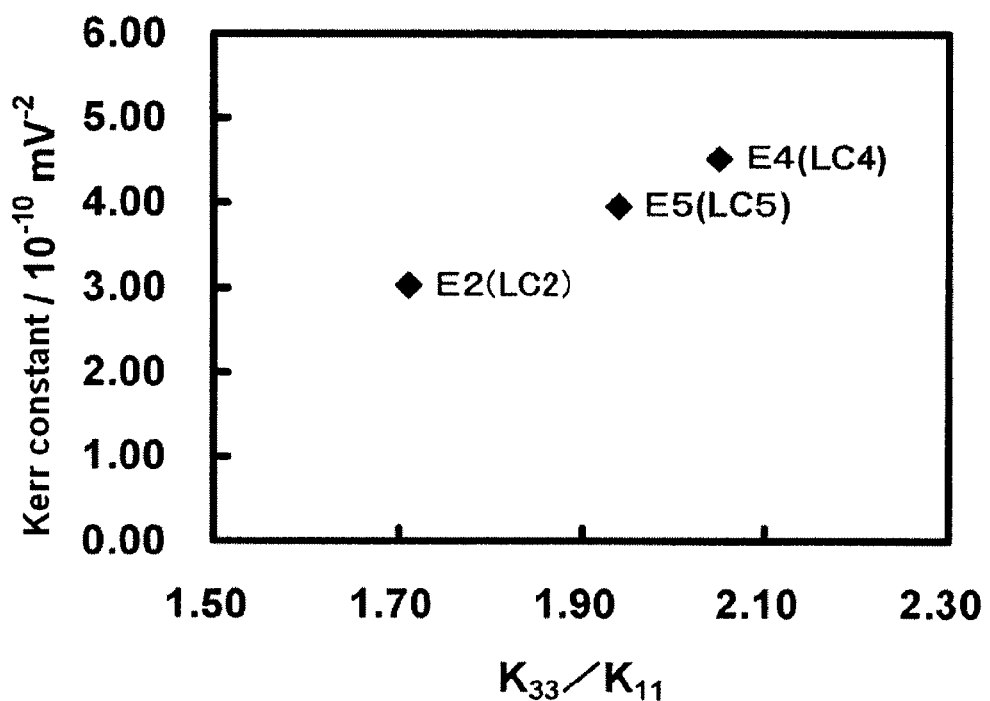
FIG. 5 shows the relationship between the Kerr constant of polymer/liquid crystal composites E2, E4 and E5 and the elastic constant ratio $K_{33}/K_{11}$ of liquid crystal components LC2, LC4 and LC5 used for the respective polymer/liquid crystal composites.

Further, according to FIG. 5 showing the relationship between the Kerr constant of the polymer/liquid crystal composites E2, E4 and E5 (vertical axis) and the elastic constant ratio $K_{33}/K_{11}$ of the liquid crystal components LC2, LC4 and LC5 used in the polymer/liquid crystal composites (horizontal axis), it became clear that a Kerr constant of a polymer/liquid crystal composite obtained using a liquid crystal component with a large $K_{33}/K_{11}$ becomes larger.

According to the above-described results, it was found that the optically isotropic liquid crystal composition of the invention has a large Kerr constant since a value of $\Delta n \times \Delta \epsilon \times K_{33}/K_{11}$ of the liquid crystal component contained in the composition can be increased.

INDUSTRIAL APPLICABILITY

Examples of practical uses of the invention include a liquid crystal material and a liquid crystal element comprising the liquid crystal material.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. An optically isotropic liquid crystal composition having a liquid crystal component comprising a liquid crystal component A consisting of one or more compounds represented by general formula (1-1) or (1-2) and chiral dopants, wherein in the liquid crystal component, the content of compounds having 3 to 5 ring structures is approximately 15 wt % or more,

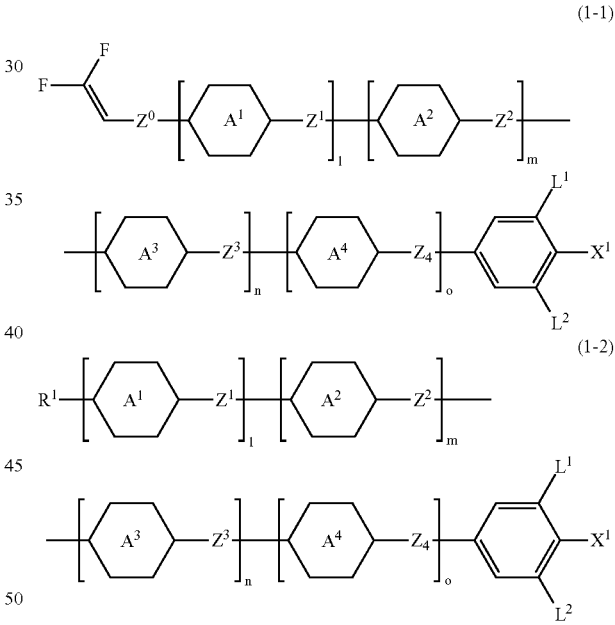

and wherein in formulae (1-1) and (1-2):

R¹ is alkenyl having 2 to 20 carbon atoms, wherein any —CH₂— in the alkenyl can be replaced by —O—, —S—, —COO—, —OCO—, —CH=CH— or —C≡C—; and any hydrogen in the alkenyl can be replaced by halogen;

Ring A¹, Ring A², Ring A³ and Ring A⁴ are each independently a benzene ring, a naphthalene ring, a cyclohexene ring, a bicyclooctane ring or a cyclohexane ring, wherein any hydrogen in these rings can be replaced by halogen; any —CH₂— in the rings can be replaced by —O— or —S—; and any —CH= in the rings can be replaced by —N=;

Z⁰ is a single bond or alkylene having 1 to 20 carbon atoms, wherein any —CH₂— in the alkylene can be replaced by —O—, —S—, —COO—, —OCO—, —CSO—, —OCS—, —CH═CH—, —CF═CF— or —C≡C—; and any hydrogen can be replaced by halogen;

$Z^1$, $Z^2$, $Z^3$ and $Z^4$ are each independently a single bond or alkylene having 1 to 4 carbon atoms, wherein any —CH$_2$— in the alkylene can be replaced by —O—, —S—, —COO—, —OCO—, —CSO—, —OCS—, —CH═CH—, —CF═CF— or —C≡C—; and any hydrogen can be replaced by halogen;

$L^1$ and $L^2$ are each independently hydrogen or halogen;

$X^1$ is halogen, —C≡N, —N═C═S, —C≡C—C≡N, —SF$_5$, —CHF$_2$, —CF$_3$, —CF$_2$CH$_2$F, —CF$_2$CHF$_2$, —CF$_2$CF$_3$, —(CF$_2$)$_3$—F, —CF$_2$CHFCF$_3$, 2-fluoro-1,4-phenylene, 3-fluoro-1,4-phenylene or 2,5-difluoro-1,4-phenylene;

$Z^9$ and $Z^{10}$ are each independently —C≡C—, —COO—, —(CH$_2$)$_2$—, —CH═CH— or a single bond; and wherein the liquid crystal component has a value of $\Delta n \times \Delta \epsilon \geq 3.39$, when there is no chiral dopant.

2. An optically isotropic liquid crystal composition having a liquid crystal component comprising a liquid crystal component A consisting of one or more compounds represented by general formula (1-1) or (1-2) and chiral dopants, wherein in the liquid crystal component, the content of the liquid crystal component A is approximately 15 wt % or more in the liquid crystal component,

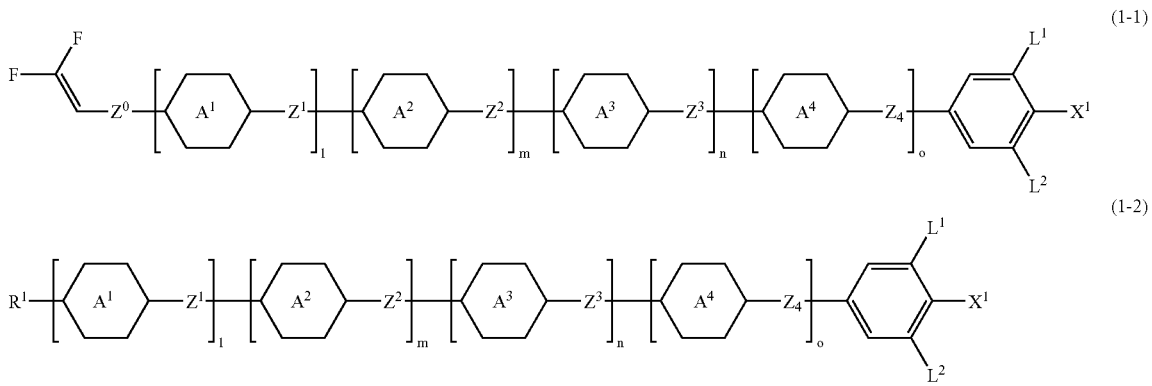

(1-1)

(1-2)

—CHFCF$_2$CF$_3$, —(CF$_2$)$_4$—F, —(CF$_2$)$_5$—F, —OCHF$_2$, —OCF$_3$, —OCF$_2$CH$_2$F, —OCF$_2$CHF$_2$, —OCH$_2$CF$_3$, —OCF$_2$CF$_3$, —O—(CF$_2$)$_3$—F, —OCF$_2$CHFCF$_3$, —OCHFCF$_2$CF$_3$, —O—(CF$_2$)$_4$—F, —O—(CF$_2$)$_5$—F, —CH═CF$_2$, —CH═CHCF$_3$ or —CH═CHCF$_2$CF$_3$; and l, m, n and o are each independently 0 or 1; and l+m+n+o≥1;

wherein the liquid crystal component does not contain a liquid crystal component D consisting of at least one compound selected from the group consisting of compounds represented by general formulae (7) to (9),

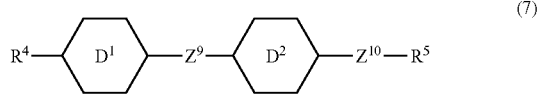

(7)

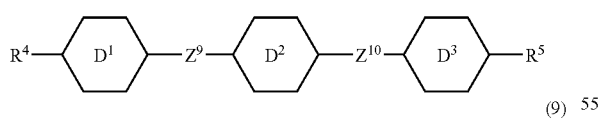

(8)

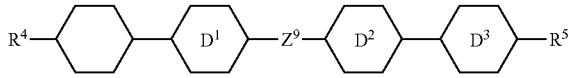

(9)

and wherein in the formulae:

$R^4$ and $R^5$ are each independently alkyl having 1 to 10 carbon atoms or alkenyl having 2 to 10 carbon atoms, wherein any —CH$_2$— in the alkyl and the alkenyl can be replaced by —O—;

Ring $D^1$, Ring $D^2$ and Ring $D^3$ are each independently 1,4-cyclohexylene, pyrimidine-2,5-diyl, 1,4-phenylene, and wherein in formulae (1-1) and (1-2):

$R^1$ is alkenyl having 2 to 20 carbon atoms, wherein any —CH$_2$— in the alkenyl can be replaced by —O—, —S—, —COO—, —OCO—, —CH═CH— or —C≡C—; and any hydrogen in the alkenyl can be replaced by halogen;

Ring $A^1$, Ring $A^2$, Ring $A^3$ and Ring $A^4$ are each independently a benzene ring, a naphthalene ring, a cyclohexene ring, a bicyclooctane ring or a cyclohexane ring, wherein any hydrogen in these rings can be replaced by halogen; any —CH$_2$— in the rings can be replaced by —O— or —S—; and any —CH═ in the rings can be replaced by —N═;

$Z^0$ is a single bond or alkylene having 1 to 20 carbon atoms, wherein any —CH$_2$— in the alkylene can be replaced by —O—, —S—, —COO—, —OCO—, —CSO—, —OCS—, —CH═CH—, —CF═CF— or —C≡C—; and any hydrogen can be replaced by halogen;

$Z^1$, $Z^2$, $Z^3$ and $Z^4$ are each independently a single bond or alkylene having 1 to 4 carbon atoms, wherein any —CH$_2$— in the alkylene can be replaced by —O—, —S—, —COO—, —OCO—, —CSO—, —OCS—, —CH═CH—, —CF═CF— or —C≡C—; and any hydrogen can be replaced by halogen;

$L^1$ and $L^2$ are each independently hydrogen or halogen;

$X^1$ is halogen, —C≡N, —N═C═S, —C≡C—C≡N, —SF$_5$, —CHF$_2$, —CF$_3$, —CF$_2$CH$_2$F, —CF$_2$CHF$_2$, —CF$_2$CF$_3$, —(CF$_2$)$_3$—F, —CF$_2$CHFCF$_3$, —CHFCF$_2$CF$_3$, —(CF$_2$)$_4$—F, —(CF$_2$)$_5$—F, —OCHF$_2$, —OCF$_3$, —OCF$_2$CH$_2$F, —OCF$_2$CHF$_2$, —OCH$_2$CF$_3$, —OCF$_2$CF$_3$, —O—(CF$_2$)$_3$—F, —OCF$_2$CHFCF$_3$, —OCHFCF$_2$CF$_3$, —O—(CF$_2$)$_4$—F, —O—(CF$_2$)$_5$—F, —CH═CF$_2$, —CH═CHCF$_3$ or —CH═CHCF$_2$CF$_3$;

l, m, n and o are each independently 0 or 1; and l+m+n+o≥2, wherein the liquid crystal component does not contain a liquid crystal component D consisting of at least one compound selected from the group consisting of compounds represented by general formulae (7) to (9),

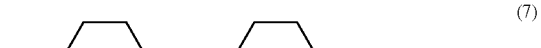

(7)

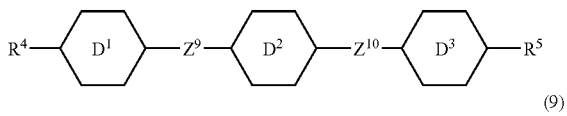

(8)

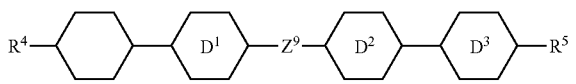

(9)

and wherein in the formulae:
$R^4$ and $R^5$ are each independently alkyl having 1 to 10 carbon atoms or alkenyl having 2 to 10 carbon atoms, wherein any —$CH_2$— in the alkyl and the alkenyl can be replaced by —O—;
Ring $D^1$, Ring $D^2$ and Ring $D^3$ are each independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene;
$Z^9$ and $Z^{10}$ are each independently —C≡C—, —COO—, —(CH_2)_2—, —CH=CH— or a single bond; and
wherein the liquid crystal component has a value of $\Delta n \times \Delta\epsilon \geq 3.39$, when there is no chiral dopant.

3. An optically isotropic liquid crystal composition having a liquid crystal component comprising a liquid crystal component A consisting of one or more compounds represented by general formula (1-1) or (1-2) and chiral dopants, wherein in the liquid crystal component, the content of compounds represented by l+m+n+o≥2 in formula (1-1) or (1-2) is approximately 15 wt % or more, and the content of compounds represented by l+m+n+o=1 is approximately 0.1 to approximately 85 wt %, Ring $A^1$, Ring $A^2$, Ring $A^3$ and Ring $A^4$ are each independently a benzene ring, a naphthalene ring, a cyclohexene ring, a bicyclooctane ring or a cyclohexane ring, wherein any hydrogen in these rings can be replaced by halogen; any —$CH_2$— in the rings can be replaced by —O— or —S—; and any —CH= in the rings can be replaced by —N=;

$Z^0$ is a single bond or alkylene having 1 to 20 carbon atoms, wherein any —$CH_2$— in the alkylene can be replaced by —O—, —S—, —COO—, —OCO—, —CSO—, —OCS—, —CH=CH—, —CF=CF— or —C≡C—; and any hydrogen can be replaced by halogen;

$Z^1$, $Z^2$, $Z^3$ and $Z^4$ are each independently a single bond or alkylene having 1 to 4 carbon atoms, wherein any —$CH_2$— in the alkylene can be replaced by —O—, —S—, —COO—, —OCO—, —CSO—, —OCS—, —CH=CH—, —CF=CF— or —C≡C—; and any hydrogen can be replaced by halogen;

$L^1$ and $L^2$ are each independently hydrogen or halogen;

$X^1$ is halogen, —C≡N, —N=C=S, —C≡C—C≡N, —$SF_5$, —$CHF_2$, —$CF_3$, —$CF_2CH_2F$, —$CF_2CHF_2$, —$CF_2CF_3$, —$(CF_2)_3$—F, —$CF_2CHFCF_3$, —$CHFCF_2CF_3$, —$(CF_2)_4$—F, —$(CF_2)_5$—F, —$OCHF_2$, —$OCF_3$, —$OCF_2CH_2F$, —$OCF_2CHF_2$, —$OCH_2CF_3$, —$OCF_2CF_3$, —O—$(CF_2)_3$—F, —$OCF_2CHFCF_3$, —$OCHFCF_2CF_3$, —O—$(CF_2)_4$—F, —O—$(CF_2)_5$—F, —CH=$CF_2$, —CH=$CHCF_3$ or —CH=$CHCF_2CF_3$; and l, m, n and o are each independently 0 or 1, wherein the liquid crystal component does not contain a liquid crystal component D consisting of at least one compound selected from the group consisting of compounds represented by general formulae (7) to (9),

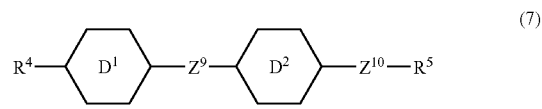

(7)

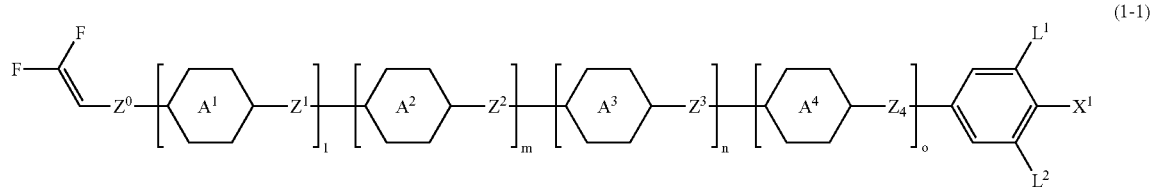

(1-1)

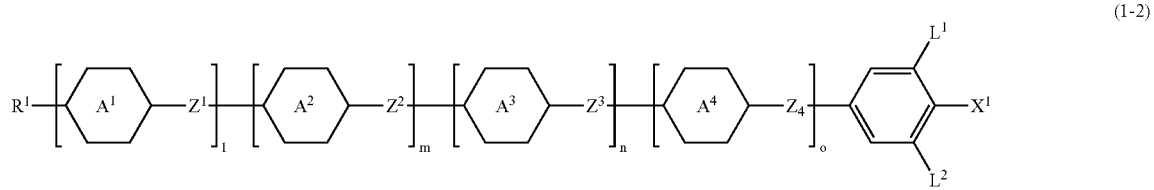

(1-2)

and wherein in formulae (1-1) and (1-2):
$R^1$ is alkenyl having 2 to 20 carbon atoms, wherein any —$CH_2$— in the alkenyl can be replaced by —O—, —S—, —COO—, —OCO—, —CH=CH— or —C≡C—; and any hydrogen in the alkenyl can be replaced by halogen;

-continued

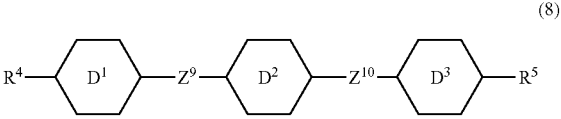

(8)

-continued

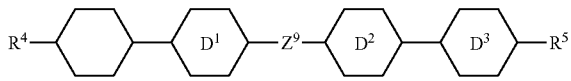
(9)

and wherein in the formulae:
$R^4$ and $R^5$ are each independently alkyl having 1 to 10 carbon atoms or alkenyl having 2 to 10 carbon atoms, wherein any —$CH_2$— in the alkyl and the alkenyl can be replaced by —O—;
Ring $D^1$, Ring $D^2$ and Ring $D^3$ are each independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene;
$Z^9$ and $Z^{10}$ are each independently —C≡C—, —COO—, —$(CH_2)_2$—, —CH=CH— or a single bond; and
wherein the liquid crystal component has a value of $\Delta n \times \Delta \epsilon \geq 3.39$, when there is no chiral dopant.

4. An optically isotropic liquid crystal composition having a liquid crystal component comprising a liquid crystal component A consisting of one or more compounds represented by general formula (1-1) or (1-2) and a liquid crystal component B consisting of one or more compounds represented by general formula (1-3) and chiral dopants, wherein in the liquid crystal component, the content of the liquid crystal component B is approximately 15 to approximately 99.5 wt % or more, Ring $A^1$, Ring $A^2$, Ring $A^3$ and Ring $A^4$ are each independently a benzene ring, a naphthalene ring, a cyclohexene ring, a bicyclooctane ring or a cyclohexane ring, wherein any hydrogen in these rings can be replaced by halogen; any —$CH_2$— in the rings can be replaced by —O— or —S—; and any —CH= in the rings can be replaced by —N=;

$Z^0$ is a single bond or alkylene having 1 to 20 carbon atoms, wherein any —$CH_2$— in the alkylene can be replaced by —O—, —S—, —COO—, —OCO—, —CSO—, —OCS—, —CH=CH—, —CF=CF— or —C≡C—; and any hydrogen can be replaced by halogen;

$Z^1$, $Z^2$, $Z^3$ and $Z^4$ are each independently a single bond or alkylene having 1 to 4 carbon atoms, wherein any —$CH_2$— in the alkylene can be replaced by —O—, —S—, —COO—, —OCO—, —CSO—, —OCS—, —CH=CH—, —CF=CF— or —C≡C—; and any hydrogen can be replaced by halogen;

$L^1$ and $L^2$ are each independently hydrogen or halogen;

$X^1$ is halogen, —C≡N, —N=C=S, —C≡C—C≡N, —$SF_5$, —$CHF_2$, —$CF_3$, —$CF_2CH_2F$, —$CF_2CHF_2$, —$CF_2CF_3$, —$(CF_2)_3$—F, —$CF_2CHFCF_3$, —$CHFCF_2CF_3$, —$(CF_2)_4$—F, —$(CF_2)_5$—F, —$OCHF_2$, —$OCF_3$, —$OCF_2CH_2F$, —$OCF_2CHF_2$, —$OCH_2CF_3$, —$OCF_2CF_3$, —O—$(CF_2)_3$—F, —$OCF_2CHFCF_3$, —$OCHFCF_2CF_3$, —O—$(CF_2)_4$—F, —O—$(CF_2)_5$—F,

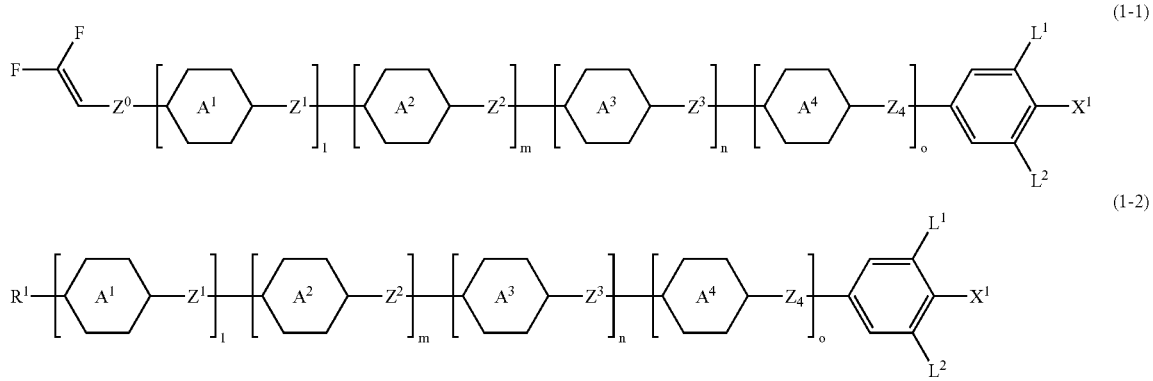
(1-1)

(1-2)

and wherein in formulae (1-1) and (1-2):
$R^1$ is alkenyl having 2 to 20 carbon atoms, wherein any —$CH_2$— in the alkenyl can be replaced by —O—, —S—, —COO—, —OCO—, —CH=CH— or —C≡C—; and any hydrogen in the alkenyl can be replaced by halogen;

—CH=$CF_2$, —CH=$CHCF_3$ or —CH=$CHCF_2CF_3$; and
l, m, n and o are each independently 0 or 1,

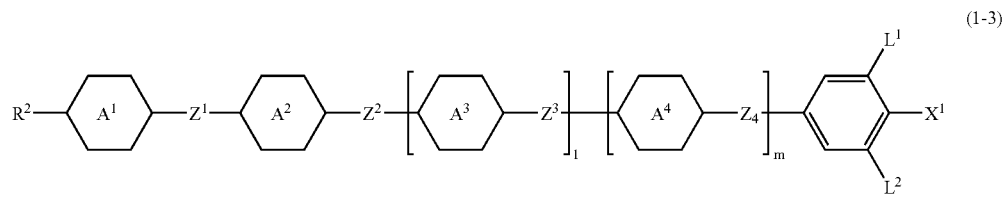
(1-3)

and wherein in general formula (1-3):
$R^2$ is hydrogen or alkyl having 1 to 20 carbon atoms, wherein any —$CH_2$— in the alkyl can be replaced by —O—, —S—, —COO—, —OCO— or —C≡C—; and any hydrogen in the alkyl can be replaced by halogen;

Ring $A^1$, Ring $A^2$, Ring $A^3$ and Ring $A^4$ are each independently a benzene ring, a naphthalene ring, a cyclohexene ring, a bicyclooctane ring or a cyclohexane ring, wherein any hydrogen in these rings can be replaced by halogen; any —$CH_2$— in the rings can be replaced by —O— or —S—; and any —CH═ in the rings can be replaced by —N═;

$Z^1$, $Z^2$, $Z^3$ and $Z^4$ are each independently a single bond or alkylene having 1 to 4 carbon atoms, wherein any —$CH_2$— in the alkylene can be replaced by —O—, —S—, —COO—, —OCO—, —CSO—, —OCS—, —CH═CH—, —CF═CF— or —C≡C—; and any hydrogen in the alkylene can be replaced by halogen;

$L^1$ and $L^2$ are each independently hydrogen or halogen;

$X^1$ is halogen, —C≡N, —N═C═S, —C≡C—C≡N, —$SF_5$, —$CHF_2$, —$CF_3$, —$CF_2CH_2F$, —$CF_2CHF_2$, —$CF_2CF_3$, —$(CF_2)_3$—F, —$CF_2CHFCF_3$, —$CHFCF_2CF_3$, —$(CF_2)_4$—F, —$(CF_2)_5$—F, —$OCHF_2$, —$OCF_3$, —$OCF_2CH_2F$, —$OCF_2CHF_2$, —$OCH_2CF_3$, —$OCF_2CF_3$, —O—$(CF_2)_3$—F, —$OCF_2CHFCF_3$, —$OCHFCF_2CF_3$, —O—$(CF_2)_4$—F, —O—$(CF_2)_5$—F, —CH═$CF_2$, —CH═$CHCF_3$ or —CH═$CHCF_2CF_3$; and l and m are each independently 0 or 1; and l+m≥1;

wherein the liquid crystal component does not contain a liquid crystal component D consisting of at least one compound selected from the group consisting of compounds represented by general formulae (7) to (9),

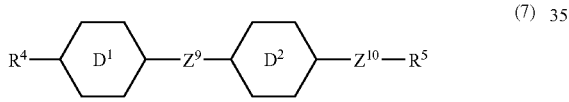
(7)

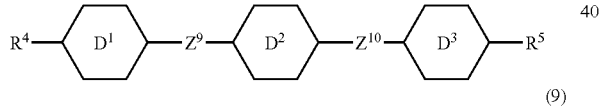
(8)

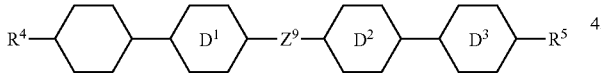
(9)

and wherein in the formulae:

$R^4$ and $R^5$ are each independently alkyl having 1 to 10 carbon atoms or alkenyl having 2 to 10 carbon atoms, wherein any —$CH_2$— in the alkyl and the alkenyl can be replaced by —O—;

Ring $D^1$, Ring $D^2$ and Ring $D^3$ are each independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene;

$Z^9$ and $Z^{10}$ are each independently —C≡C—, —COO—, —$(CH_2)_2$—, —CH═CH— or a single bond; and wherein the liquid crystal component has a value of Δn×Δε≥3.39, when there is no chiral dopant.

5. The optically isotropic liquid crystal composition according to claim 1, wherein in the liquid crystal component A, the content of the compounds represented by general formula (1-1) is approximately 5 to approximately 85 wt %.

6. The optically isotropic liquid crystal composition according to claim 1, wherein in the liquid crystal component, the content of the liquid crystal component A is approximately 40 to approximately 85 wt %.

7. The optically isotropic liquid crystal composition according to claim 1, wherein in the liquid crystal component, the content of the liquid crystal component A is approximately 70 to approximately 85 wt %.

8. The optically isotropic liquid crystal composition according to claim 1, wherein in the optically isotropic liquid crystal composition, the content of the liquid crystal component A is approximately 70 to approximately 84 wt %.

9. The optically isotropic liquid crystal composition according to claim 1, wherein $R^1$ in general formula (1-2) is represented by any one of the formulae selected from the group consisting of the following formulae (CHN-1) to (CHN-12),

(CHN-1)

(CHN-2)

(CHN-3)

(CHN-4)

(CHN-5)

(CHN-6)

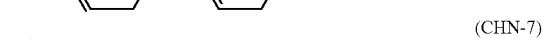
(CHN-7)

(CHN-8)

(CHN-9)

(CHN-10)

(CHN-11)

(CHN-12)

and wherein in formulae (CHN-1) to (CHN-12), each $R^{1a}$ is independently hydrogen or alkyl having 1 to 10 carbon atoms.

10. The optically isotropic liquid crystal composition according to claim 1, wherein in the liquid crystal component, the difference between the upper limit and the lower limit of a temperature allowing coexistence of a nematic phase and a non-liquid crystalline isotropic phase is approximately 3° C. to approximately 150° C.

11. The optically isotropic liquid crystal composition according to claim 1, comprising the chiral dopants in an amount of 1 to approximately 40 wt % of the total weight of the liquid crystal composition.

12. The optically isotropic liquid crystal composition according to claim 1, comprising the chiral dopants in an amount of approximately 5 to approximately 15 wt % of the total weight of the liquid crystal composition.

13. The optically isotropic liquid crystal composition according to claim 1, wherein the chiral dopants comprise one or more compounds represented by any one of the following formulae (K1) to (K5), (K1)
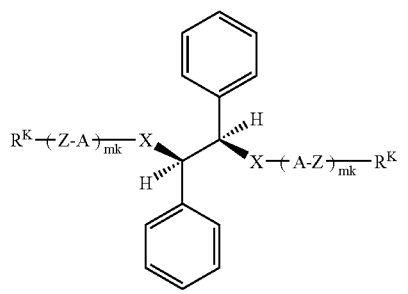

(K2)
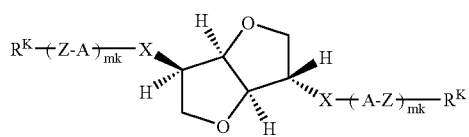

(K3)
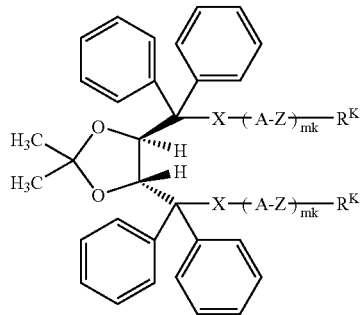

(K4)
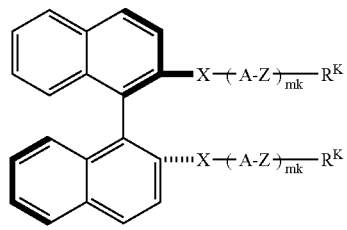
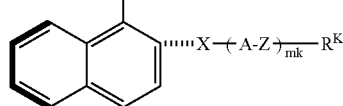

(K5)
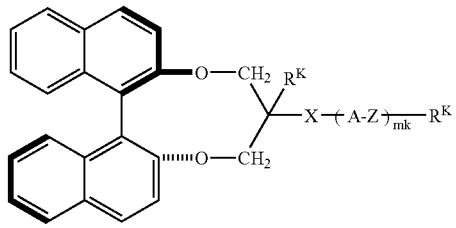

and wherein in formulae (K1) to (K5):

each $R^K$ is independently hydrogen, halogen, —C≡N, —N=C=O, —N=C=S or alkyl having 1 to 20 carbon atoms, wherein any —CH$_2$— in the alkyl can be replaced by —O—, —S—, —COO—, —OCO—, —CH=CH—, —CF=CF— or —C≡C—; and any hydrogen in the alkyl can be replaced by halogen;

each A is independently an aromatic or nonaromatic 3- to 8-membered ring or a condensed ring having 9 or more carbon atoms, wherein any hydrogen in these rings can be replaced by halogen, alkyl having 1 to 3 carbon atoms or haloalkyl; —CH$_2$— in the rings can be replaced by —O—, —S— or —NH—; and CH= in the rings can be replaced by —N=;

each Z is independently a single bond or alkylene having 1 to 8 carbon atoms, wherein any —CH$_2$— in the alkylene can be replaced by —O—, —S—, —COO—, —OCO—, —CSO—, —OCS—, —N=N—, —CH=N—, —N=CH—, —N(O)=N—, —N=N(O)—, —CH=CH—, —CF=CF— or —C≡C—; and any hydrogen in the alkylene can be replaced by halogen;

each X is independently a single bond, —COO—, —CH$_2$O—, —CF$_2$O—, —OCO—, —OCH$_2$—, —OCF$_2$— or —CH$_2$CH$_2$—; and each mK is independently an integer from 1 to 4.

14. The optically isotropic liquid crystal composition according to claim 1, wherein the chiral dopants comprise one or more compounds represented by any one of the following formulae (K2-1) to (K2-8) and (K5-1) to (K5-3), (K2-1)
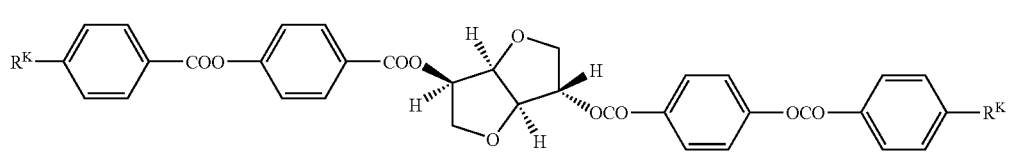

(K2-2)
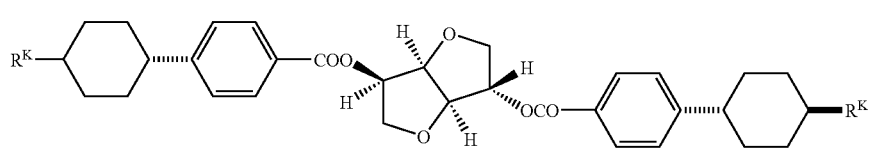

-continued

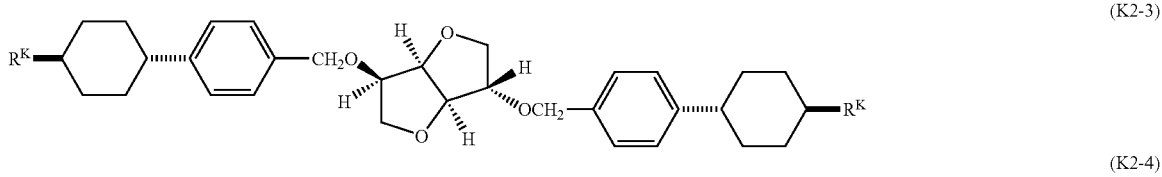
(K2-3)

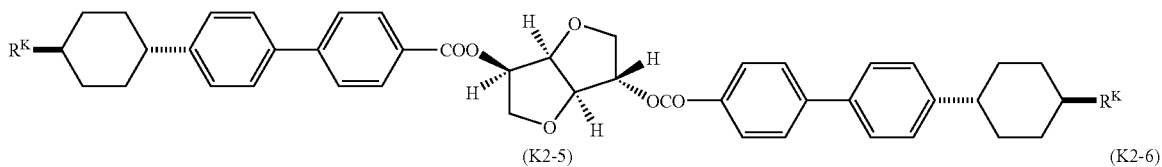
(K2-4)

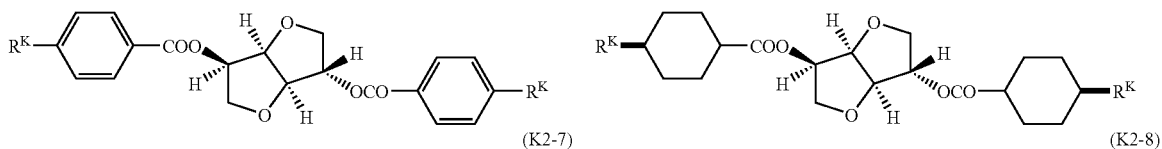
(K2-5)       (K2-6)

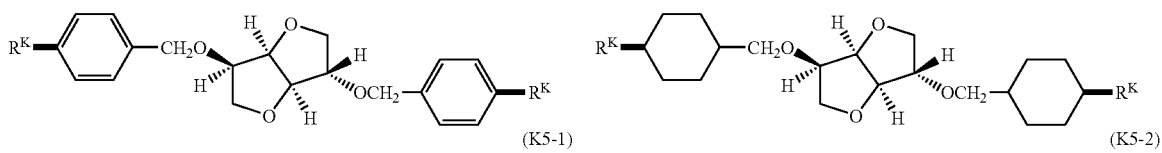
(K2-7)       (K2-8)

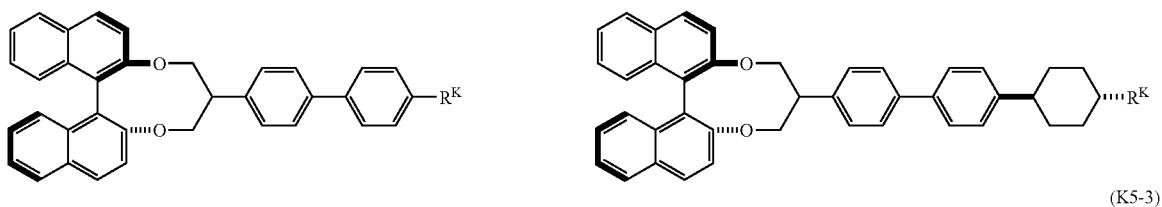
(K5-1)       (K5-2)

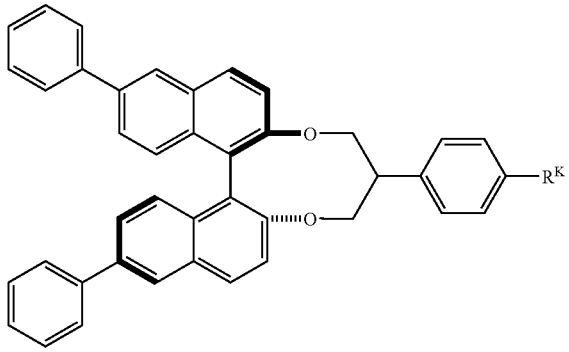
(K5-3)

and wherein in formulae (K2-1) to (K2-8) and (K5-1) to (K5-3):

each $R^K$ is independently alkyl having 1 to 10 carbon atoms, wherein —CH$_2$— adjacent to the ring in the alkyl can be replaced by —O—; and any —CH$_2$— in the alkyl can be replaced by —CH=CH—.

15. The optically isotropic liquid crystal composition according to claim 1, further comprising one or more agents selected from the group consisting of antioxidants and ultraviolet absorbers.

16. The optically isotropic liquid crystal composition according to claim 1, wherein an optically isotropic liquid crystal phase does not show diffracted light with two or more colors.

17. The optically isotropic liquid crystal composition according to claim 1, wherein an optically isotropic liquid crystal phase shows diffracted light with two or more colors.

18. The optically isotropic liquid crystal composition according to claim 1, which exhibits a chiral nematic phase at approximately −20° C. to approximately 70° C., and wherein in at least a part of the temperature range, the spiral pitch is approximately 700 nm or less.

19. A mixture comprising the optically isotropic liquid crystal composition according to claim 1 and a polymerizable monomer.

20. The mixture according to claim 19, wherein the polymerizable monomer is a photopolymerizable monomer or a thermopolymerizable monomer.

21. A polymer/liquid crystal composite for use in an element driven in a state of an optically isotropic liquid crystal phase, which can be obtained by polymerizing the mixture according to claim 19.

22. A polymer/liquid crystal composite for use in an element driven in a state of an optically isotropic liquid crystal phase, which can be obtained by polymerizing the mixture according to claim 19 in a state of a non-liquid crystalline isotropic phase or the optically isotropic liquid crystal phase.

23. The polymer/liquid crystal composite according to claim 21, wherein a polymer included in the polymer/liquid crystal composite has a mesogenic moiety.

24. The polymer/liquid crystal composite according to claim 21, wherein the polymer included in the polymer/liquid crystal composite has a cross-linked structure.

25. The polymer/liquid crystal composite according to claim 21, comprising the liquid crystal composition in an amount of approximately 60 to approximately 99 wt % and the polymer in an amount of 1 to 40 wt %.

* * * * *